US012106501B2

(12) United States Patent
Nims et al.

(10) Patent No.: US 12,106,501 B2
(45) Date of Patent: Oct. 1, 2024

(54) SUBSURFACE IMAGING AND DISPLAY OF 3D DIGITAL IMAGE AND 3D IMAGE SEQUENCE

(71) Applicants: Jerry Nims, Sandy Springs, GA (US); William M. Karszes, Hilton Head, SC (US); Samuel Pol, Lawrenceville, GA (US)

(72) Inventors: Jerry Nims, Sandy Springs, GA (US); William M. Karszes, Hilton Head, SC (US); Samuel Pol, Lawrenceville, GA (US)

(73) Assignee: JUC Holdings Limited, Tortola (VG)

( * ) Notice: Subject to any disclaimer, the term of this patent is extended or adjusted under 35 U.S.C. 154(b) by 0 days.

(21) Appl. No.: 17/511,490

(22) Filed: Oct. 26, 2021

(65) Prior Publication Data

US 2022/0051427 A1   Feb. 17, 2022

Related U.S. Application Data

(63) Continuation-in-part of application No. 17/459,067, filed on Aug. 27, 2021, now abandoned, and a
(Continued)

(51) Int. Cl.
*G06T 7/593* (2017.01)
*G01S 15/86* (2020.01)
(Continued)

(52) U.S. Cl.
CPC .............. *G06T 7/593* (2017.01); *G01S 15/86* (2020.01); *G01S 15/8993* (2013.01);
(Continued)

(58) Field of Classification Search
CPC ............ H04N 13/243; H04N 5/23222; H04N 13/128; H04N 13/156; H04N 13/271;
(Continued)

(56) References Cited

U.S. PATENT DOCUMENTS 3,895,867 A   7/1975   Lo et al.
3,908,112 A   9/1975   Lo et al.
(Continued)

FOREIGN PATENT DOCUMENTS

EP   2193449 B1   10/2016
EP   2824508 B1   2/2018
(Continued)

OTHER PUBLICATIONS

Office Action issued on Apr. 4, 2022 in corresponding U.S. Appl. No. 17/355,906.
(Continued)

*Primary Examiner* — Tung T Vo
(74) *Attorney, Agent, or Firm* — Mathew L. Grell, Esq.; Grell & Watson Patent Attorneys LLC

(57) ABSTRACT

To simulate a 3D image of a subsurface below a surface, the system having a memory device for storing an instruction, a processor in communication with the memory device configured to execute the instruction, and a subsurface image capture module in communication with the processor, the subsurface image capture module having one or more wave generating device and one or more sensor affixed to a vehicle to capture a series of digital image datasets of the subsurface with a coordinate reference data, wherein the processor executes an instruction to generate a digital model of the series of digital image datasets of the subsurface while maintaining the coordinate reference data, wherein the processor executes an instruction to determine a depth map of the digital model, and wherein the processor executes an instruction to identify a key subject point in the digital model, where subsurface includes an internal biology, below ground, underwater.

41 Claims, 32 Drawing Sheets

Related U.S. Application Data continuation-in-part of application No. 17/355,906, filed on Jun. 23, 2021, now abandoned, and a continuation-in-part of application No. 17/333,721, filed on May 28, 2021, now Pat. No. 11,917,119, and a continuation-in-part of application No. 29/778,683, filed on Apr. 14, 2021, now abandoned, and a continuation-in-part of application No. 29/733,453, filed on May 1, 2020, now abandoned, and a continuation-in-part of application No. 29/728,152, filed on Mar. 16, 2020, now abandoned, and a continuation-in-part of application No. 29/726,221, filed on Mar. 2, 2020, now abandoned, and a continuation-in-part of application No. 29/720,105, filed on Jan. 9, 2020, now abandoned.

(60) Provisional application No. 63/129,014, filed on Dec. 22, 2020, provisional application No. 63/113,714, filed on Nov. 13, 2020, provisional application No. 63/105,486, filed on Oct. 26, 2020.

(51) Int. Cl.
| | |
|---|---|
| *G01S 15/89* | (2006.01) |
| *G01S 17/86* | (2020.01) |
| *G01S 17/894* | (2020.01) |
| *G06T 7/00* | (2017.01) |
| *G06T 7/521* | (2017.01) |

(52) U.S. Cl.
CPC ............ *G01S 17/86* (2020.01); *G01S 17/894* (2020.01); *G06T 7/0012* (2013.01); *G06T 7/521* (2017.01); *G06T 2207/10064* (2013.01); *G06T 2207/10081* (2013.01); *G06T 2207/10088* (2013.01); *G06T 2207/10104* (2013.01); *G06T 2207/10116* (2013.01); *G06T 2207/10136* (2013.01)

(58) Field of Classification Search
CPC .. H04N 13/296; H04N 13/302; H04N 13/398; H04N 5/232941; H04N 5/2258; H04N 23/63; H04N 5/2628; H04N 13/111; H04N 13/254; H04N 13/31; H04N 23/45; H04N 23/57; H04N 5/2226; G06T 7/593; G06T 7/0012; G06T 7/521; G06T 2207/10064; G06T 2207/10081; G06T 2207/10088; G06T 2207/10104; G06T 2207/10116; G06T 2207/10136; G01S 15/86; G01S 15/8993; G01S 17/86; G01S 17/894; G01S 7/20; G01S 7/51; G01S 13/885; G01S 15/89; G01S 17/89; G06F 1/1686; G06F 1/1626
USPC ............................................. 348/43; 382/154
See application file for complete search history.

(56) References Cited

U.S. PATENT DOCUMENTS

| | | | |
|---|---|---|---|
| 3,960,563 A | 6/1976 | Lo et al. | |
| 4,037,950 A * | 7/1977 | Lo ........................ | G03B 35/00 352/58 |
| 4,063,265 A | 12/1977 | Lo et al. | |
| 4,086,585 A | 4/1978 | Lo et al. | |
| 4,124,291 A | 11/1978 | Lo et al. | |
| D264,343 S | 5/1982 | Che | |
| 5,786,909 A | 7/1998 | Miyawaki et al. | |
| 6,060,003 A | 5/2000 | Karszes | |
| 6,709,080 B2 | 3/2004 | Nims et al. | |
| 7,019,865 B2 | 3/2006 | Nims et al. | |
| 7,136,185 B2 | 11/2006 | Goggins | |
| 7,298,869 B1 * | 11/2007 | Abernathy ............ | G06V 10/98 324/330 |
| 7,639,838 B2 | 12/2009 | Nims | |
| 8,136,938 B2 | 3/2012 | Karszes et al. | |
| 9,087,405 B2 | 7/2015 | Seitz et al. | |
| 9,389,415 B2 | 7/2016 | Fattal et al. | |
| 9,992,473 B2 | 6/2018 | Nims et al. | |
| 10,015,478 B1 | 7/2018 | Hoffberg | |
| 10,033,990 B2 | 7/2018 | Nims et al. | |
| 10,178,247 B2 | 1/2019 | Nims et al. | |
| 2002/0167679 A1 | 11/2002 | Nims et al. | |
| 2003/0120298 A1 | 6/2003 | Gildenberg | |
| 2006/0023197 A1 * | 2/2006 | Joel ........................ | G03B 35/24 355/77 |
| 2010/0295915 A1 | 11/2010 | Karszes et al. | |
| 2011/0001797 A1 | 1/2011 | Cookson et al. | |
| 2011/0037997 A1 | 2/2011 | Karszes et al. | |
| 2011/0098083 A1 * | 4/2011 | Lablans ................ | G03B 35/00 455/556.1 |
| 2012/0113100 A1 * | 5/2012 | Niioka .................. | G02B 30/27 345/419 |
| 2012/0120331 A1 * | 5/2012 | Oka ........................ | G02B 30/28 349/15 |
| 2012/0139906 A1 | 6/2012 | Zhang et al. | |
| 2012/0242794 A1 | 9/2012 | Park et al. | |
| 2013/0182078 A1 | 7/2013 | Kitaura | |
| 2013/0242235 A1 | 9/2013 | Wei et al. | |
| 2014/0125655 A1 | 5/2014 | Kunath et al. | |
| 2014/0146046 A1 | 5/2014 | Coombe et al. | |
| 2015/0066465 A1 | 3/2015 | Deschamps et al. | |
| 2015/0358539 A1 | 12/2015 | Catt | |
| 2016/0029008 A1 | 1/2016 | Prechtl | |
| 2016/0090825 A1 | 3/2016 | Imhof et al. | |
| 2016/0147067 A1 | 5/2016 | Hua et al. | |
| 2016/0227184 A1 * | 8/2016 | Nims .................... | H04N 13/194 |
| 2016/0227185 A1 * | 8/2016 | Nims .................... | H04N 13/128 |
| 2017/0109940 A1 | 4/2017 | Guo et al. | |
| 2017/0359525 A1 * | 12/2017 | Weil ...................... | G06T 7/0004 |
| 2017/0364752 A1 | 12/2017 | Zhou et al. | |
| 2018/0182174 A1 | 6/2018 | Choi | |
| 2018/0288241 A1 | 10/2018 | Nims et al. | |
| 2019/0049574 A1 * | 2/2019 | Simula .................. | B64C 39/024 |
| 2019/0082110 A1 * | 3/2019 | Jin ........................ | H04N 5/23296 |
| 2019/0082114 A1 * | 3/2019 | Jeon ...................... | H04N 5/23241 |
| 2019/0089940 A1 | 3/2019 | Zhang et al. | |
| 2019/0313085 A1 * | 10/2019 | Trevor .................. | H04N 13/139 |
| 2019/0373246 A1 | 12/2019 | Lo | |
| 2019/0394441 A1 | 12/2019 | Simek et al. | |
| 2020/0020075 A1 * | 1/2020 | Khwaja .................. | G06T 5/002 |
| 2020/0082597 A1 | 3/2020 | Ackerson et al. | |
| 2020/0105003 A1 | 4/2020 | Stauber et al. | |
| 2020/0195905 A1 | 6/2020 | Luo | |
| 2020/0267328 A1 * | 8/2020 | Jeung .................... | H05K 1/181 |
| 2020/0275031 A1 * | 8/2020 | Park ...................... | H04N 13/243 |
| 2020/0278602 A1 * | 9/2020 | Rhee .................... | H04N 5/23245 |
| 2020/0301036 A1 | 9/2020 | Ramfjord et al. | |
| 2021/0120172 A1 | 4/2021 | Nishimura | |
| 2022/0078392 A1 | 3/2022 | Nims et al. | |

FOREIGN PATENT DOCUMENTS

| | | |
|---|---|---|
| EP | 3694208 | 8/2020 |
| WO | WO2002052423 | 7/2002 |
| WO | WO2006115470 | 11/2006 |
| WO | WO2014058978 | 4/2014 |
| WO | WO2016/191467 | 12/2016 |
| WO | WO2017039825 | 3/2017 |
| WO | 2020161560 | 8/2020 |

OTHER PUBLICATIONS

Office Action issued on Apr. 4, 2022 in corresponding U.S. Appl. No. 17/333,721.

Office Action issued on Apr. 4, 2022 in corresponding U.S. Appl. No. 17/333,812.

(56) References Cited

OTHER PUBLICATIONS

International Search Report and Written Opinion dated Mar. 17, 2022, in corresponding International Application No. PCT/US2021/059165.
International Search Report issued on Sep. 23, 2022 in corresponding International Application No. PCT/US2022325515.
International Search Report issued on Sep. 28, 2022 in corresponding International Application No. PCT/US2022032524.
Office Action issued on Oct. 21, 2022 in corresponding U.S. Appl. No. 17/459,067.
Future Car, Magneti Marelli Named a 2020 PACEpilot Award Honoree for its 3D Instrument Cluster Display, accessed: https://www.futurecar.com/3904/Magneti-Marelli-Named-a-2020-PACEpilot-Award-Honoree-for-its-3D-Instrument-Cluster-Display (2020), 3 pgs.
Leia Inc., "Lume Pad 3D Lightfield Tablet", accessed: https://www.leiainc.com/, (2021) 5 pgs.
Srinivasa et al. NPL "VR Content Capture Using Aligned Smartphones", 2018, 15th IEEE India, 6 pgs.
International Search Report dated Sep. 9, 2021 for corresponding International Application No. PCT/US2021/034832.
International Search Report dated Sep. 9, 2021 for corresponding International Application No. PCT/US2021/034853.
International Search Report dated Sep. 30, 2021 for corresponding International Application No. PCT/US2021/038677.
Ztab 10—Android Tablet, Model T10_FHD, Idea International Group (Hong Kong) Ltd., www.ideaworldhk.com (China), Apr. 2, 2018 (see attached Tablets Disclosure, #1 for image).
Flight Deck—Android Tablet, Model A6100, Commander 3D (Canada), 2016 (see attached Tablets Disclosure, #2 for image).
Stevenson et al., Designing a Horizontal Image Translation Algorithm for Use with Dynamic Stereographical Virtual Worlds, UWEC Office of Research and Sponsored Programs (2009), 12 pgs.
International Search Report dated Dec. 1, 2021 for corresponding International Application No. PCT/US2021/47907.
International Search Report and Written Opinion issued in corresponding International Application No. PCT/US2021/056721 mailed Jan. 28, 2022.
Gonzaga et al. IEEE Geoscience and remote sening magazine. A Multioutcrop Sharing and Interpretation System: Exploring 3-D Surface and Subsurface Data. Jul. 18, 2018 [retrieved on Dec. 30, 2021]. Retrieved from the Internet: <URL:https://ieeexplore.ieee.org/document/8412783> pp. 9-16.

\* cited by examiner

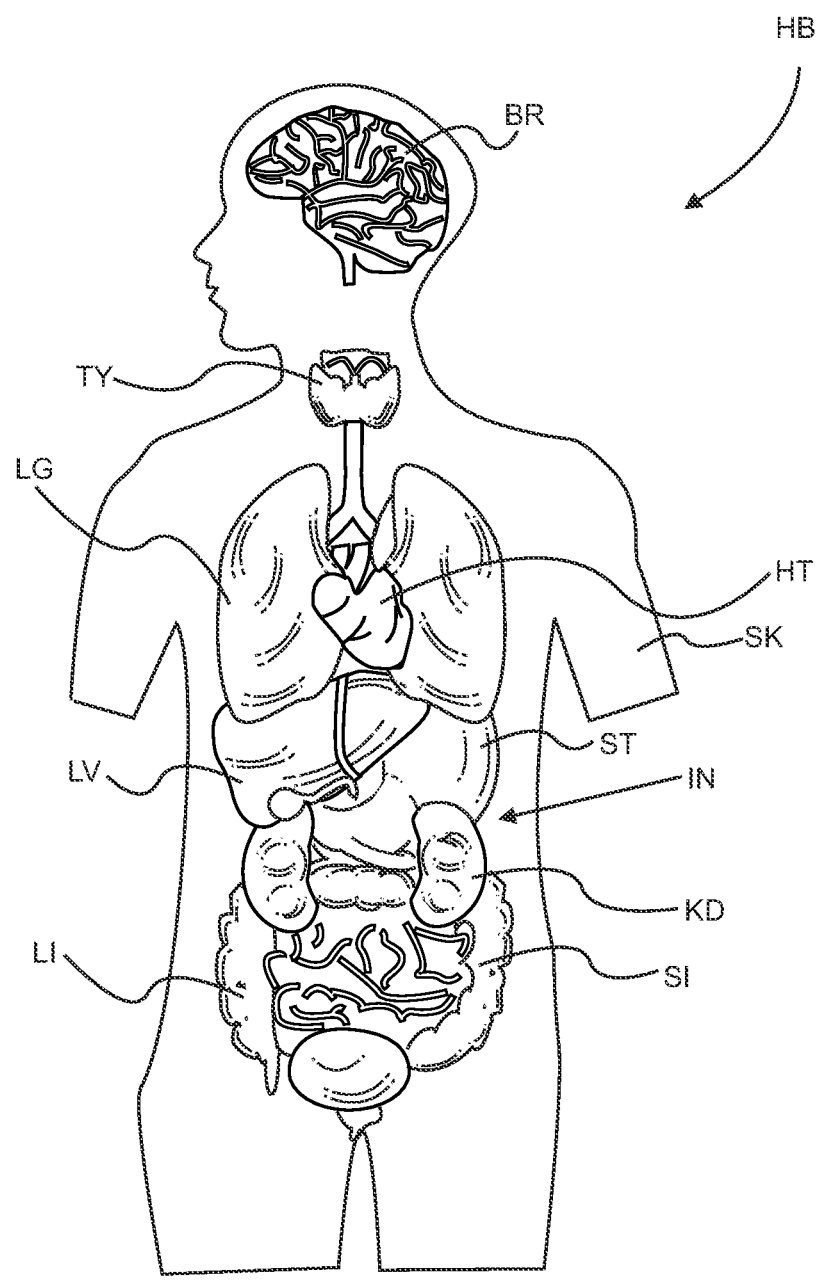
Fig. 4A1

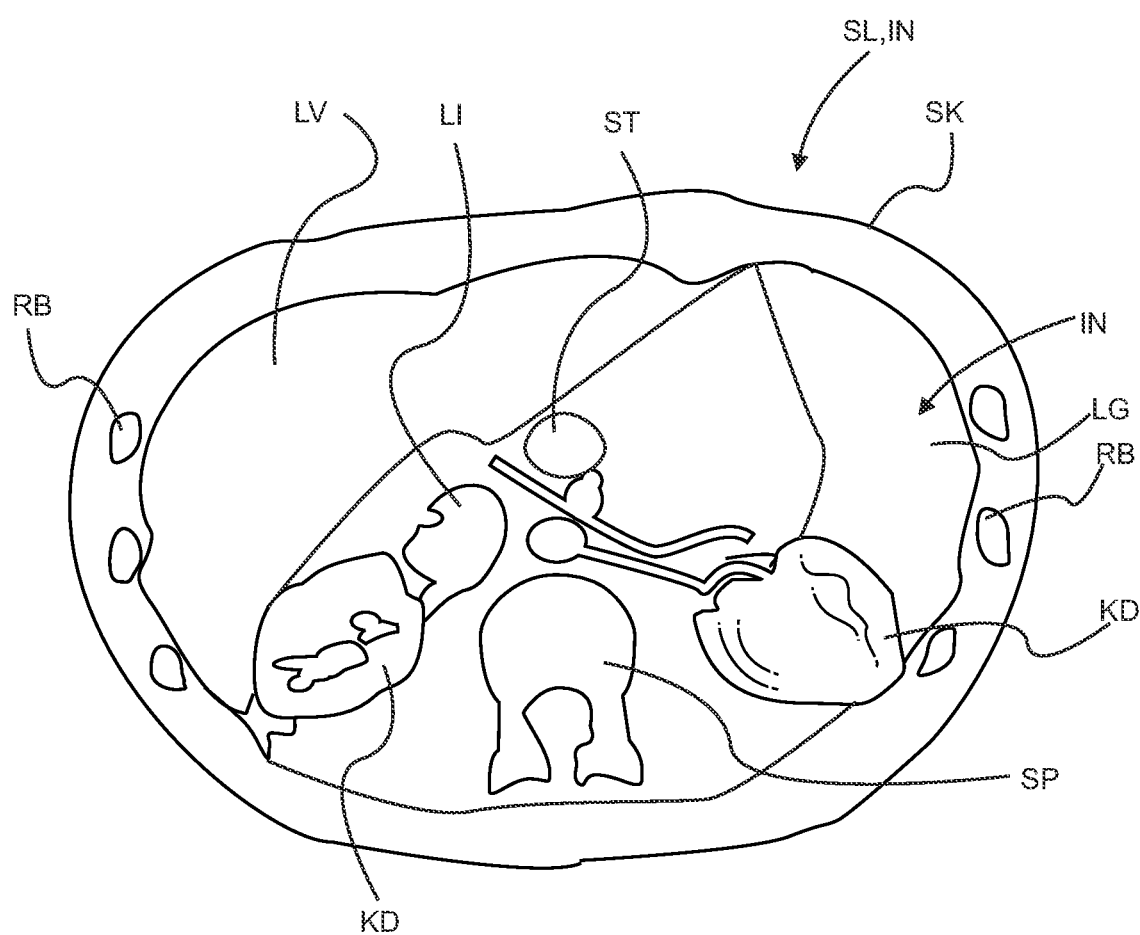
Fig. 4A2

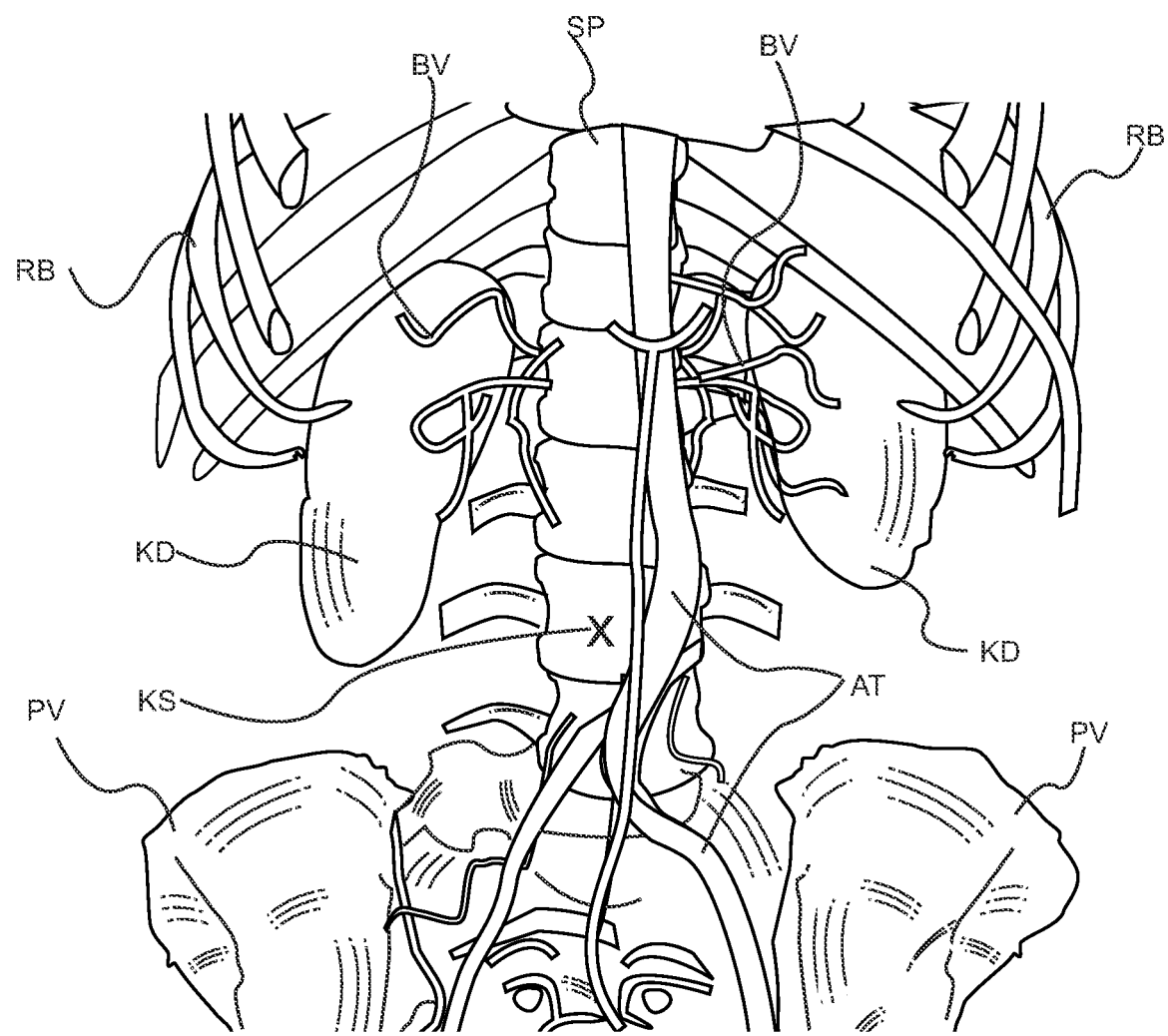
Fig. 4A3

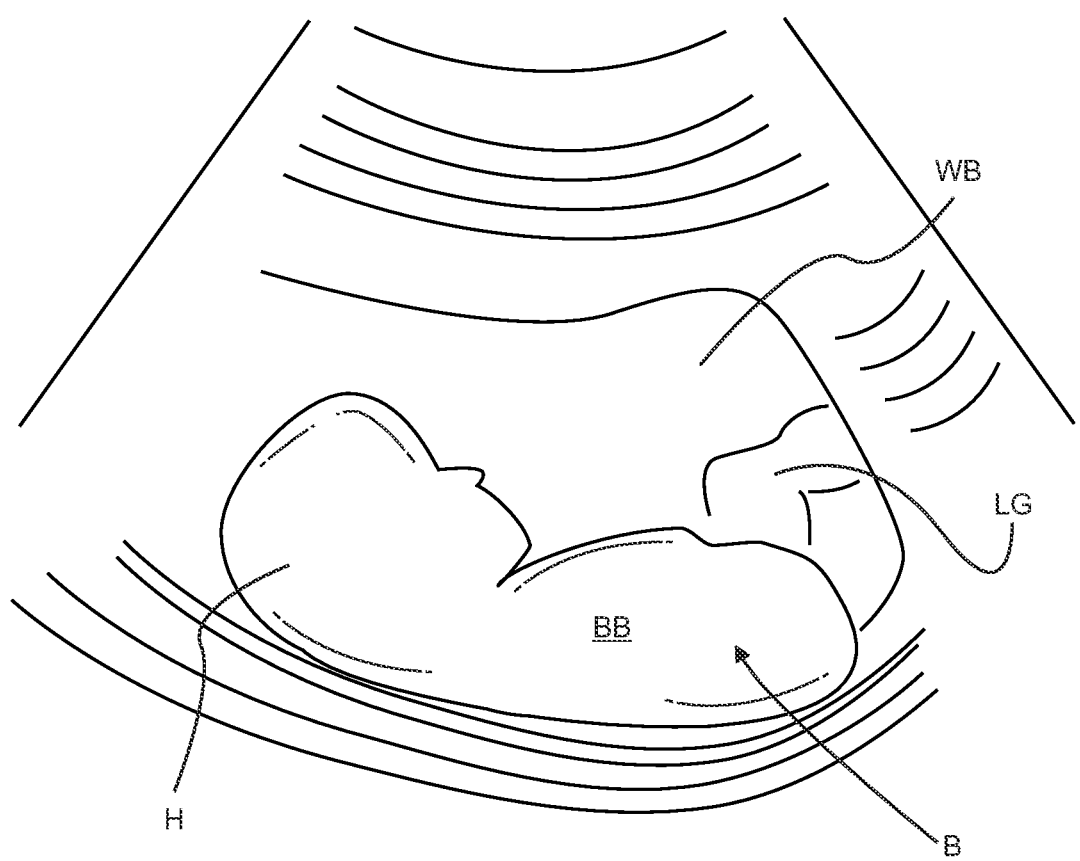
Fig. 4A4

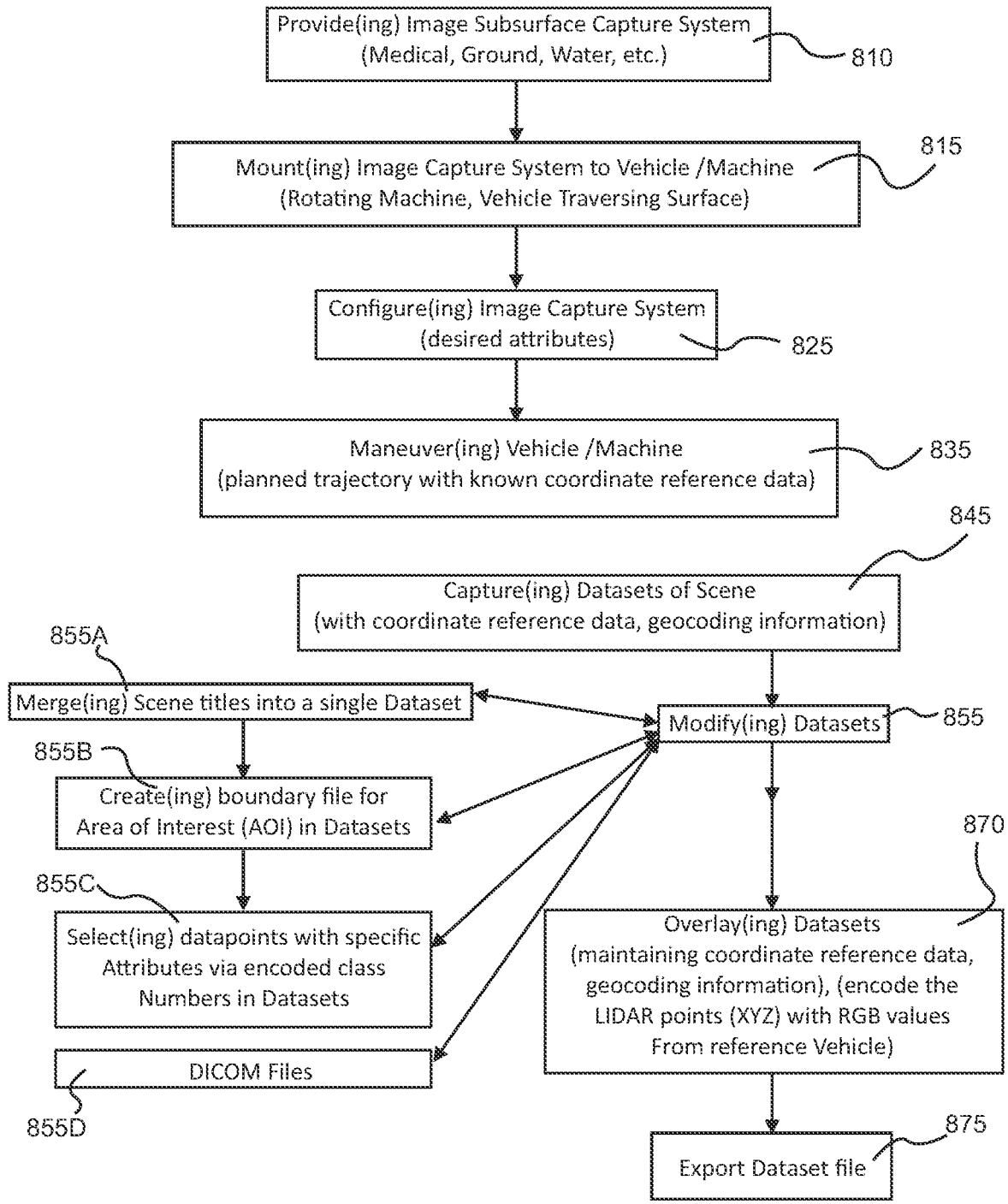
Fig. 8D1

| ROI example | Parallax total | Stereo Pair Frames |
|---|---|---|
| Abdomen | 4° | -1 and 2 |
| Knee, Shoulder, Brain | 3° | -1 and 1 |
| Sinus, Wrist | 2° | -1 and 0 |

Fig. 8D2

| Substance | HU |
|---|---|
| Air | -1000 |
| Lung | -500 |
| Fat | -100 to -50 |
| Water | 0 |
| Blood | +30 to +70 |
| Muscle | +10 to +40 |
| Live | +40 to +60 |
| Bone | +700 (cancellous bone) to +3000 (cortical bone) |

Fig. 8D3

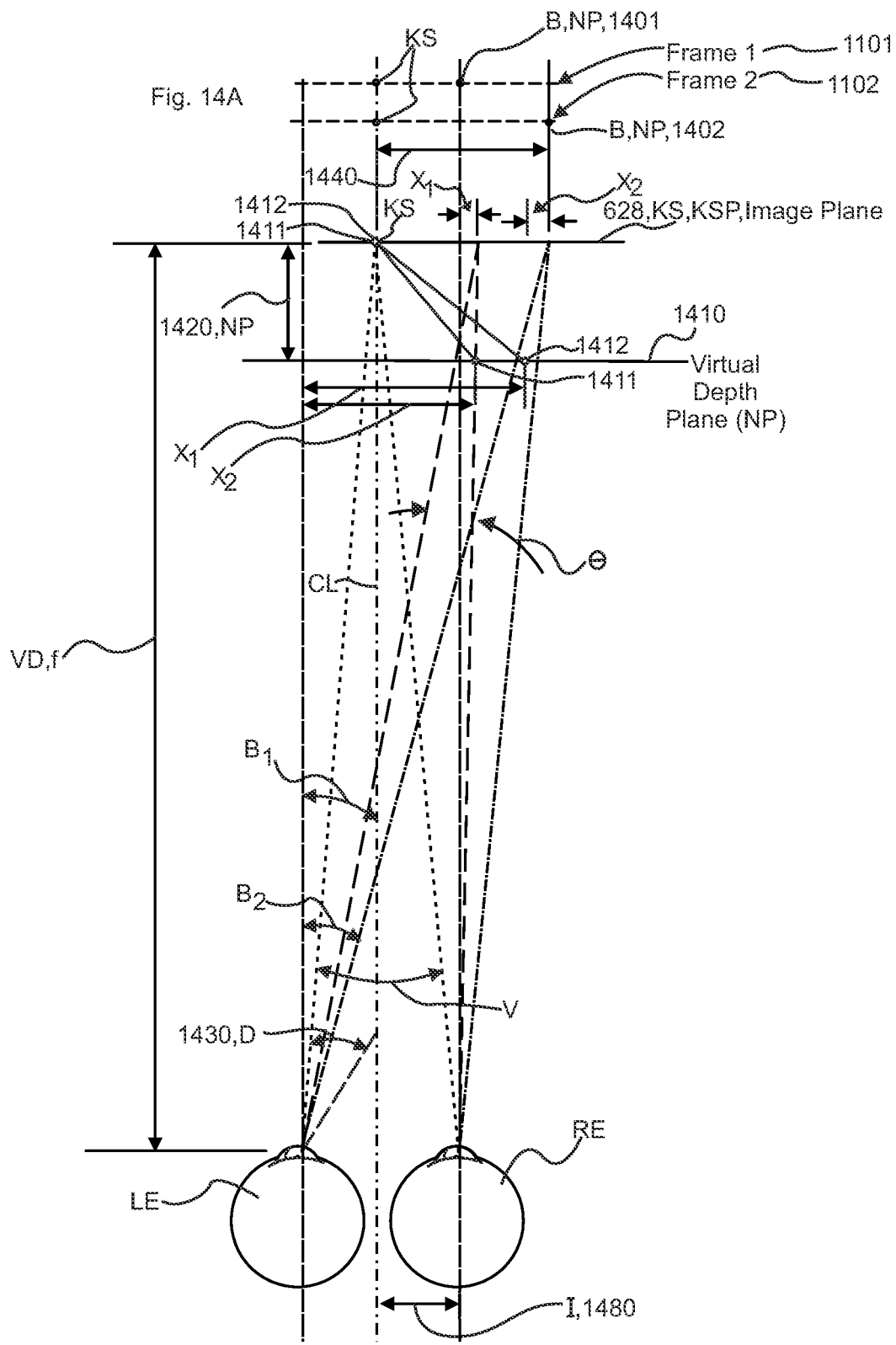

SUBSURFACE IMAGING AND DISPLAY OF 3D DIGITAL IMAGE AND 3D IMAGE SEQUENCE

CROSS-REFERENCE To RELATED APPLICATIONS

To the full extent permitted by law, the present United States Non-Provisional Patent Application claims priority to and the full benefit of U.S. Provisional Application No. 63/105,486, filed on Oct. 26, 2020 entitled "SMART DEVICE IMAGE CAPTURE SYSTEM, APP & DISPLY OF STEREO DIGITAL MULTI-DIMENSIONAL IMAGE" (CPA9); U.S. Provisional Application No. 63/113,714, filed on Nov. 13, 2020 entitled "SMART DEVICE IMAGE CAPTURE SYSTEM, APP & DISPLAY OF DIFY DIGITAL MULTI-DIMENSIONAL IMAGE SEQUENCE" (CPA10); and U.S. Provisional Application No. 63/129,014, filed on Dec. 22, 2020 entitled "GENERATING A 3-D IMAGE FROM A SEQUENCE OF 2-D IMAGE FRAMES AND METHODS OF USE" (CPA11). This application is also a continuation-in-part of U.S. Non-Provisional application Ser. No. 17/333,721, filed on May 28, 2021, entitled "2D IMAGE CAPTURE SYSTEM & DISPLAY OF 3D DIGITAL IMAGE" (RA4) and of U.S. Non-Provisional application Ser. No. 17/355,906, filed on Jun. 23, 2021, entitled "2D DIGITAL IMAGE CAPTURE SYSTEM AND SIMULATING 3D DIGITAL IMAGE SEQUENCE" (RA5), and U.S. Non-Provisional application Ser. No. 17/459,067, filed on Aug. 27, 2021, entitled "VEHICLE TERRAIN CAPTURE SYSTEM AND DISPLAY OF 3D DIGITAL IMAGE AND 3D SEQUENCE" (RA9). This application is also a continuation-in-part of U.S. Design patent applicaiton Ser. No. 29/720,105, filed on Jan. 9, 2020 entitled "LINEAR INTRAOCULAR WIDTH CAMERAS" (DA); U.S. Design patent application Ser. No. 29/726,221, filed on Mar. 2, 2020 entitled "INTERPUPILLARY DISTANCE WIDTH CAMERAS" (DA2); U.S. Design patent application Ser. No. 29/728,152, filed on Mar. 16, 2020, entitled "INTERPUPILLARY DISTANCE WIDTH CAMERAS" (DA3); U.S. Design patent application Ser. No. 29/733,453, filed on May 1, 2020, entitled "INTERPUPILLARY DISTANCE WIDTH CAMERAS 11 PRO" (DA4); U.S. Design patent application Ser. No. 29/778,683, filed on Apr. 14, 2021 entitled "INTERPUPILLARY DISTANCE WIDTH CAMERAS BASIC" (DA5). This application is related to International Application No. PCT/IB2020/050604, filed on Jan. 27, 2020, entitled "Method and System for Simulating a 3-Dimensional Image Sequence". The foregoing is incorporated herein by reference in their entirety.

FIELD OF THE DISCLOSURE

The present disclosure is directed to 2D and 3D model image capture from imaging diagnostic tools, simulating display of a 3D or multi-dimensional image sequence, and viewing 3D or multi-dimensional image.

BACKGROUND

The human visual system (HVS) relies on two dimensional images to interpret three dimensional fields of view. By utilizing the mechanisms with the HVS we create images/scenes that are compatible with the HVS.

Mismatches between the point at which the eyes must converge and the distance to which they must focus when viewing a 3D image have negative consequences. While 3D imagery has proven popular and useful for movies, digital advertising, many other applications may be utilized if viewers are enabled to view 3D images without wearing specialized glasses or a headset, which is a well-known problem. Misalignment in these systems results in jumping images, out of focus, or fuzzy features when viewing the digital multidimensional images. The viewing of these images can lead to headaches and nausea.

In natural viewing, images arrive at the eyes with varying binocular disparity, so that as viewers look from one point in the visual scene to another, they must adjust their eyes' vergence. The distance at which the lines of sight intersect is the vergence distance. Failure to converge at that distance results in double images. The viewer also adjusts the focal power of the lens in each eye (i.e., accommodates) appropriately for the fixated part of the scene. The distance to which the eye must be focused is the accommodative distance. Failure to accommodate to that distance results in blurred images. Vergence and accommodation responses are coupled in the brain, specifically, changes in vergence drive changes in accommodation and changes in accommodation drive changes in vergence. Such coupling is advantageous in natural viewing because vergence and accommodative distances are nearly always identical.

In 3D images, images have varying binocular disparity thereby stimulating changes in vergence as happens in natural viewing. But the accommodative distance remains fixed at the display distance from the viewer, so the natural correlation between vergence and accommodative distance is disrupted, leading to the so-called vergence-accommodation conflict. The conflict causes several problems. Firstly, differing disparity and focus information cause perceptual depth distortions. Secondly, viewers experience difficulties in simultaneously fusing and focusing on key subject within the image. Finally, attempting to adjust vergence and accommodation separately causes visual discomfort and fatigue in viewers.

Perception of depth is based on a variety of cues, with binocular disparity and motion parallax generally providing more precise depth information than pictorial cues. Binocular disparity and motion parallax provide two independent quantitative cues for depth perception. Binocular disparity refers to the difference in position between the two retinal image projections of a point in 3D space.

Conventional stereoscopic displays forces viewers to try to decouple these processes, because while they must dynamically vary vergence angle to view objects at different stereoscopic distances, they must keep accommodation at a fixed distance or else the entire display will slip out of focus. This decoupling generates eye fatigue and compromises image quality when viewing such displays.

Recently, a subset of photographers is utilizing 1980s cameras such as NIMSLO and NASHIKA 35 mm analog film cameras or digital camera moved between a plurality of points to take multiple frames of a scene, develop the film of the multiple frames from the analog camera, upload images into image software, such as PHOTOSHOP, and arrange images to create a wiggle gram, moving GIF effect.

X-ray image quality has changed little since Tesla built his x-ray prototype in 1896.

Therefore, it is readily apparent that there is a recognizable unmet need for a system having a 2D digital image and 3D model image capture system of from subsurface imaging diagnostic tools, image manipulation application, display of 3D digital image sequence/ display of 3D or digital multi-dimensional image that may be configured to address at least some aspects of the problems discussed above.

SUMMARY

Briefly described, in an example embodiment, the present disclosure may overcome the above-mentioned disadvantages and may meet the recognized need for an imaging diagnostic tool to capture a plurality of datasets, including layered image information, density of scanned material, substructure, subsurface elements, other characteristics and the like, including a smart device having a memory device for storing an instruction, a processor in communication with the memory and configured to execute the instruction, one or more wave generating devices and one or more sensors, antenna, or capture devices in communication with the processor and each capture device configured to capture its dataset of the layered information, the plurality of wave generating devices and capture devices may be stationary or affixed to the vehicle, the vehicle traverses the terrain or ocean in a designated pattern, processing steps to configure datasets, image manipulation techniques, and a display configured to display a simulated multidimensional digital dataset or image sequence and/or a multidimensional digital dataset or image.

Accordingly, a feature of the system and methods of use is its ability to capture a plurality of datasets of an animal or human using image diagnostic tools, such as an magnetic resonance imaging (MRI) uses magnetic fields and radio waves to create detailed images of organs and tissues in the body, x-ray (X-Ray) uses ionizing radiation to produce images of the structures inside the body, such as bones, computerized tomography (CT) and computerized axial tomography (CT/CAT) uses a series of x-rays to create a series of cross-sections of the body including bones, blood vessels, and soft tissue , positron emission tomography (PET) uses radioactive drugs (tracers) and a scanning machine to show your tissues and organs are functioning, bone densitometry (DEXA), Fluoroscopy, ultrasound uses high-frequency sound waves to produce images of organs and substructures within the body, land, ocean and the like.

Accordingly, a feature of the system and methods of use is its ability to capture a plurality of datasets of substructure, mineral, oil, and gas deposits using image diagnostic tools, such as ultrasound uses high-frequency sound waves focused into the subsurface to produce images of substructure, substructure of ocean, underground utilities such as concrete, asphalt, metals, pipes, cables or masonry, mineral, oil, and gas deposits therein and ground-penetrating radar (GPR) that uses radar pulses in the microwave band (UHF/VHF frequencies) of the radio spectrum focused into the subsurface to produce images of substructure, substructure of ocean, underground utilities such as concrete, asphalt, metals, pipes, cables or masonry, mineral, oil, and gas deposits therein.

Accordingly, a feature of the system and methods of use is its ability to utilize image manipulation techniques to convert input 2D source images into multi-dimensional/multi-spectral image sequence. The output image follows the rule of a "key subject point" maintained within an optimum parallax to maintain a clear and sharp into multi-dimensional/multi-spectral image sequence.

Accordingly, a feature of the system and methods of use is the ability to integrate viewing devices or other viewing functionality into the display, such as barrier screen (black line), lenticular, arced, curved, trapezoid, parabolic, overlays, waveguides, black line and the like with an integrated LCD layer in an LED or OLED, LCD, OLED, and combinations thereof or other viewing devices.

Another feature of the digital multi-dimensional image platform based system and methods of use is the ability to produce digital multi-dimensional images that can be viewed on viewing screens, such as mobile and stationary phones, smart phones (including iPhone), tablets, computers, laptops, monitors and other displays and/or special output devices, directly without 3D glasses or a headset.

In an exemplary embodiment a system to simulate a 3D image of a subsurface below a surface, the system having a memory device for storing an instruction, a processor in communication with the memory device configured to execute the instruction, and a subsurface image capture module in communication with the processor, the subsurface image capture module having one or more wave generating device and one or more sensor affixed to a vehicle to capture a series of digital image datasets of the subsurface with a coordinate reference data, wherein the processor executes an instruction to generate a digital model of the series of digital image datasets of the subsurface while maintaining the coordinate reference data, wherein the processor executes an instruction to determine a depth map of the digital model, and wherein the processor executes an instruction to identify a key subject point in the digital model, where subsurface includes an internal biology, ground area, underwater, and the like.

In another exemplary embodiment of a method of generating a 3D image of a subsurface below a surface, the method having the steps of providing a vehicle having a geocoding detector to identify coordinate reference data of said vehicle, said vehicle to traverse the surface, a memory device for storing an instruction, a processor in communication with said memory device configured to execute said instruction, and a subsurface image capture module in communication with said processor, said subsurface image capture module having one or more wave generating device and one or more sensor affixed to said vehicle to capture a series of digital image datasets of the subsurface with a coordinate reference data, executing an instruction via said processor to generate a digital model of said series of digital image datasets of the subsurface while maintaining said coordinate reference data, executing an instruction via said processor to determine a depth map of said digital model, and executing an instruction via said processor to identify a key subject point in said digital model.

A feature of the present invention is the ability to create multidimensional digital images and multidimensional digital image sequences for subsurface or below surface viewing of animals, plants, insects, microorganisms, cells, molecules, sub particles, humans, and the like to produce 3D images of organs and substructures within the body for improved diagnostic, new patient information with added security and encryption capabilities.

A feature of the present invention is the ability to create multidimensional digital images and multidimensional digital image sequences for subsurface or below surface viewing of earth, soil, and oceans to produce images of substructure and subsurface of ocean, underground utilities such as concrete, asphalt, metals, pipes, cables or masonry, mineral, oil, and gas deposits therein and the like.

A feature of the present disclosure is the ability to create a 3D model, point cloud, or mesh of the subsurface using layers or slices of the subsurface captured using one or more wave generating devices and one or more sensors, antenna, or capture devices capturing a subsurface dataset.

A feature of the present disclosure is the ability to generate stereo pairs of images from two viewing points along an arc or line of 3D model of the subsurface for viewing a multidimensional digital image.

A feature of the present disclosure is the ability to generate a plurality of images from different viewing points along an arc or line of 3D model of the subsurface for viewing a multidimensional digital image sequence.

A feature of the present disclosure is the ability to overcome the above defects via another important parameter to determine the convergence point or key subject point, since the viewing of an image that has not been aligned to a key subject point causes confusion to the human visual system and results in blur and double images.

A feature of the present disclosure is the ability to select the convergence point or key subject point anywhere within an area of interest (AOI) between a closer plane and far or back plane, manual mode user selection.

A feature of the present disclosure is the ability to overcome the above defects via another important parameter to determine Circle of Comfort (CoC), since the viewing of an image that has not been aligned to the Circle of Comfort (CoC) causes confusion to the human visual system and results in blur and double images.

A feature of the present disclosure is the ability to overcome the above defects via another important parameter to determine Circle of Comfort (CoC) fused with Horopter arc or points and Panum area, since the viewing of an image that has not been aligned to the Circle of Comfort (CoC) fused with Horopter arc or points and Panum area causes confusion to the human visual system and results in blur and double images.

A feature of the present disclosure is the ability to overcome the above defects via another important parameter to determine gray scale depth map, the system interpolates intermediate points based on the assigned points (closest point, key subject point, and furthest point) in a subsurface dataset or scene, the system assigns values to those intermediate points and renders the sum to a gray scale depth map, wherein an auto mode key subject point may be selected as a midpoint thereof. The gray scale map to generate volumetric parallax using values assigned to the different points (closest point, key subject point, and furthest point) in a subsurface dataset or scene. This modality also allows volumetric parallax or rounding to be assigned to singular objects within a subsurface dataset or scene.

A feature of the present disclosure is its ability to measure depth or z-axis of objects or elements of objects and/or make comparisons based on known sizes of objects in a subsurface dataset or scene.

A feature of the present disclosure is its ability to utilize a key subject algorithm to manually or automatically select the key subject in a plurality of images of a subsurface dataset or scene displayed on a display and produce multi-dimensional digital image or multidimensional digital image sequence for viewing on a display.

A feature of the present disclosure is its ability to utilize an image alignment, horizontal image translation, or edit algorithm to manually or automatically horizontally align the plurality of images of a subsurface dataset or scene about a key subject for display.

A feature of the feature of the present disclosure is its ability to utilize an image translation algorithm to align the key subject point of two images or datasets of a subsurface for display.

A feature of the feature of the present disclosure is its ability to generate DIFYS (Differential Image Format) is a specific technique for obtaining multi-view of a subsurface dataset or scene and creating a series of image that creates depth without glasses or any other viewing aides. The system utilizes horizontal image translation along with a form of motion parallax to create 3D viewing. DIFYS are created by having different view of a single subsurface dataset or scene flipped by the observer's eyes. The views are captured by motion of one or more wave generating devices and one or more sensors, antenna, or capture devices capturing a subsurface dataset or scene with each of the devices within the array viewing at a different position.

In accordance with a first aspect of the present disclosure of simulating a 3D image or sequence of image from subsurface dataset, wherein a first proximal plane and a second distal plane is identified within each image frame in the sequence, and wherein each observation point maintains substantially the same first proximal image plane for each image frame; determining a depth estimate for the first proximal and second distal plane within each image frame in the sequence, aligning the first proximal plane of each image frame in the sequence and shifting the second distal plane of each subsequent image frame in the sequence based on the depth estimate of the second distal plane for each image frame, to produce a modified image frame and displaying the modified image frame or displaying sequentially.

The present disclosure varies the focus of objects at different planes in a displayed subsurface dataset or scene to match vergence and stereoscopic retinal disparity demands to better simulate natural viewing conditions. By adjusting the focus of key objects in a subsurface dataset or scene to match their stereoscopic retinal disparity, the cues to ocular accommodation and vergence are brought into agreement. As in natural vision, the viewer brings different objects into focus by shifting accommodation. As the mismatch between accommodation and vergence is decreased, natural viewing conditions are better simulated, and eye fatigue is decreased.

The present disclosure may be utilized to determine three or more planes for each image frame in the sequence.

Furthermore, it is preferred that the planes have different depth estimates.

In addition, it is preferred that each respective plane is shifted based on the difference between the depth estimate of the respective plane and the first proximal plane.

Preferably, the first, proximal plane of each modified image frame is aligned such that the first proximal plane is positioned at the same pixel space.

It is also preferred that the first plane comprises a key subject point.

Preferably, the planes comprise at least one foreground plane.

In addition, it is preferred that the planes comprise at least one background plane.

Preferably, the sequential observation points lie on a straight line.

In accordance with a second aspect of the present invention there is a non-transitory computer readable storage medium storing instructions, the instructions when executed by a processor causing the processor to perform the method according to the second aspect of the present invention.

A feature of the present disclosure is its ability to produce subsurface DIF (Dimensional Image Format) is an image format that allows viewing subsurface imagery sourced from for example DICOM files in 3D or stereoscopic without the need for glasses or headgear. The subsurface DIF presents a structured parallax view of the Z dimension or depth in a subsurface image.

The DIF results in an animated format that can be viewed on the desktops, tablets, laptops and other digital display devices.

A feature of the present disclosure is its ability to produce stereo pairs built in to the output sequence for true 3D using a barrier screen display for example. The approximate 1° separation between frames allows a variety of imaging distances and volumetric sizes to be rendered to stereo pairs. This allows stereo imaging of small areas such as the sinus cavity or cable fiber to larger areas including a full torso scan or oil and gas deposits.

These and other features of the smart device having one or more wave generating devices and one or more sensors, antenna, or capture devices, image manipulation application, & display of simulated 3D digital image sequence or 3D image will become more apparent to one skilled in the art from the prior Summary and following Brief Description of the Drawings, Detailed Description of exemplary embodiments thereof, and claims when read in light of the accompanying Drawings or Figures.

BRIEF DESCRIPTION OF THE DRAWINGS

The present disclosure will be better understood by reading the Detailed Description of the Preferred and Selected Alternate Embodiments with reference to the accompanying drawing Figures, in which like reference numerals denote similar structure and refer to like elements throughout, and in which:

FIG. 4A1 is a diagram identifying exemplary human body innards lying beneath the subsurface of the skin;

FIG. 4A2 is a diagram identifying an image slice of an exemplary human body innards lying beneath the subsurface of the skin;

FIG. 4A3 is a diagram identifying an exemplary reconstruction of the image slices into a model or mesh of an exemplary human body innards lying beneath the subsurface of the skin;

FIG. 4A4 is a diagram identifying an ultrasound image of a preborn baby in utero;

FIG. 8D1 is an exemplary embodiment of a flow diagram of a method of capturing and modifying capture image, file, dataset of terrain of scene for viewing as a multidimensional image(s) sequence and/or multidimensional image(s) utilizing capture devices shown in FIGS. 8A-8C;

FIG. 8D2 is a chart of an exemplary embodiment of recommended intervals between frames for different body parts;

FIG. 8D3 is a diagram of an exemplary embodiment of recommended intervals between frames for different body parts;

FIG. 10A is a top view illustration of an exemplary embodiment identifying right triangles to calculate the radius of the Circle of Comfort of FIG. 10;

FIG. 10B is a top view illustration of an exemplary embodiment identifying right triangles to calculate linear positioning of capture devices on lens plane of FIG. 10;

FIG. 14A is a top view illustration identifying two frames captured utilizing capture devices shown in FIGS. 8A-8D showing key subject aligned as shown in FIG. 11B and near plane object offset between two frames;

FIG. 14B is a top view illustration of an exemplary embodiment of left and right eye virtual depth via object offset between two frames of FIG. 14A;

FIG. 15B is a cross-section diagram of an exemplary embodiment of an arced or curved shaped lens according to select embodiments of the instant disclosure, tracing RGB light there through;

FIG. 15C is a cross-section diagram of a prototype embodiment of a trapezoid shaped lens according to select embodiments of the instant disclosure, tracing RGB light there through;

FIG. 15D is a cross-section diagram of an exemplary embodiment of a dome shaped lens according to select embodiments of the instant disclosure, tracing RGB light there through;

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in figures specific terminology is employed for the sake of clarity. The present disclosure, however, is not intended to be limited to the specific terminology so selected, and it is to be understood that each specific element includes all technical equivalents that operate in a similar manner to accomplish similar functions. The claimed invention may, however, be embodied in many different forms and should not be construed to be limited to the embodiments set forth herein. The examples set forth herein are non-limiting examples and are merely examples among other possible examples.

Figure 1A:
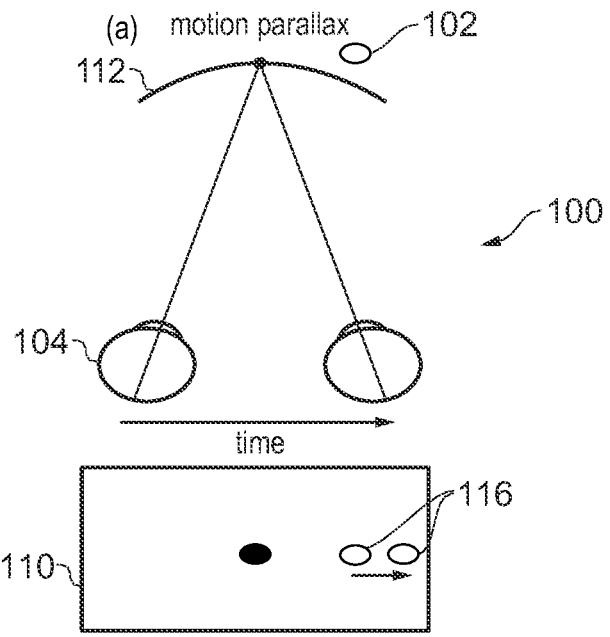
FIG. 1A illustrates a 2D rendering of an image based upon a change in orientation of an observer relative to a display.
Figure 1B:
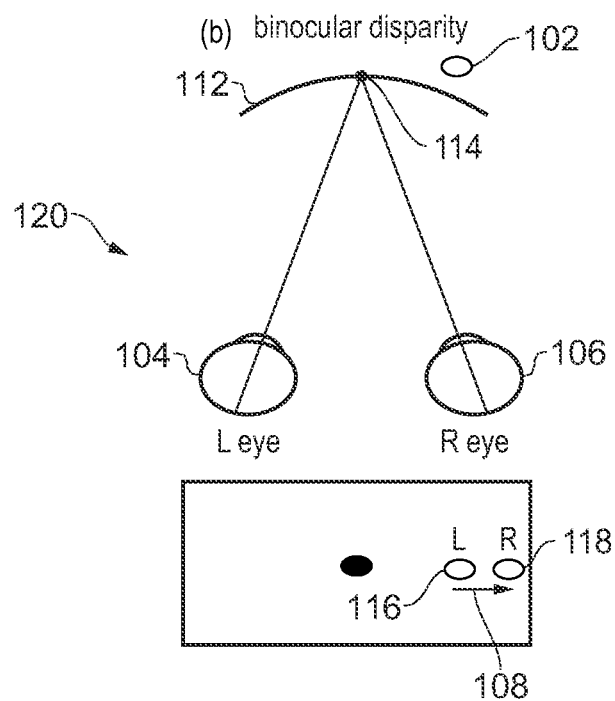
FIG. 1B illustrates a 2D rendering of an image with binocular disparity as a result of the horizontal separation parallax of the left and right eyes.

Perception of depth is based on a variety of cues, with binocular disparity and motion parallax generally providing more precise depth information than pictorial cues. Binocular disparity and motion parallax provide two independent quantitative cues for depth perception. Binocular disparity refers to the difference in position between the two retinal image projections of a point in 3D space. As illustrated in FIGS. 1A and 1B, the robust precepts of depth that are obtained when viewing an object 102 in an image scene 110 demonstrates that the brain can compute depth from binocular disparity cues alone. In binocular vision, the Horopter 112 is the locus of points in space that have the same disparity as the fixation point 114. Objects lying on a horizontal line passing through the fixation point 114 results in a single image, while objects a reasonable distance from this line result in two images 116, 118.

Classical motion parallax is dependent upon two eye functions. One is the tracking of the eye to the motion (eyeball moves to fix motion on a single spot) and the second is smooth motion difference leading to parallax or binocular disparity. Classical motion parallax is when the observer is stationary and the scene around the observer is translating or the opposite where the scene is stationary, and the observer translates across the scene.

By using two images 116, 118 of the same object 102 obtained from slightly different angles, it is possible to triangulate the distance to the object 102 with a high degree of accuracy. Each eye views a slightly different angle of the object 102 seen by the left eye 104 and right eye 106. This happens because of the horizontal separation parallax of the eyes. If an object is far away, the disparity 108 of that image 110 falling on both retinas will be small. If the object is close or near, the disparity 108 of that image 110 falling on both retinas will be large.

Motion parallax 120 refers to the relative image motion (between objects at different depths) that results from translation of the observer 104. Isolated from binocular and pictorial depth cues, motion parallax 120 can also provide precise depth perception, provided that it is accompanied by ancillary signals that specify the change in eye orientation relative to the visual scene 110. As illustrated, as eye orientation 104 changes, the apparent relative motion of the object 102 against a background gives hints about its relative distance. If the object 102 is far away, the object 102 appears stationary. If the object 102 is close or near, the object 102 appears to move more quickly.

In order to see the object 102 in close proximity and fuse the image on both retinas into one object, the optical axes of both eyes 104, 106 converge on the object 102. The muscular action changing the focal length of the eye lens so as to place a focused image on the fovea of the retina is called accommodation. Both the muscular action and the lack of focus of adjacent depths provide additional information to the brain that can be used to sense depth. Image sharpness is an ambiguous depth cue. However, by changing the focused plane (looking closer and/or further than the object 102), the ambiguities are resolved.

Figure 2A:
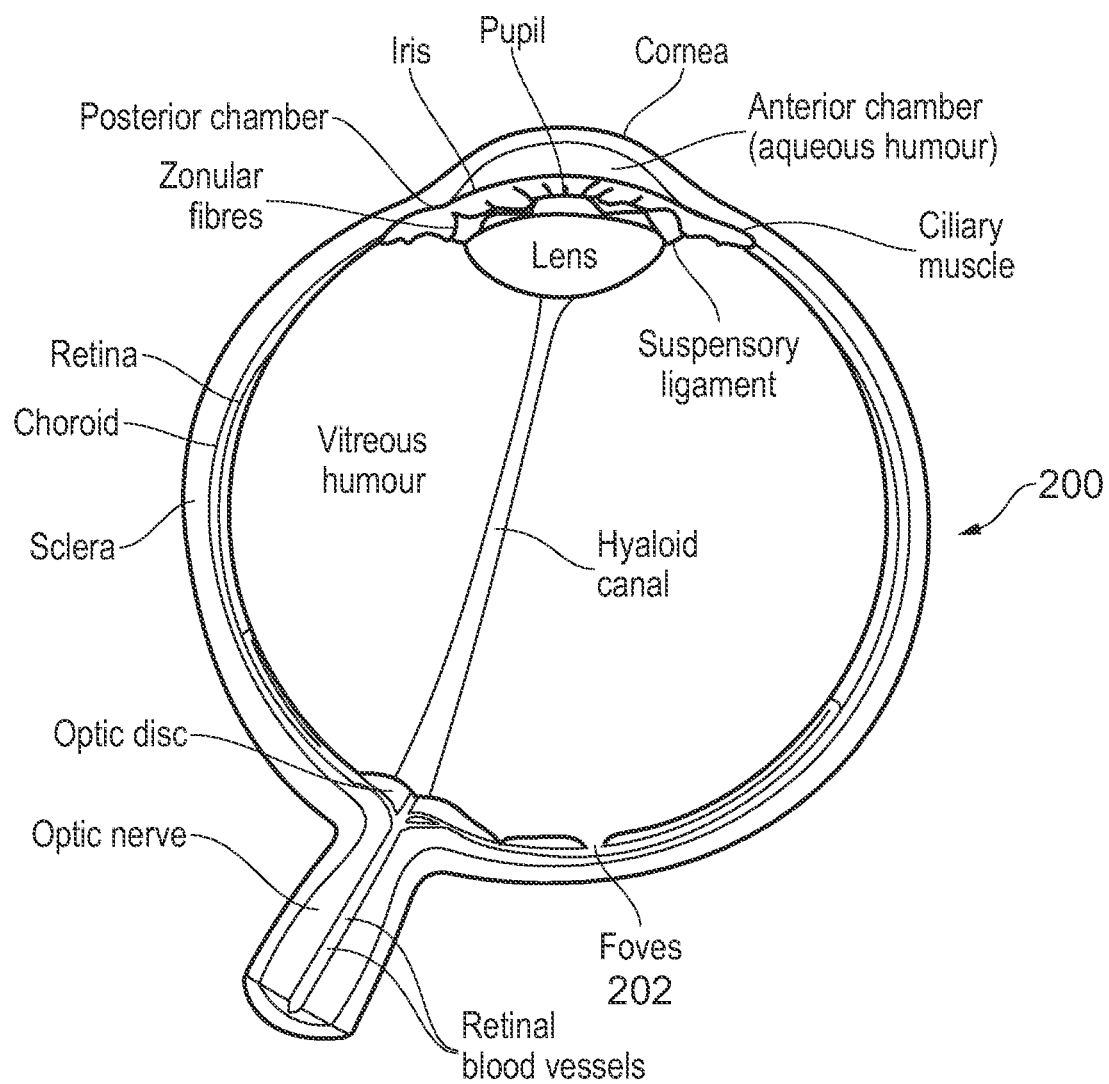
FIG. 2A is an illustration of a cross-section view of the structure of the human eyeball.
Figure 2B:
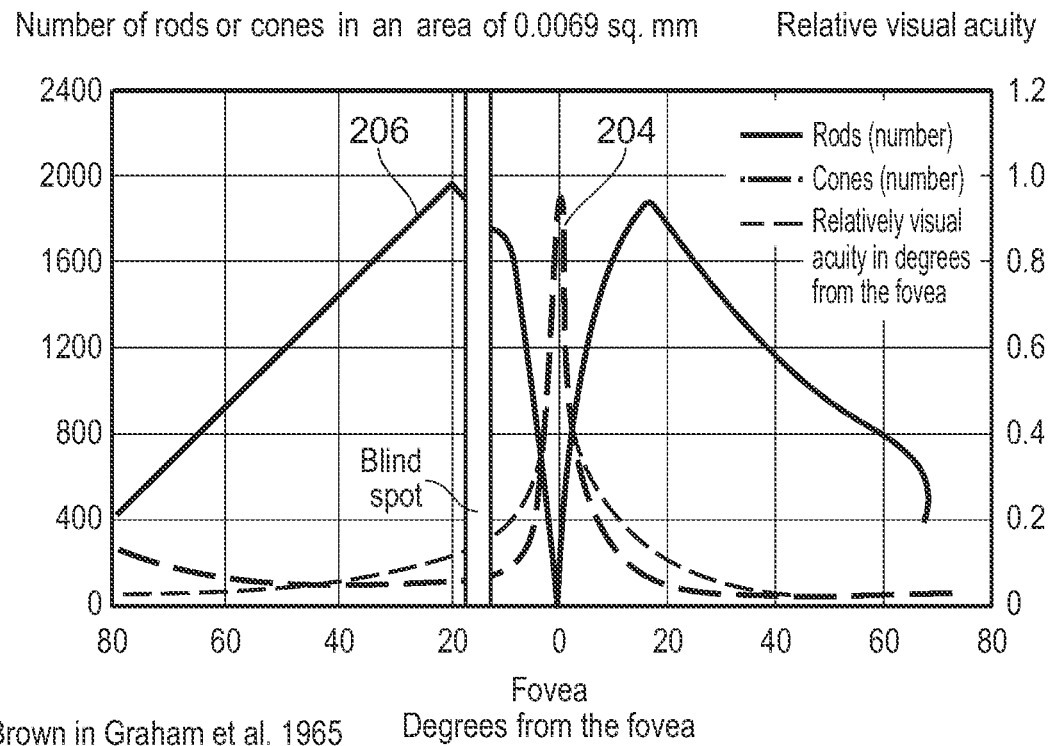
FIG. 2B is a graph relating density of rods and cones to the position of the fovea.

FIGS. 2A and 2B show the anatomy of the eye 200 and a graphical representation of the distribution of rods and cones, respectively. The fovea 202 is responsible for sharp central vision (also referred to as foveal vision), which is necessary where visual detail is of primary importance. The fovea 202 is the depression in the inner retinal surface 205, about 1.5 mm wide and is made up entirely of cones 204 specialized for maximum visual acuity. Rods 206 are low intensity receptors that receive information in grey scale and are important to peripheral vision, while cones 204 are high intensity receptors that receive information in color vision. The importance of the fovea 202 will be understood more clearly with reference to FIG. 2B, which shows the distribution of cones 204 and rods 206 in the eye 200. As shown, a large proportion of cones 204, providing the highest visual acuity, lie within a 1.5° angle around the center of the fovea 202.

The importance of the fovea 202 will be understood more clearly with reference to FIG. 2B, which shows the distribution of cones 204 and rods 206 in the eye 200. As shown, a large proportion of cones 204, providing the highest visual acuity, lie within a 1.5° angle around the center of the fovea 202.

Figure 3:
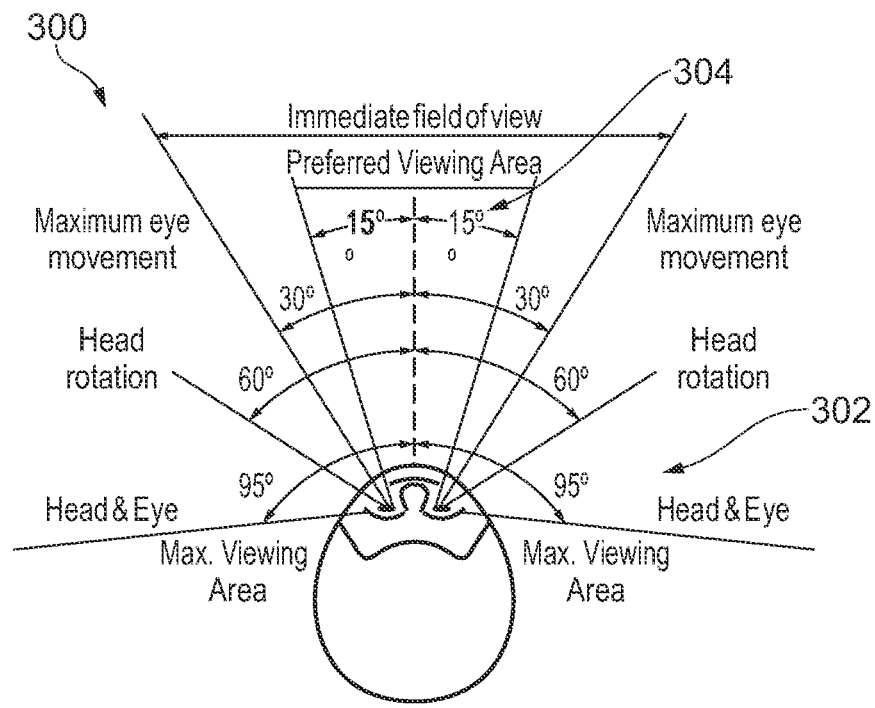
FIG. 3 is a top view illustration of an observer's field of view.

FIG. 3 illustrates a typical field of view 300 of the human visual system (HVS). As shown, the fovea 202 sees only the central 1.5° (degrees) of the visual field 302, with the preferred field of view 304 lying within ±15° (degrees) of the center of the fovea 202. Focusing an object on the fovea, therefore, depends on the linear size of the object 102, the viewing angle and the viewing distance. A large object 102 viewed in close proximity will have a large viewing angle falling outside the foveal vision, while a small object 102 viewed at a distance will have a small viewing angle falling within the foveal vision. An object 102 that falls within the foveal vision will be produced in the mind's eye with high visual acuity. However, under natural viewing conditions, viewers do not just passively perceive. Instead, they dynamically scan the visual scene 110 by shifting their eye fixation and focus between objects at different viewing distances. In doing so, the oculomotor processes of accommodation and vergence (the angle between lines of sight of the left eye 104 and right eye 106) must be shifted synchronously to place new objects in sharp focus in the center of each retina. Accordingly, nature has reflexively linked accommodation and vergence, such that a change in one process automatically drives a matching change in the other.

Figure 8A:
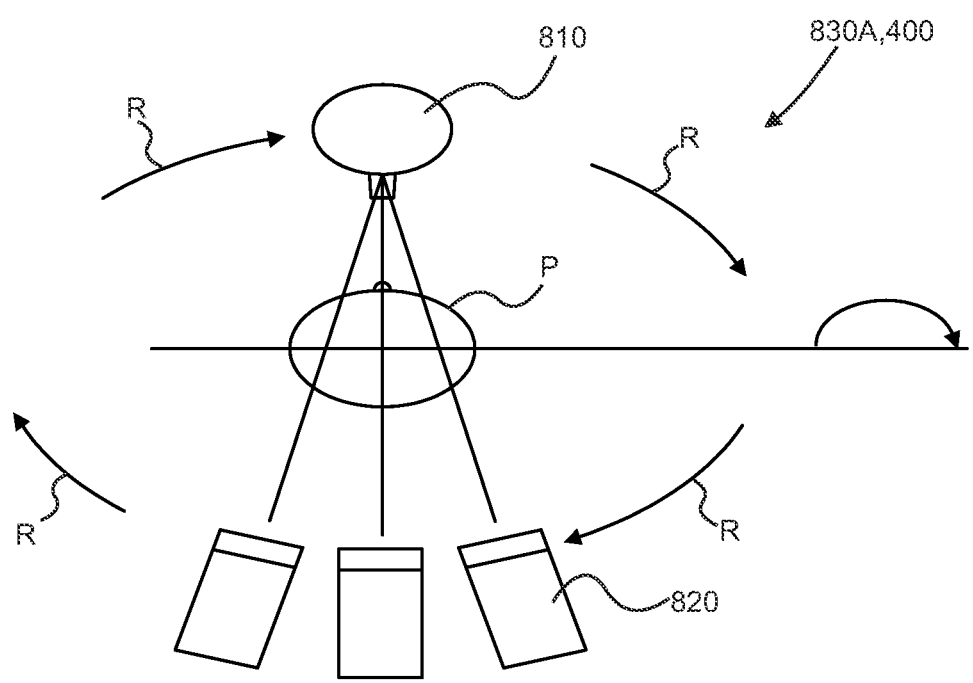
FIG. 8A is a diagram of an exemplary embodiment of one or more wave generating devices and one or more sensors, antenna, or capture devices to capture image, file, dataset of human body innards.

FIGS. 4A1 (human), 4A2 (slice SL) and 4A3 (model MD) illustrates a representative view of a subsurface SB image dataset, slice and model (series of slices) or diagram identifying human body HB innards IN lying beneath the subsurface of the skin SK, a diagram identifying an image slice SL of human body HB innards IN lying beneath the subsurface of the skin, and a diagram identifying a reconstruction of the image slices into a model or mesh MD of human body IIB innards IN lying beneath the subsurface of the skin SK to be captured by capture device(s), such as capture module 830A in FIG. 8A. Human body HB innards IN lying beneath the subsurface of the skin SK may include but not limited to body B, head H, organs, such as brain BR, Thyroid TY, lung LG, heart HT, skin SK (outer covering or surface), liver LV, stomach ST, kidney KD, large intestine LI, small intestine SI, spine SP, bone (pelvis PV), artery AT, blood vessels BV, muscle, tendon, and other human body parts (subsurface or internal biology).

It is contemplated herein that Key Subject KS on a z-axis depth between near plane NP and far plane FP as set forth herein may be utilized or selected from any of the points, parts or elements in the paragraph above, such as internal biology.

FIG. 4A4 illustrates a representative view of a subsurface SB image dataset or diagram identifying an ultrasound image of a preborn baby BB in mother's womb WB showing head H, limbs, such as leg LG (internal biology).

It is contemplated herein that Key Subject KS on a z-axis depth between near plane NP and far plane FP as set forth herein may be utilized or selected from any of the points, parts or elements in the paragraph above, such as internal biology.

Figure 4B:
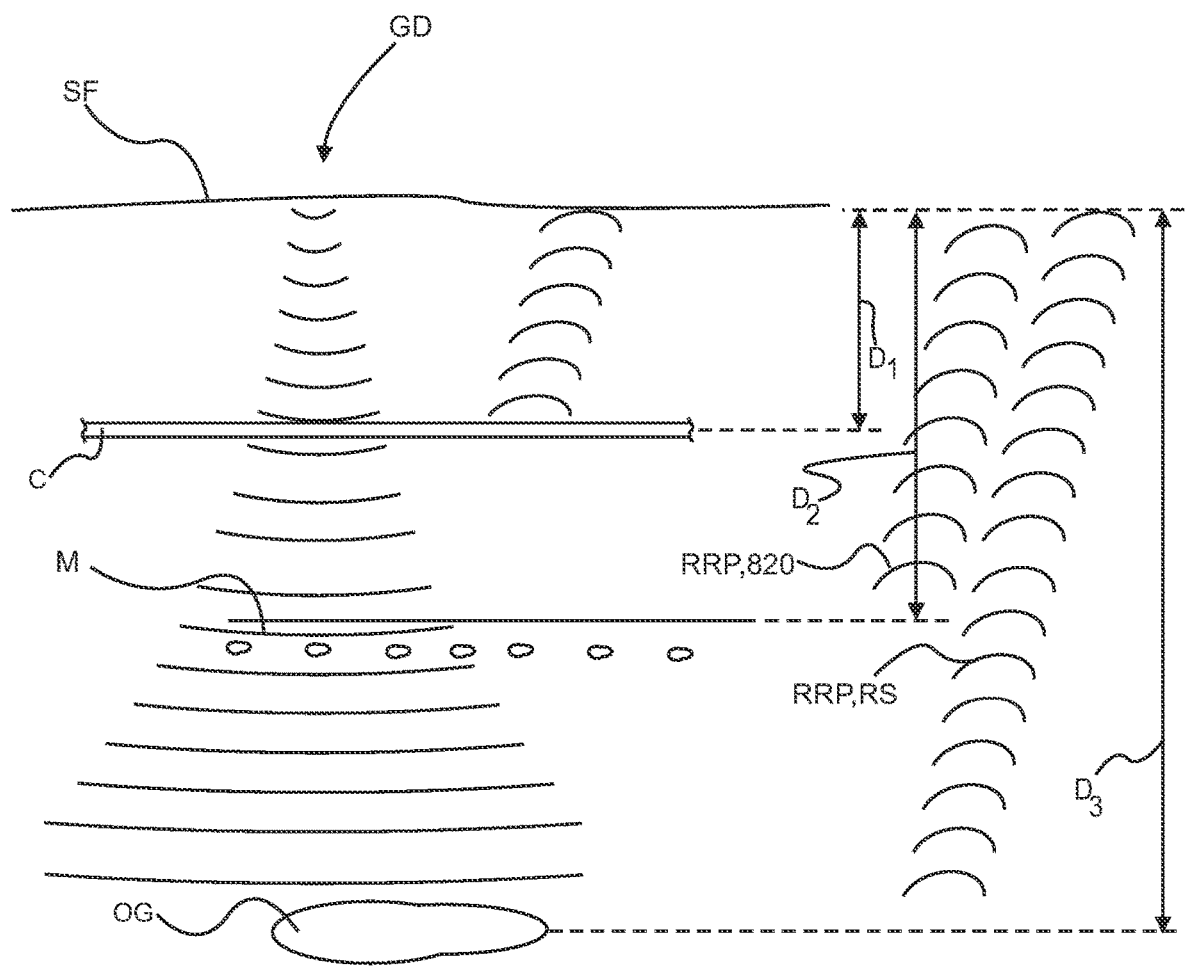
FIG. 4B is a diagram identifying radio wave or sound wave image of subsurface of the ground.

FIG. 4B illustrates a representative view of a diagram identifying subsurface SB image dataset or diagram identifying below ground or beneath the surface SF of the ground GD such as the depth location and subsurface SB coordinates of for example cable C, mineral M, oil and gas OG deposits beneath the surface SF (points beneath the surface of the ground).

It is contemplated herein that Key Subject KS on a z-axis depth between near plane NP and far plane FP as set forth herein may be utilized or selected from any of the points, parts or elements in the paragraph above, such as points beneath the surface of the ground GD.

It is contemplated herein that ground may be other than the earth or soil, such as buildings and other structures, piles or containers of material or crops or batches and the like.

Figure 4C:
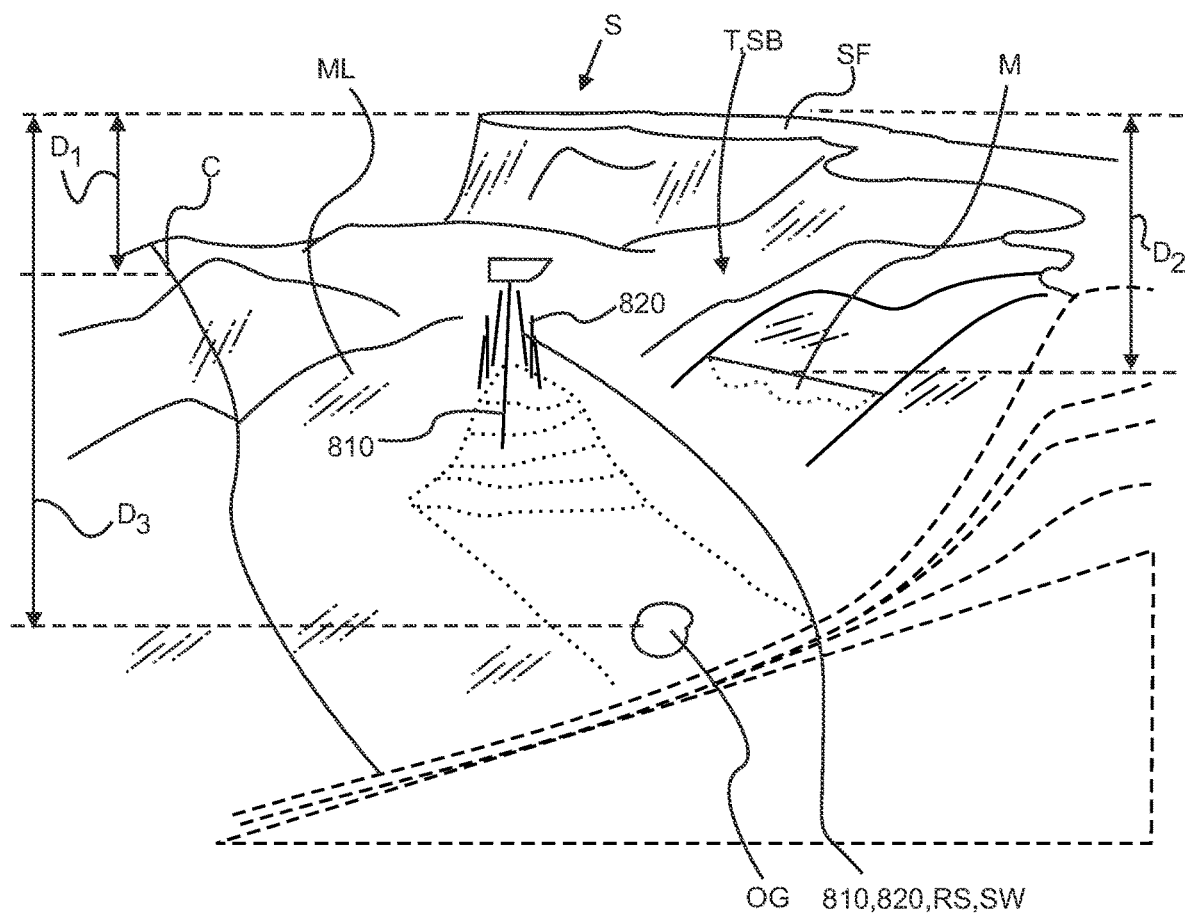
FIG. 4C is a diagram identifying sonar, sound, or ultrasound wave of an exemplary image of terrain of the subsurface of a water area.

FIG. 4C illustrates a representative view of a diagram identifying subsurface SB image dataset or diagram identifying underwater or beneath the surface SF of the water such as the depth D location and surface coordinates terrain T of scene S for example cable C, marine life ML, mineral M, oil and gas OG deposits beneath the surface SF.

It is contemplated herein that Key Subject KS on a z-axis depth between near plane NP and far plane FP as set forth herein may be utilized or selected from any of the points, parts or elements in the paragraph above, such as points beneath the surface SF of water W.

Figure 5:
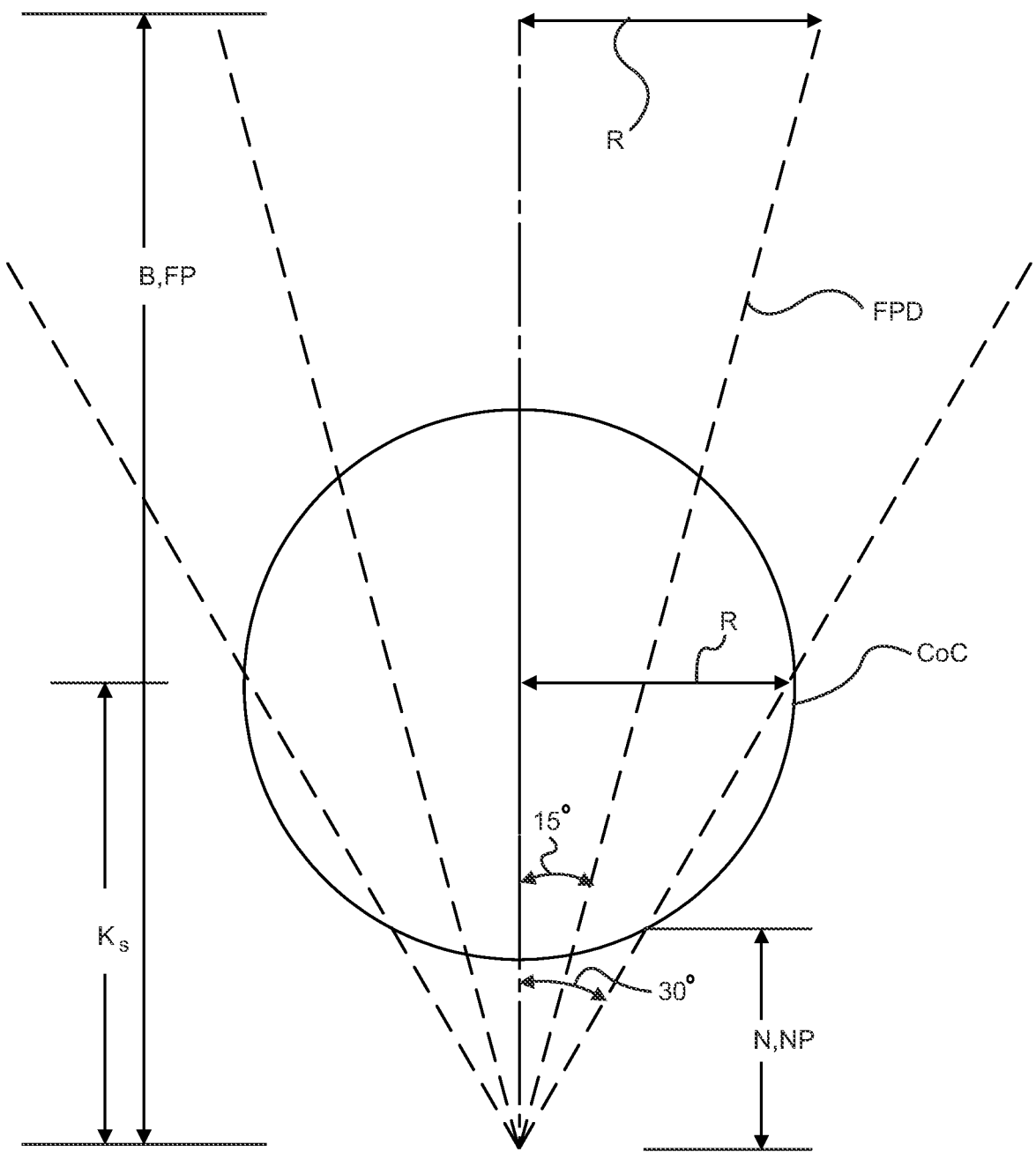
FIG. 5 is a top view illustration identifying planes of a scene and a circle of comfort in scale with FIG. 4.

FIG. 5 illustrates a Circle of Comfort (CoC) in scale with FIGS. 4.1 and 3.1. Defining the Circle of Comfort (CoC) as the circle formed by passing the diameter of the circle along the perpendicular to Key Subject plane KSP (in scale with FIG. 4) with a width determined by the 30 degree radials of FIG. 3) from the center point on the lens plane, image capture module 830. (R is the radius of Circle of Comfort (CoC).)

Conventional stereoscopic displays forces viewers to try to decouple these processes, because while they must dynamically vary vergence angle to view objects at different stereoscopic distances, they must keep accommodation at a fixed distance or else the entire display will slip out of focus. This decoupling generates eye fatigue and compromises image quality when viewing such displays.

In order to understand the present disclosure certain variables, need to be defined. The object field is the entire image being composed. The "key subject point" is defined as the point where the scene converges, i.e., the point in the depth of field that always remains in focus and has no parallax differential in the key subject point. The foreground and background points are the closest point and furthest point from the viewer, respectively. The depth of field is the depth or distance created within the object field (depicted distance from foreground to background). The principal axis is the line perpendicular to the scene passing through the key subject point. The parallax or binocular disparity is the difference in the position of any point in the first and last image after the key subject alignment. In digital composition, the key subject point displacement from the principal axis between frames is always maintained as a whole integer number of pixels from the principal axis. The total parallax is the summation of the absolute value of the displacement of the key subject point from the principal axis in the closest frame and the absolute value of the displacement of the key subject point from the principal axis in the furthest frame.

When capturing images herein, applicant refers refer to depth of field or circle of confusion and circle of comfort is referred to when viewing image on the viewing device.

U.S. Pat. Nos. 9,992,473, 10,033,990, and 10,178,247 are incorporated herein by reference in their entirety.

Creating depth perception using motion parallax is known. However, in order to maximize depth while maintaining a pleasing viewing experience, a systematic approach is introduced. The system combines factors of the human visual system with image capture procedures to produce a realistic depth experience on any 2D viewing device.

The technique introduces the Circle of Comfort (CoC) that prescribe the location of the image capture system relative to the scene S. The Circle of Comfort (CoC) relative to the Key Subject KS (point of convergence, focal point) sets the optimum near plane NP and far plane FP, i.e., controls the parallax of the scene S.

The system was developed so any capture device such as iPhone, camera or video camera can be used to capture the scene. Similarly, the captured images can be combined and viewed on any digital output device such as smart phone, tablet, monitor, TV, laptop, computer screen, or other like displays.

As will be appreciated by one of skill in the art, the present disclosure may be embodied as a method, data processing system, or computer program product. Accordingly, the present disclosure may take the form of an entirely hardware embodiment, entirely software embodiment or an embodiment combining software and hardware aspects. Furthermore, the present disclosure may take the form of a computer program product on a computer-readable storage medium having computer-readable program code means embodied in the medium. Any suitable computer readable medium may be utilized, including hard disks, ROM, RAM, CD-ROMs, electrical, optical, magnetic storage devices and the like.

The present disclosure is described below with reference to flowchart illustrations of methods, apparatus (systems) and computer program products according to embodiments of the present disclosure. It will be understood that each block or step of the flowchart illustrations, and combinations of blocks or steps in the flowchart illustrations, can be implemented by computer program instructions or operations. These computer program instructions or operations may be loaded onto a general purpose computer, special purpose computer, or other programmable data processing apparatus to produce a machine, such that the instructions or operations, which execute on the computer or other programmable data processing apparatus, create means for implementing the functions specified in the flowchart block or blocks/step or steps.

These computer program instructions or operations may also be stored in a computer-usable memory that can direct a computer or other programmable data processing apparatus to function in a particular manner, such that the instructions or operations stored in the computer-usable memory produce an article of manufacture including instruction means which implement the function specified in the flowchart block or blocks/step or steps. The computer program instructions or operations may also be loaded onto a computer or other programmable data processing apparatus (processor) to cause a series of operational steps to be performed on the computer or other programmable apparatus (processor) to produce a computer implemented process such that the instructions or operations which execute on the computer or other programmable apparatus (processor) provide steps for implementing the functions specified in the flowchart block or blocks/step or steps.

Accordingly, blocks or steps of the flowchart illustrations support combinations of means for performing the specified functions, combinations of steps for performing the specified functions, and program instruction means for performing the specified functions. It should also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions or operations.

Computer programming for implementing the present disclosure may be written in various programming languages, database languages, and the like. However, it is understood that other source or object oriented programming languages, and other conventional programming language may be utilized without departing from the spirit and intent of the present disclosure.

Figure 6:
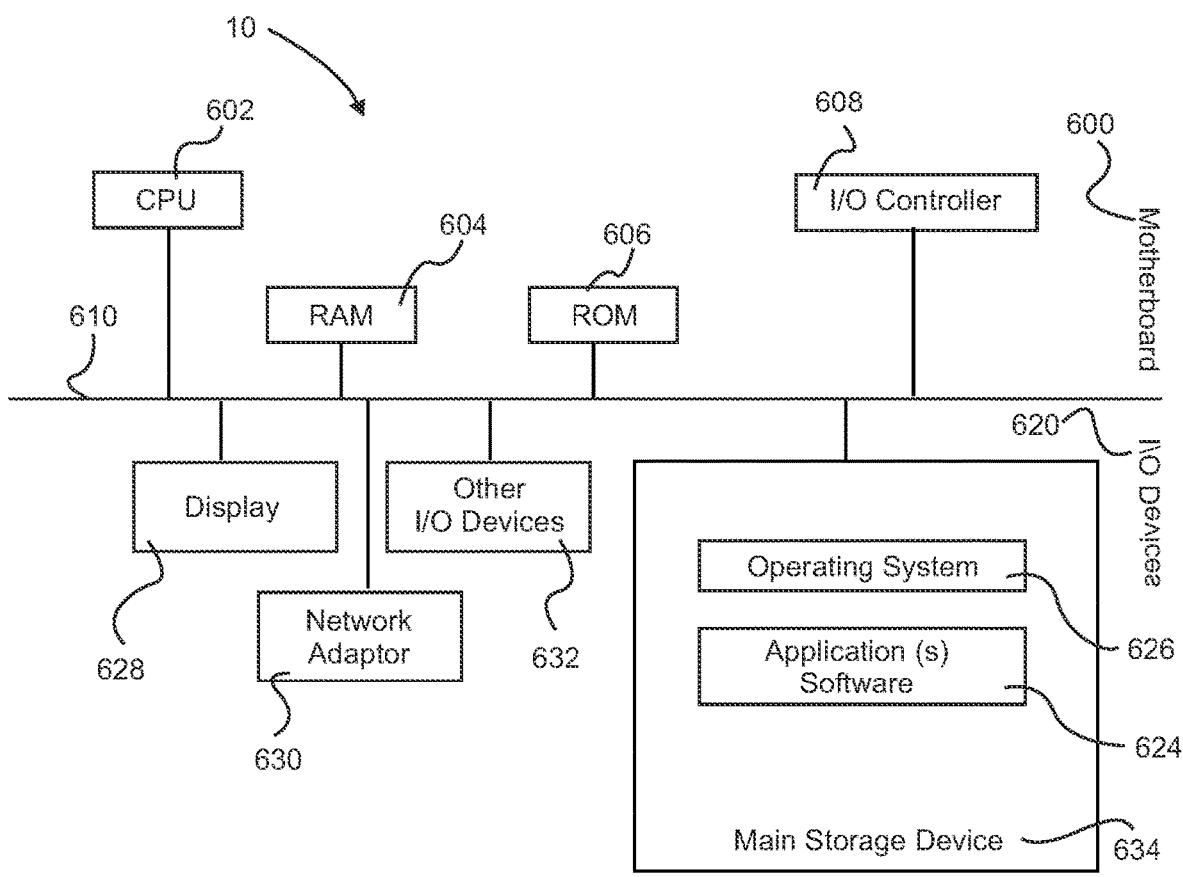
FIG. 6 is a block diagram of a computer system of the present disclosure.

Referring now to FIG. 6, there is illustrated a block diagram of a computer system 10 that provides a suitable environment for implementing embodiments of the present disclosure. The computer architecture shown in FIG. 6 is divided into two parts—motherboard 600 and the input/output (I/O) devices 620. Motherboard 600 preferably includes subsystems or processor to execute instructions such as central processing unit (CPU) 602, a memory device, such as random access memory (RAM) 604, input/output (I/O) controller 608, and a memory device such as read-only memory (ROM) 606, also known as firmware, which are interconnected by bus 10. A basic input output system (BIOS) containing the basic routines that help to transfer information between elements within the subsystems of the computer is preferably stored in ROM 606, or operably disposed in RAM 604. Computer system 10 further preferably includes I/O devices 620, such as main storage device 634 for storing operating system 626 and executes as instruction via application program(s) 624, and display 628 for visual output, and other I/O devices 632 as appropriate. Main storage device 634 preferably is connected to CPU 602 through a main storage controller (represented as 608) connected to bus 610. Network adapter 630 allows the computer system to send and receive data through communication devices or any other network adapter capable of transmitting and receiving data over a communications link that is either a wired, optical, or wireless data pathway. It is recognized herein that central processing unit (CPU) 602 performs instructions, operations or commands stored in ROM 606 or RAM 604.

It is contemplated herein that computer system 10 may include smart devices, such as smart phone, iPhone, android phone (Google, Samsung, or other manufactures), tablets, desktops, laptops, digital image capture devices, and other computing devices with two or more digital image capture devices and/or 3D display 608 (smart device).

It is further contemplated herein that display 608 may be configured as a foldable display or multi-foldable display capable of unfolding into a larger display surface area.

Many other devices or subsystems or other I/O devices 632 may be connected in a similar manner, including but not limited to, devices such as microphone, speakers, flash drive, CD-ROM player, DVD player, printer, main storage device 634, such as hard drive, and/or modem each connected via an I/O adapter. Also, although preferred, it is not necessary for all of the devices shown in FIG. 6 to be present to practice the present disclosure, as discussed below. Furthermore, the devices and subsystems may be interconnected in different configurations from that shown in FIG. 6, or may be based on optical or gate arrays, or some combination of these elements that is capable of responding to and executing instructions or operations. The operation of a computer system such as that shown in FIG. 6 is readily known in the art and is not discussed in further detail in this application, so as not to overcomplicate the present discussion.

Figure 7:
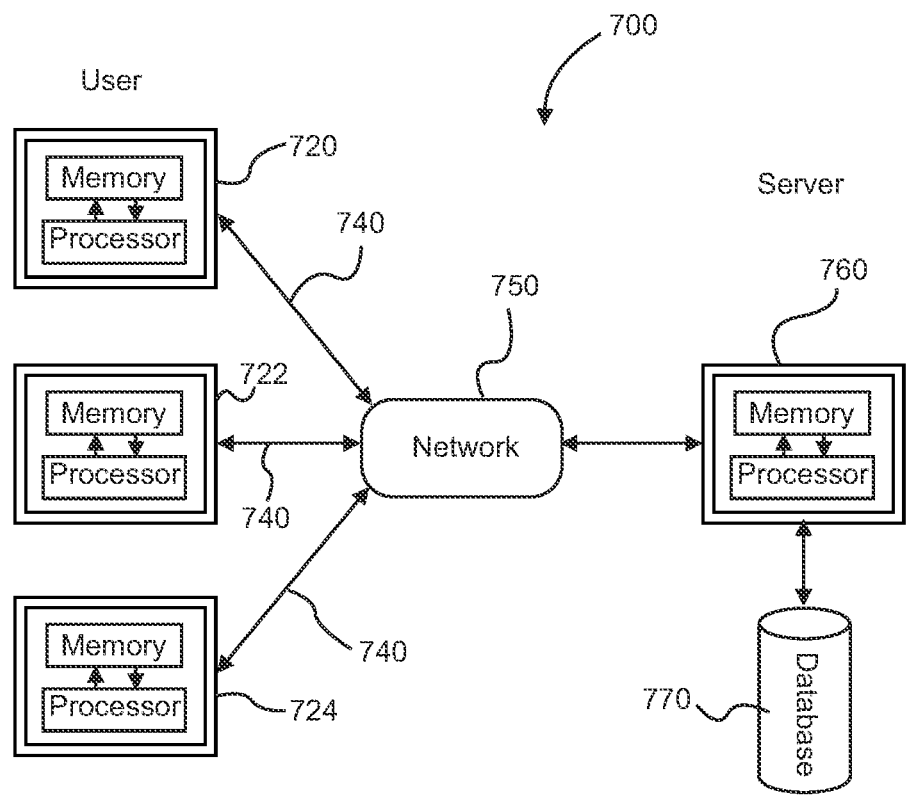
FIG. 7 is a block diagram of a communications system implemented by the computer system in FIG. 6.

Referring now to FIG. 7, there is illustrated a diagram depicting an exemplary communication system 700 in which concepts consistent with the present disclosure may be implemented. Examples of each element within the communication system 700 of FIG. 7 are broadly described above with respect to FIG. 6. In particular, the server system 760 and user system 720 have attributes similar to computer system 10 of FIG. 6 and illustrate one possible implementation of computer system 10. Communication system 700 preferably includes one or more user systems 720, 722, 724 (It is contemplated herein that computer system 10 may include smart devices, such as smart phone, iPhone, android phone (Google, Samsung, or other manufactures), tablets, desktops, laptops, cameras, and other computing devices with display 628 (smart device)), one or more server system 760, and network 750, which could be, for example, the Internet, public network, private network or cloud. User systems 720-724 each preferably includes a computer-readable medium, such as random access memory, coupled to a processor. The processor, CPU 702, executes program instructions or operations (application software 624) stored in memory 604, 606. Communication system 700 typically includes one or more user system 720. For example, user system 720 may include one or more general-purpose computers (e.g., personal computers), one or more special purpose computers (e.g., devices specifically programmed to communicate with each other and/or the server system 760), a workstation, a server, a device, a digital assistant or a "smart" cellular telephone or pager, a digital camera, a component, other equipment, or some combination of these elements that is capable of responding to and executing instructions or operations.

Similar to user system 720, server system 760 preferably includes a computer-readable medium, such as random access memory, coupled to a processor. The processor executes program instructions stored in memory. Server system 760 may also include a number of additional external or internal devices, such as, without limitation, a mouse, a CD-ROM, a keyboard, a display, a storage device and other attributes similar to computer system 10 of FIG. 6. Server system 760 may additionally include a secondary storage element, such as database 770 for storage of data and information. Server system 760, although depicted as a single computer system, may be implemented as a network of computer processors. Memory in server system 760 contains one or more executable steps, program(s), algorithm(s), or application(s) 624 (shown in FIG. 6). For example, the server system 760 may include a web server, information server, application server, one or more general-purpose computers (e.g., personal computers), one or more special purpose computers (e.g., devices specifically programmed to communicate with each other), a workstation or other equipment, or some combination of these elements that is capable of responding to and executing instructions or operations.

Communications system 700 is capable of delivering and exchanging data (including three-dimensional 3D image files) between user systems 720 and a server system 760 through communications link 740 and/or network 750. Through user system 720, users can preferably communicate data over network 750 with each other user system 720, 722, 724, and with other systems and devices, such as server system 760, to electronically transmit, store, print and/or view multidimensional digital master image(s). Communications link 740 typically includes network 750 making a direct or indirect communication between the user system 720 and the server system 760, irrespective of physical separation. Examples of a network 750 include the Internet, cloud, analog or digital wired and wireless networks, radio, television, cable, satellite, and/or any other delivery mechanism for carrying and/or transmitting data or other information, such as to electronically transmit, store, print and/or view multidimensional digital master image(s). The communications link 740 may include, for example, a wired, wireless, cable, optical or satellite communication system or other pathway.

Referring again to FIGS. 2A, 5, and 14B for best results and simplified math, the distance or degrees of angle between the capture of successive images or frames of the scene S is fixed to match the average separation of the human left and right eyes in order to maintain constant binocular disparity. In addition, the distance to key subject KS is chosen such that the captured image of the key subject is sized to fall within the foveal vision of the observer in order to produce high visual acuity of the key subject and to maintain a vergence angle equal to or less than the preferred viewing angle of fifteen degrees (15°) and more specifically one and a half degrees (1.5°).

Figure 8B:
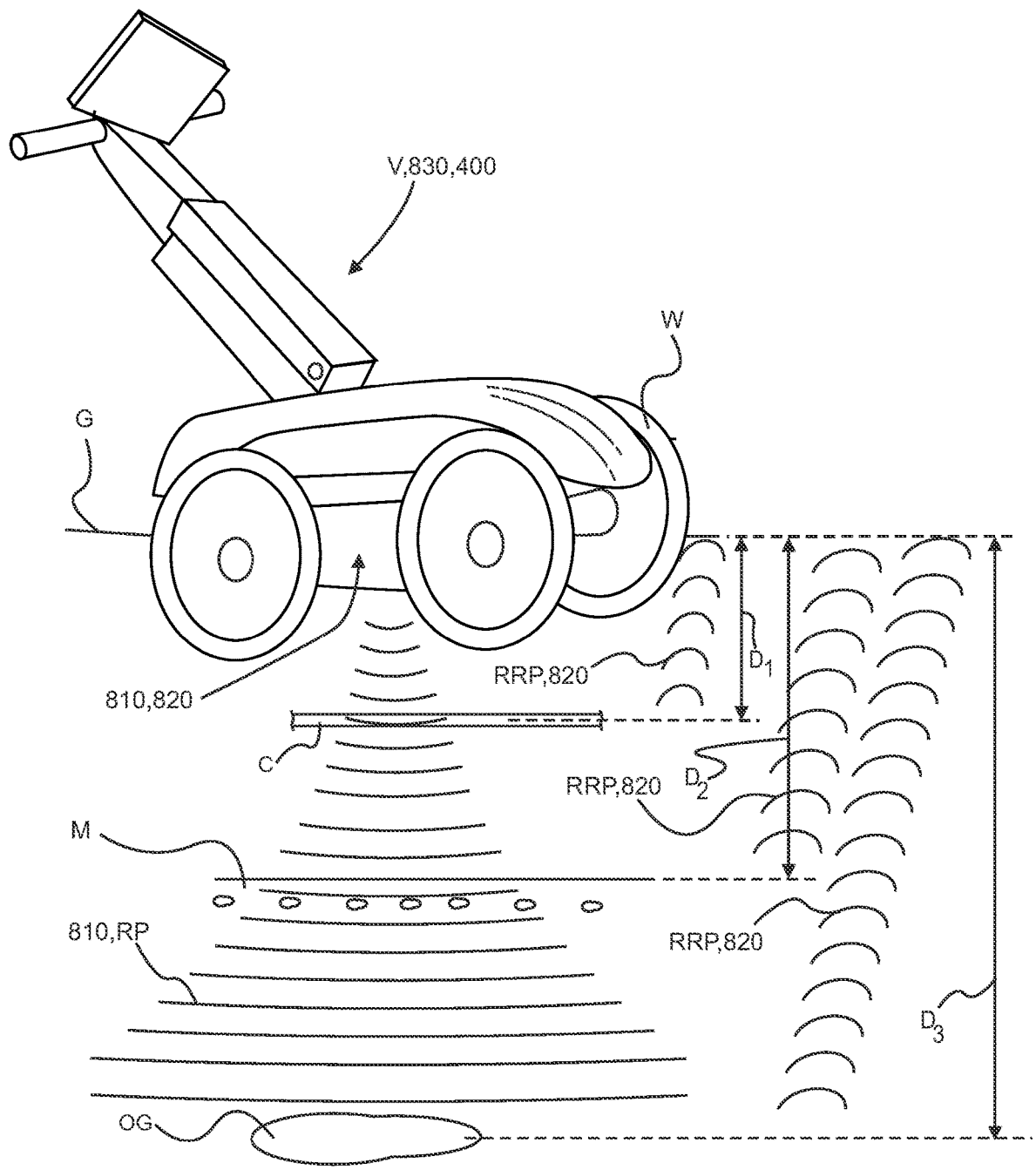
FIG. 8B is a diagram of an exemplary embodiment of a ground traversing vehicle with one or more wave generating devices and one or more sensors, antenna, or capture devices positioned thereon to capture image, file, dataset of sub terrain or subsurface of scene.
Figure 8C:
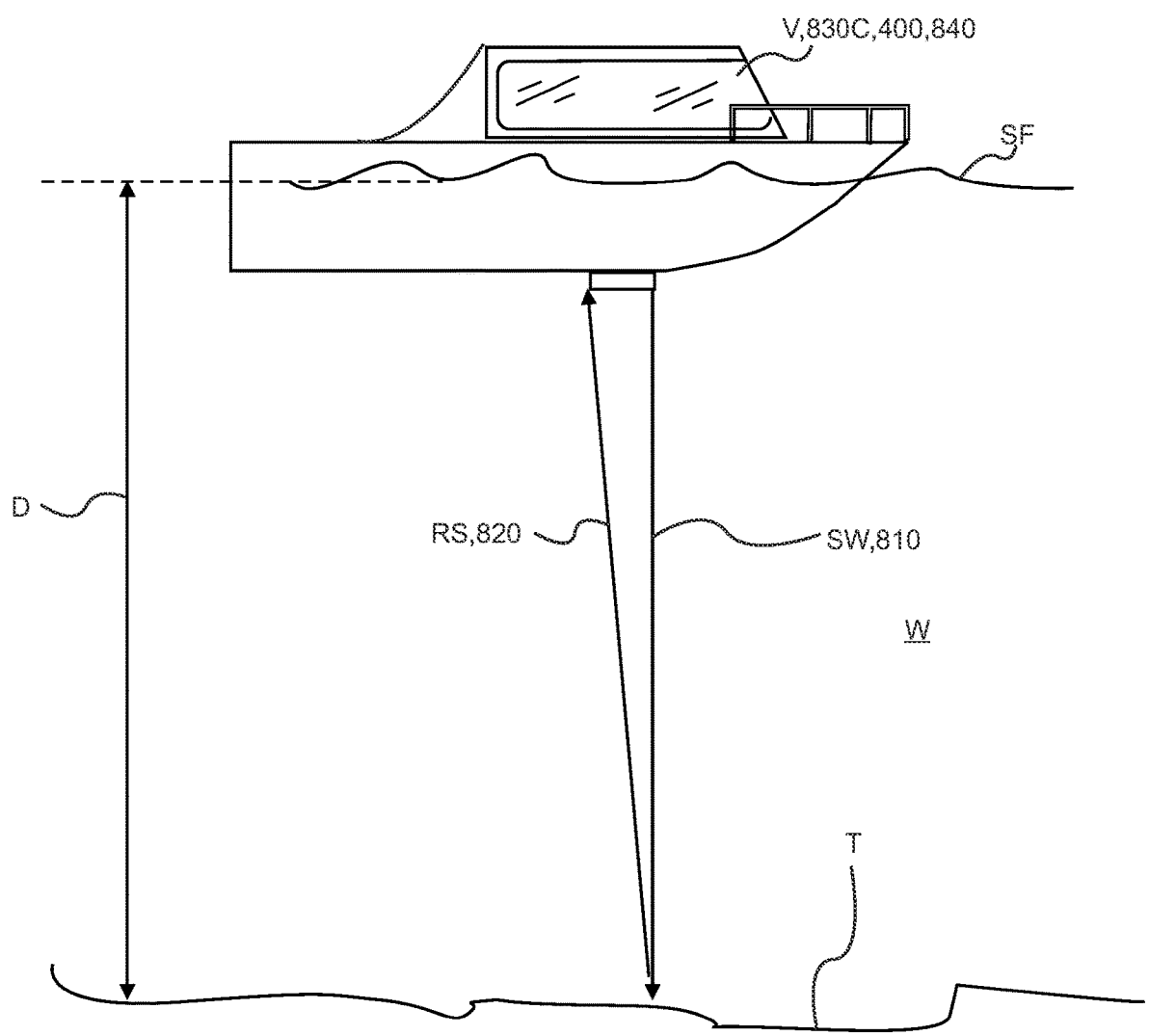
FIG. 8C is a diagram of an exemplary embodiment of a ground vehicle-automobile with capture device(s) positioned thereon to capture image, file, dataset of terrain of scene.

FIGS. 8A-8C disclose different subsurface image capture modules 830 subsurface imaging diagnostic imaging tools for capturing a plurality of datasets of substructure with coordinate reference data: 1) subsurface or below surface images of animals, plants, insects, microorganisms, cells, molecules, sub particles, humans, and the like (internal biology) to produce multi-dimensional image sequence and/or multi-dimensional images of internal structures, such as organs, bone, tissue, vascular and other substructures or elements within the body for improved imaging and diagnostic; 2) substructure, mineral, oil, and gas deposits to produce multi-dimensional image sequence and/or multi-dimensional images of deposits; 3) substructure of ocean to produce multi-dimensional image sequence and/or multi-dimensional images of topography of terrain T of scene S, marine life ML, and deposits, 4) substructure of underground utilities such as concrete, asphalt, metals, pipes, cables or masonry along with coordinate reference data or geocoding information of the vehicle 400 relative to the terrain T of scene S, such as FIG. 4.

As described above, the sense of depth of a stereoscopic image varies depending on the distance between capture module 830 and the key subject Ks, known as the image capturing distance or KS. The sense of depth is also controlled by the vergence angle and the distance between the capture of each successive image by the camera which effects binocular disparity.

In photography the Circle of Confusion defines the area of a scene S that is captured in focus. Thus, the near plane NP, key subject plane KSP and the far plane FP are in focus. Areas outside this circle are blurred.

Referring now to FIG. 8A, by way of example, and not limitation, there is illustrated subsurface image capture module 830A an image/diagnostic tool to capture internal or subsurface image files, datasets, or slices SL of the specimen or scene (internal biology), such as patient P (or animals, plants, insects, microorganisms, cells, molecules, sub particles, humans, and the like) via machine 400 to provide rotation or movement of capture module 830A about specimen with coordinate reference data, such as patient P, such as a magnetic resonance imaging (Mill) having elements that rotate R, such as one or more wave generating devices 810 and one or more sensors, antenna, or capture devices 820, around a specimen or patient P uses magnetic fields and radio waves to capture detailed subsurface image files, datasets, or slices SL of the specimen, such as detailed images of organs and tissues in the body, as shown in FIGS. 4A1, 4A2, and 4A3; x-ray (X-Ray) 830A having elements that rotate R, such as one or more wave generating devices 810 and one or more sensors, antenna, or capture devices 820, around a specimen uses ionizing radiation to capture detailed subsurface SB image files, datasets, or slices SL of the specimen, such as images of the structures inside the body, such as bones, as shown in FIGS. 4A1, 4A2, and 4A3; computerized tomography (CT) and computerized axial tomography (CT/CAT) 830A having elements that rotate R, such as one or more wave generating devices 810 and one or more sensors, antenna, or capture devices 820, around a specimen uses a series of x-rays to capture detailed image files, datasets, or slices SL of the specimen, a series of cross-sections of the body including bones, blood vessels, and soft tissue as shown in FIGS. 4A1, 4A2, and 4A3; positron emission tomography (PET) having elements that rotate R, such as one or more wave generating devices 810 and one or more sensors, antenna, or capture devices 820, around a specimen uses radioactive drugs (tracers) and a scanning machine to capture detailed image files, datasets, or slices SL of the specimen, such as images of the structures inside the body, such as tissues and organs are functioning as shown in FIGS. 4A1, 4A2, and 4A3; bone densitometry (DEXA) 830A having elements, such as one or more wave generating devices 810 and one or more sensors, antenna, or capture devices 820; Fluoroscopy having elements, such as one or more wave generating devices 810 and one or more sensors, antenna, or capture devices 820, ultrasound 830A having elements, such as one or more wave generating devices 810 and one or more sensors, antenna, or capture devices 820 uses high-frequency sound waves to capture detailed image files, datasets, or slices SL of the specimen, such as images of organs and substructures within the internal biology and the like as shown in FIG. 4A4 and detect geocoding data or position of one or more wave generating devices 810 and one or more sensors, antenna, or capture devices 820 relative to internal biology.

It is recognized herein that capture module 830A produces detailed image files, datasets, or slices SL of the specimen in an industry standard format of a Digital imaging and Communications in Medicine (DICOM) file format standard for the communication and management of medical imaging information that includes a set of slices SL of the specimen ranging from Referring now to FIG. 8B, by way of example, and not limitation, there is illustrated subsurface image capture module 830B integrated with a vehicle V an image/diagnostic tool to capture subsurface image files, datasets, or slices SL of the specimen, such as earth or specific ground area sub-surfaces (ground area), including but not limited to, investigate underground utilities such as concrete, asphalt, metals, pipes, cables or masonry, such as ground-penetrating radar (GPR) 830B having one or more wave generating devices 810 and one or more sensors, antenna, or capture devices 820 to generate radar pulses RP 810 microwave band (UHF/VHF frequencies) of the radio spectrum which reflect radar pulses RRP 820 off different subsurface materials, to capture detailed subsurface image files, datasets, or slices SL of the specimen, such as images of subsurface SB including but not limited to investigate underground utilities such as concrete, asphalt, metals, pipes, cables C or masonry; and ultrasound 830B having elements, such as one or more wave generating devices 810 and one or more sensors, antenna, or capture devices 820 uses high-frequency sound waves S which reflect high-frequency sound waves RS 820 off different subsurface materials to capture detailed image files, datasets, or slices SL of the specimen, such as images of underground utilities such as concrete, asphalt, metals, pipes, cables C or masonry, substructure, mineral M, oil, and gas OG deposits and the like, such as shown in FIG. 4B. For example, transmitted and returned pulses measure the depth of material items, such as underground utilities in concrete, asphalt, metals, pipes, cables C or masonry and substructure, mineral M, oil, and gas OG deposits and the like beneath the surface SF in the subsurface SB.

Depth of material items D, such as underground utilities in concrete, asphalt, metals, pipes, cables C or masonry and substructure, mineral M, oil, and gas OG deposits and the like beneath the surface SF in the subsurface SB is measured as a function of:

$$D = \frac{1}{2} * v * t$$

where 'v' is radar pulses RP 810 velocity in subsurface SB and 't' radar pulse travel time of radar pulses RP 810 and reflect radar pulses RRP 820 for D1 for cables C, D2 for mineral M, and D3 for oil and gas OG.

Referring now to FIG. 8C, by way of example, and not limitation, there is illustrated subsurface capture module 830C integrated with a vehicle V, 400, such as a marine vessel, an image/diagnostic tool to capture subsurface or underwater (underwater) image files, datasets, or slices SL of the specimen, such as river, lake, ocean, tank, or specific water area (underwater) subsurface SB including but not limited to investigate underwater utilities such as concrete, metals, pipes, cables or masonry, substructure, topography of terrain T of scene, marine life ML, and mineral M, oil, and gas OG deposits and the like, shown in FIG. 4C, such as ultrasound 830B having elements, such as one or more wave generating devices 810 and one or more sensors, antenna, or capture devices 820 uses high-frequency sound waves SW 810, which reflect high-frequency sound waves RS 820 off different subsurface materials to capture detailed image files, datasets, or slices SL of the specimen, such as images of underground utilities such as concrete, metals, pipes, cables or masonry, substructure, topography of terrain T of scene S, marine life ML, and mineral M, oil, and gas OG deposits and the like, shown in FIG. 4C. For example, transmitted and returned pulses measure the depth of material items, such as underwater utilities such as concrete, metals, pipes, cables or masonry, substructure, topography of terrain T of scene S, marine life ML, and mineral M, oil, and gas OG deposits and the like beneath the surface SF in the subsurface SB, shown in FIG. 4C.

Depth of material items D, such as underwater utilities such as concrete, metals, pipes, cables C (depth D1) or masonry, substructure, topography of terrain T of scene S, marine life ML, and mineral M (depth D1), oil, and gas OG (depth D2) deposits and the like beneath the surface SF in the subsurface SB is measured as a function of:

$$D = \frac{1}{2} * v * t$$

where 'v' is sound waves SW 810 velocity in subsurface SB and 't' sound wave travel time of sound waves SW 810 and reflect radar pulses RRP 820 for D1 for cables C, D2 for mineral M, and D3 for oil and gas OG.

Vehicle 400 may utilize global positioning system (GPS) to identify coordinate reference data x-y-z position of vehicle 400. GPS satellites carry atomic clocks that provide extremely accurate time. The time information is placed in the codes/signals broadcast by the satellite. Because radio waves travel at a constant speed, the receiver can use the time measurements to calculate its distance from each satellite. The receiver (vehicle 400) uses at least four satellites to compute latitude, longitude, altitude, and time by measuring the time it takes for a signal to arrive at its location from at least four satellites.

It is contemplated herein that image capture module 830B and 830C may control or set the depth of image capture device 830, whether different depths in scene S, such as foreground FG, and or object, background BG, such as closest point CP, key subject point KS, and a furthest point FP, shown in FIG. 4.

It is contemplated herein that capture module 830 may be mounted to vehicle 400 utilizing three axis x-y-z gimbal.

Referring again to FIG. 8C, by way of example, and not limitation, there is illustrated marine vehicle 400 having capture module 830, configured to capture images and dataset, such as 2D RGB high resolution digital camera (broad image of terrain or sets of image sections as tiles), LIDAR, IR, EM or other like spectrum formats images, files or datasets, labels (LIDAR) and identifies the datasets of the terrain T of scene S based on the source capture device along with coordinate reference data or geocoding information. Capture module 830 may include computer system 10 and may include one or more sensors 840 to measure distance between capture module 830 and selected depths in terrain T of scene S (depth).

Moreover, vehicle 400 may utilize global positioning system (GPS). GPS satellites carry atomic clocks that provide extremely accurate time. The time information is placed in the codes/signals broadcast by the satellite. Because radio waves travel at a constant speed, the receiver can use the time measurements to calculate its distance from each satellite. The receiver (vehicle 400) uses at least four satellites to compute latitude, longitude, altitude, and time by measuring the time it takes for a signal to arrive at its location from at least four satellites.

It is contemplated herein that image capture module 830 may include one or more sensors 840 may be configured as combinations of image capture device 830 and sensor 840 configured as an integrated unit or module where sensor 840 controls or sets the depth of image capture device 830, whether different depths in scene S, such as foreground, and person P or object, background, such as closest point CP, key subject point KS, and a furthest point FP, shown in FIG. 4.

It is contemplated herein that capture device(s) 830 may be utilized to capture LIDAR file format LAS, a file format designed for the interchange and archiving of LIDAR point cloud data 850 (capture device(s) 830 emits infrared pulses or laser and detects the reflection of objects to map the terrain T of scene S) and identifies the datasets of the terrain T of scene S based on the source capture device along with coordinate reference data or geocoding information via GPS of the vehicle 400 relative to the terrain T of scene S. It is an open, binary format specified by the American Society for Photogrammetry and Remote Sensing.

It is further contemplated herein that capture device(s) 830 may be utilized to capture a series or tracts of high resolution 2D images RGB and identifies the datasets of the terrain T of scene S based on the source capture device along with coordinate reference data or geocoding information via GPS of the vehicle 400 relative to the terrain T of scene S.

Referring now to FIG. 8D1, there is illustrated process steps as a flow diagram 800 of a method of capturing subsurface images, files or datasets, labels and identifies the datasets of the of scene S based on capture module 830A, 830B, 830C and if relevant coordinate reference data or geocoding information of the vehicle 400 relative to the terrain T of scene S based on the source capture device, manipulating, reconfiguring, processing, storing a digital multi-dimensional image sequence and/or multi-dimensional images as performed by a computer system 10, and viewable on display 628.

Moreover, subsurface capturing such as 2D RGB high resolution digital camera (to capture a series of 2D images of terrain T, broad image of terrain or sets of image sections as tiles), LIDAR, IR, EM or other like spectrum formats (to capture a digital elevation model or depth or z-axis of terrain T, DEM capture device) images, files or datasets, labels and identifies the datasets of the terrain T of scene S based on the source capture device along with coordinate reference data or geocoding information of the vehicle 400 relative to the terrain T of scene S based on the source capture device along with coordinate reference data or geocoding information, manipulating, reconfiguring, processing, storing a digital multi-dimensional image sequence and/or multi-dimensional images as performed by a computer system 10, and viewable on display 628.

Figure 13:
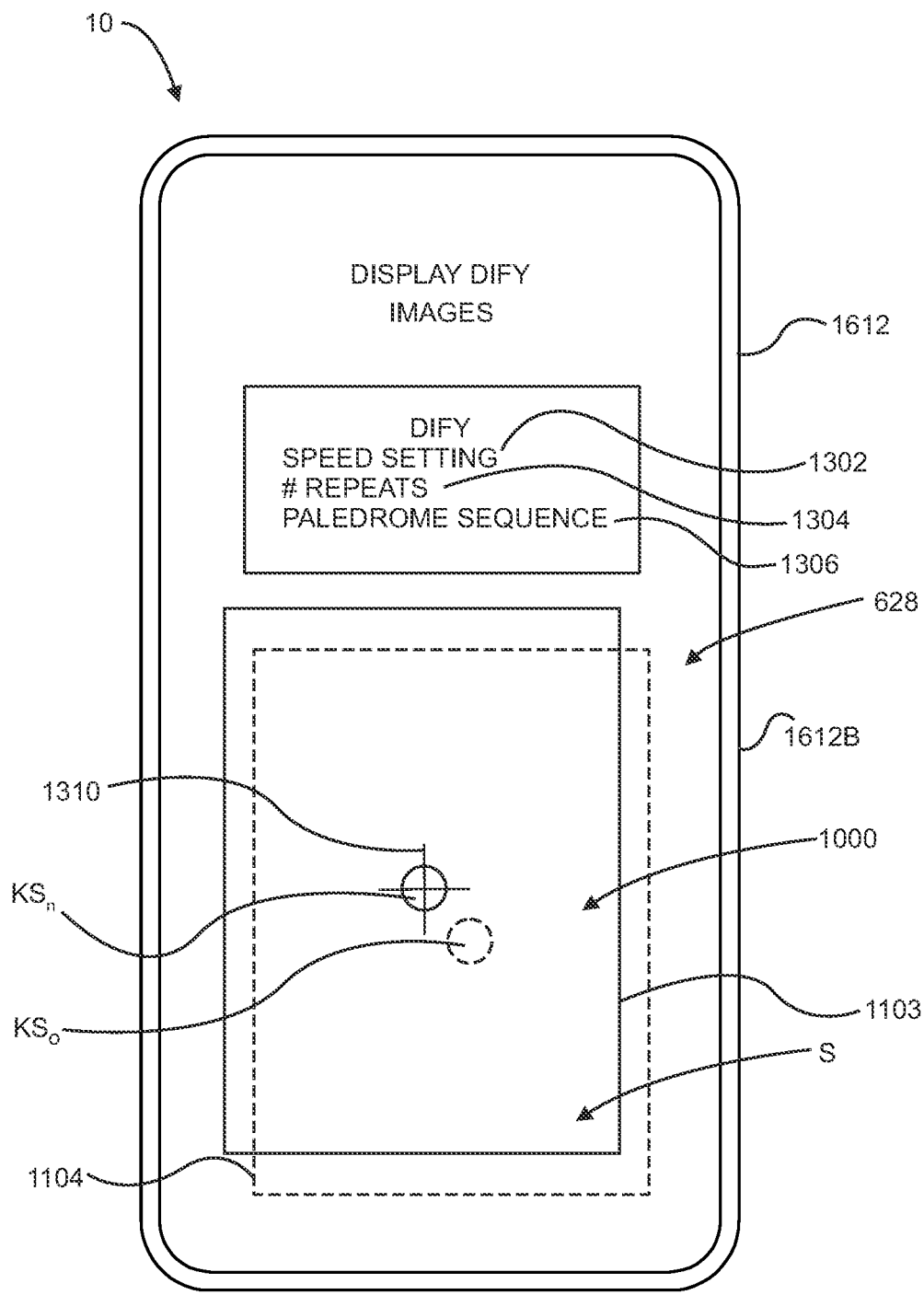
FIG. 13 is a top view illustration of an exemplary embodiment of a display with user interactive content to select photography options of computer system.
Figure 16A:
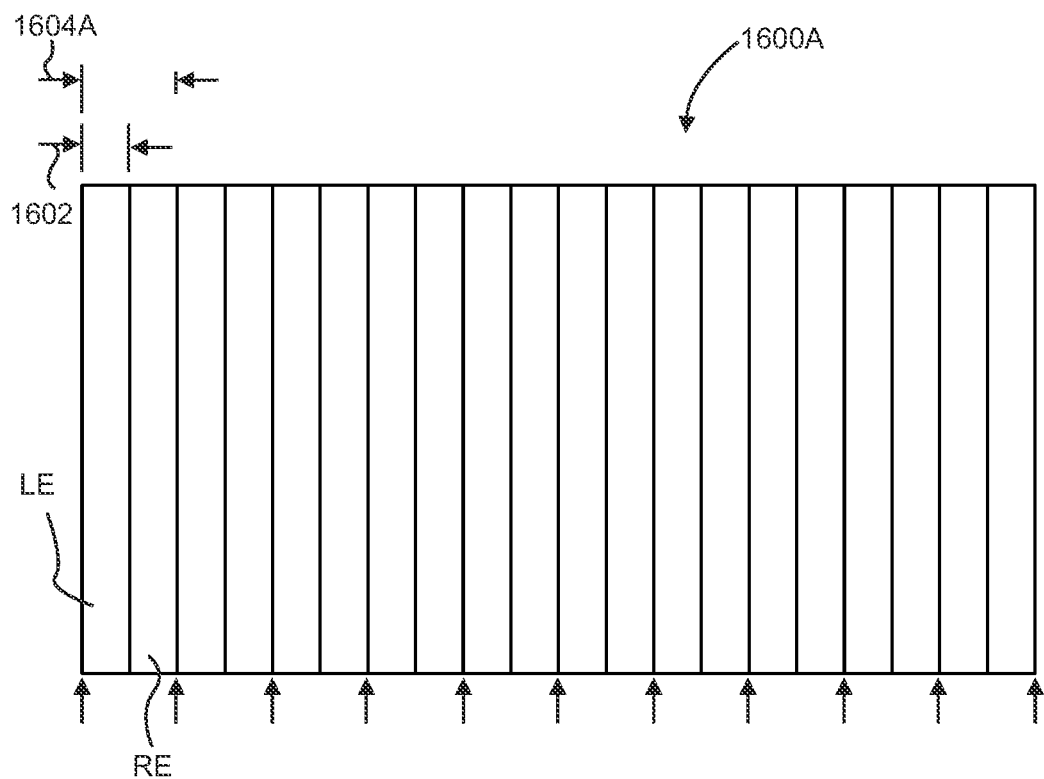
FIG. 16A is a diagram illustration of an exemplary embodiment of a pixel interphase processing of images (frames), such as in FIG. 8A according to select embodiments of the instant disclosure.
Figure 16B:
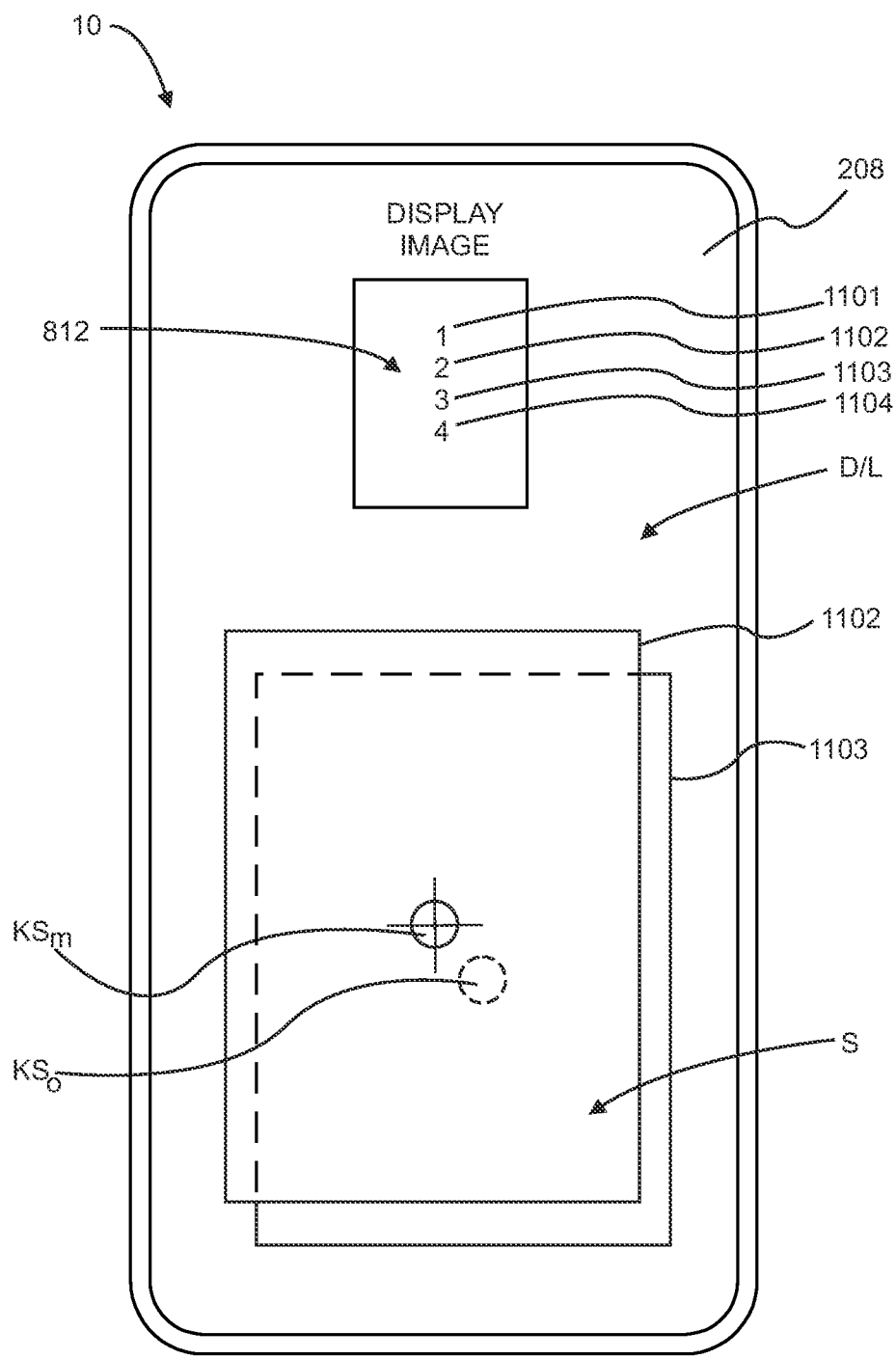
FIG. 16B is a top view illustration of an exemplary embodiment of a display of computer system running an application.

Note in FIG. 13 or 16B some steps designate a manual mode of operation may be performed by a user U, whereby the user is making selections and providing input to computer system 10 in the step whereas otherwise operation of computer system 10 is based on the steps performed by application program(s) 624 in an automatic mode.

In block or step 810, providing computer system 10 having capture device(s) 830, display 628, and applications 624 as described above in FIGS. 6-7, where capture module 830, is configured to capture subsurface images and dataset, such as image files, datasets, or slices SL of the specimen in an industry standard format of a Digital Imaging and Communications in Medicine (DICOM), capture subsurface image files, datasets, or slices SL of the specimen, such as earth or specific ground area sub-surfaces including but not limited to investigate underground; capture subsurface, or underwater image files, datasets, or slices SL of the specimen, such as river, lake, or ocean, or specific water area sub-surfaces including but not limited to investigate underwater, and files or datasets, labels and identifies the datasets of the terrain T of scene S based on the source capture device along with coordinate reference data or geocoding information; capture subsurface images, such as 2D RGB high resolution digital camera (to capture a series of 2D images of terrain T, broad image of terrain or sets of image sections as tiles) and/or LIDAR, IR, EM or other like spectrum formats (to capture a digital elevation model or depth or z-axis of terrain T of scene S, DEM capture device) images, files or datasets, labels and identifies the datasets of the terrain T of scene S. Capture module 830 may include computer system 10 and may include one or more sensors 840 to measure distance between Capture module 830 and selected depths in terrain T of scene S (depth). It is contemplated herein that other subsurface penetrating image capture devices 830 are included herein.

In block or step 815, mounting or positioning selected capture module 830, 830A, 830B, 830C on machine or vehicle 400 to capture to capture subsurface images and dataset, such as image files, datasets, or slices SL of the specimen.

In block or step 825, configuring computer system 10 having capture device(s) 830, display 628, and applications 624 as described above in FIGS. 6-7, where capture module 830, is configured to capture subsurface images and dataset, such as image files, datasets, or slices SL of the specimen or scene S based on the source capture device along with coordinate reference data or geocoding information and other attributes of specimen or scene S to maximize quality of subsurface images and dataset, such as image files, datasets, or slices SL of the specimen or scene S.

In block or step 835, maneuvering machine or vehicle 400 about a planned trajectory having selected capture module 830, configured to capture subsurface images and dataset, such as image files, datasets, or slices SL of the specimen or scene S or the like or other like spectrum formats.

For example, vehicle 400 is on a designated path and may capture images, files or datasets at designated intervals, labels and identifies the datasets of the subsurface terrain T of scene S via ground tracking position and coordinate reference data or geocoding information as well as x-y-z position or angle of capture device(s) 830. Moreover, machine or vehicle 400 may be on a scheduled or manual guidance plan over terrain T and may capture images, files or datasets at designated intervals, labels and identifies the datasets of the terrain T of scene S via coordinate reference data or geocoding information, such as GPS as well as x-y-z position or angle of capture device(s) 830 relative to machine or vehicle 400. Travel plan for vehicle 400 may consist of a switchback pattern with an overlap to enable full capture of terrain T or the travel plan may follow a linear path with an overlap to enable the capture of images, files, and dataset, via capture device(s) 830, such as underwater utilities such as concrete, metals, pipes, cables C or masonry, substructure, topography of terrain T of scene S, marine life ML, and mineral M, oil, and gas OG deposits and the like beneath the surface SF in the subsurface SB as shown in FIGS. 4B and 4C. Furthermore, autonomous vehicle 400 may be on a scheduled or manual guidance plan to traverse terrain T and may capture images, files or datasets at designated intervals or continuously capture images, files or datasets and guide autonomous vehicle 400.4 to traverse terrain T of scene S via coordinate reference data or geocoding information, such as GPS as well as x-y-z position or angle of capture device(s) 830 relative to drone 400.1 or ground tracking path of autonomous vehicle 400.4.

Travel plan for vehicle 400 may consist of an arc around the specimen, such as patient P with an overlap to enable the capture of image files, datasets, or slices SL of the specimen via capture device(s) 830, a series of cross-sections of the body including bones, blood vessels, and soft tissue as shown in FIGS. 4A1, 4A2, 4A3, and 4A4.

Figure 12:
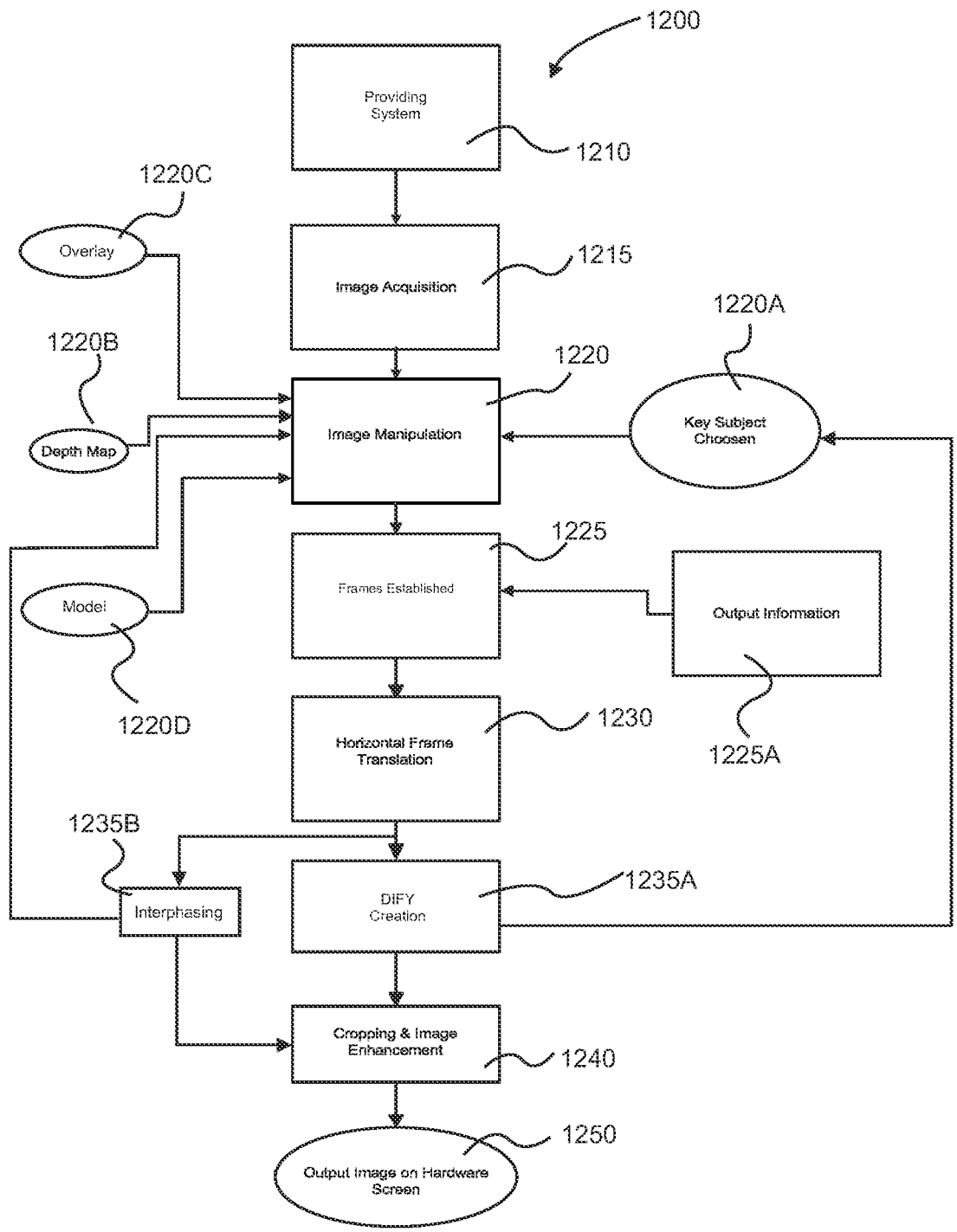
FIG. 12 is an exemplary embodiment of a flow diagram of a method of generating a multidimensional image(s)/sequence captured utilizing capture devices shown in FIGS. 8A-8C.

In block or step 845 and FIG. 12 step 1215, capturing images, files, and dataset, via capture device(s) 830, such as 2D RGB high resolution digital camera (to capture a series of 2D images of terrain T, broad image of terrain or sets of image sections as tiles), LIDAR, IR, EM images or other like spectrum formats (to capture a digital elevation model or depth or z-axis of terrain T, DEM capture device) images, files or datasets, labels and identifies the datasets of the terrain T of scene S based on the source capture device along with coordinate reference data or geocoding information of the vehicle 400 relative to the terrain T of scene S to obtain images, files or datasets, and to further label and identify images, files, and dataset of the terrain T of scene S based on the source capture device along with coordinate reference data or geocoding information, such as GPS.

Moreover, capturing detailed image files, datasets, or slices SL of the specimen via rotating R capture device(s) 830, a series of cross-sections of the body including bones, blood vessels, and soft tissue as shown in FIGS. 4A1, 4A2, 4A3, and 4A4.

Furthermore, capture of images, files, and dataset, via capture device(s) 830, such as underwater utilities such as concrete, metals, pipes, cables C or masonry, substructure, topography of terrain T of scene S, marine life ML, and mineral M, oil, and gas OG deposits and the like beneath the surface SF in the subsurface SB as shown in FIGS. 4B and 4C.

In block or step 855 and FIG. 12 step 1220, modifying images, files, and dataset, from capture device(s) 830, such as using selected 2D RGB high resolution digital camera (broad image of terrain or sets of image sections as tiles), LIDAR (dataset sections as model or map terrain), IR, EM as well as via computer system 10 having capture device(s) 830, display 628, and applications 624 as described above in FIGS. 6-7.

Moreover, modifying image files, datasets, or slices SL of the specimen via capture device(s) 830, a series of cross-sections of the body including bones, blood vessels, and soft tissue as shown in FIGS. 4A1, 4A2, 4A3, and 4A4.

Furthermore, modifying images, files, and dataset, via capture device(s) 830, such as underwater utilities such as concrete, metals, pipes, cables C or masonry, substructure, topography of terrain T of scene S, marine life ML, and mineral M, oil, and gas OG deposits and the like beneath the surface SF in the subsurface SB as shown in FIGS. 4B and 4C.

Moreover, in block or step 855 and FIG. 12 step 1220, modifying LIDAR (dataset sections as tiles). For example, computer system 10 having display 628, and applications 624 as described above in FIGS. 6-7, where application 624 may include a program called LASTOOLS-LASMERGE, which may be utilized to merge a series of 2D digital images or tiles into a single 2D digital image dataset and to merge LIDAR scans (digital elevation scans) into a LIDAR dataset (digital elevation scans) into a digital elevation model or map, step 855A. Once in a single dataset, a user may select an area of interest (AOI) within the single dataset of merged images, files, tiles, or datasets via application 624, such as LASTOOLS-LASCLIP to clip out the LIDAR data for the specific AOI 855B. Note, LIDAR (dataset sections as tiles) as a single dataset contains all of the LIDAR returns, including but not limited to bare earth (Class 2), vegetation, buildings and the like, which may be included or removed or segmented based on class number of LIDAR via application 624, such as LASTOOLS-LAS2LAS to into a LIDAR segmented returns with selected class number(s) as a second dataset 855C. Saved second dataset 855C AOI and its geocoding.

Moreover, in block or step 855 and FIG. 12 step 1220, modifying 2D RGB high resolution digital camera image base map layer, a multi-resolution true color image overlay via computer system 10 having display 628, and applications 624 as described above in FIGS. 6-7, where application 624 may include a program called ArcGIS Pro. Application 624, such as ArcGIS Pro may be utilized to zoom, fly through into area of interest (AOI) within 2D RGB high resolution digital camera image base map layer as a second image set 865B. Save second image set 865B AOI and its geocoding.

Moreover, in block or step 855 and FIG. 12 step 1220, modifying industry standard format of a Digital Imaging and Communications in Medicine (DICOM) image files, datasets, or slices SL of the specimen via capture device(s) 830, a series of cross-sections of the body including bones, blood vessels, and soft tissue as shown in FIGS. 4A1, 4A2, 4A3, and 4A4. First process, import image files, datasets, or slices SL into RADIANT, a DICOM viewer or other image viewer as shown in FIG. 4A2. Create three dimensional volumetric model MD from image files, datasets, or slices SL as shown in FIG. 4A3. Application 624, such as ArcGIS Pro may be utilized to zoom, fly through into area of interest (AOI) within three dimensional volumetric model MD. Save second image set 865B AOI and its geocoding.

Assign transfer function to three dimensional volumetric model MD from image files, datasets, or slices SL (texture, color) as shown in FIG. 4A3. Crop, slice, segment three dimensional volumetric model MD as required. Set zero point (facing) and Key Subject KS (point of rotation of three dimensional volumetric model MD on Z axis). Create for example, one degree (1°) sequence of frames from rotation of three dimensional volumetric model M, such as (16+1 or 32+1) plus zero point. For example, sequence for 16 may be −8 −7 −6 −5 −4 −3 −2 −1 0 1 2 3 4 5 6 7 8 (palindrome loop of frames).

Furthermore, in block or step 855 and FIG. 12 step 1220, modifying industry standard format of a Digital Imaging and Communications in Medicine (DICOM) image files, datasets, or slices SL of the specimen via capture device(s) 830, a series of cross-sections of the body including bones, blood vessels, and soft tissue as shown in FIGS. 4A1, 4A2, 4A3, and 4A4. Second process DIF 1235A, import frames, such as one degree)(1° sequence of frames from rotation of three dimensional volumetric model MD, such as −8 −7 −6 −5 −4 −3-2 −1 0 1 2 3 4 5 6 7 8 (palindrome loop of frames) into PHOTOSHOP, an image editing tool, or the like. Note alignment points are already selected in the previous steps. Create animation timeline in PHOTOSHOP and add frames in sequence, such as one degree (1°) sequence of frames from rotation of three dimensional volumetric model MD, such as −8 −7 −6 −5 −4 −3 −2 −1 0 1 2 3 4 5 6 7 8 to time line. Set frame duration in PHOTOSHOP to approximately 0.08-0.12 seconds per frame, other time frames may be utilized to produce different speed DIF. Set repeat of frames in palindrome loop to forever or repeat (DIF).

Furthermore, in block or step 855 and FIG. 12 step 1220, modifying industry standard format of a Digital imaging and Communications in Medicine (DICOM) image files, datasets, or slices SL of the specimen via capture device(s) 830, a series of cross-sections of the body including bones, blood vessels, and soft tissue as shown in FIGS. 4A1, 4A2, 4A3, and 4A4. Second process stereo pair 1235A, import frames, such as one degree (1°) sequence of frames from rotation of three dimensional volumetric model MD, such as −8 −7 −6 −5 −4 −3 −2 −1 0 1 2 3 4 5 6 7 8 (palindrome loop of frames) into PHOTOSHOP, an image editing tool, or the like. Note alignment points are already selected in the previous steps. Select stereo pair from Stereo Pair Frames column from, for example, −8 −7 −6 −5 −4 −3 −2 −1 0 1 2 3 4 5 6 7 8 based on chart in FIG. 8D2 for a body part identified in column ROI having parallax in column Parallax total.

Still furthermore, block or step 855 and FIG. 12 step 1240 a user U of computer system 10 via dataset editing application 624 may select body parts (via a slider on FIG. 16B) for viewing as DIF or stereo pair based on Hounsfeld units HU set forth in FIG. 8D3, where Substance of human body HB innards IN lying beneath the subsurface of the skin SK may include but not limited to body B, head H, organs, such as brain BR, Thyroid TY, lung LG, heart HT, skin SK, liver LV, stomach ST, kidney KD, large intestine LI, small intestine SI, spine SP, bone (pelvis PV), artery AT, blood vessels BV, muscle, tendon, and other human body parts, as shown FIG. 4A3 have different Hounsfeld units HU of density collected with DICOM image information.

In block or step 870, overlaying merged 2D RGB high resolution digital camera image base map layer, second image set 865B, as second image set 865B AOI and its geocoding images on LIDAR merged segmented returns with selected class number(s), second dataset 855C, as second dataset 855C AOI and its geocoding, and save as overlay 2D RGB and LIDAR segmented AOI. Saved overlay 2D RGB and LIDAR segmented AOI and its geocoding.

It is contemplated herein that specific software programs called out herein were used to do the work on the prototype datasets and other software programs may be utilized that perform the operations those tools perform or develop better software programs perform the operations those tools perform.

In block or step 875 and FIG. 12 step 1250, exporting overlay 2D RGB and LIDAR (Date Set) segmented AOI dataset, from capture device(s) 830. Export DIF as a GIF using guidelines for targeted display 208. Export stereo .JPS (jpeg stereo) as a .MPO (multi picture object). JPS files use half of the image area to represent the left and right views. MPO uses the full image area and stacks the left and right view. The left view is always the first in the sequence. The background should move from left to right and the foreground right to left. Create the .MPO file or .JPS file in the same way described above.

Figure 9:
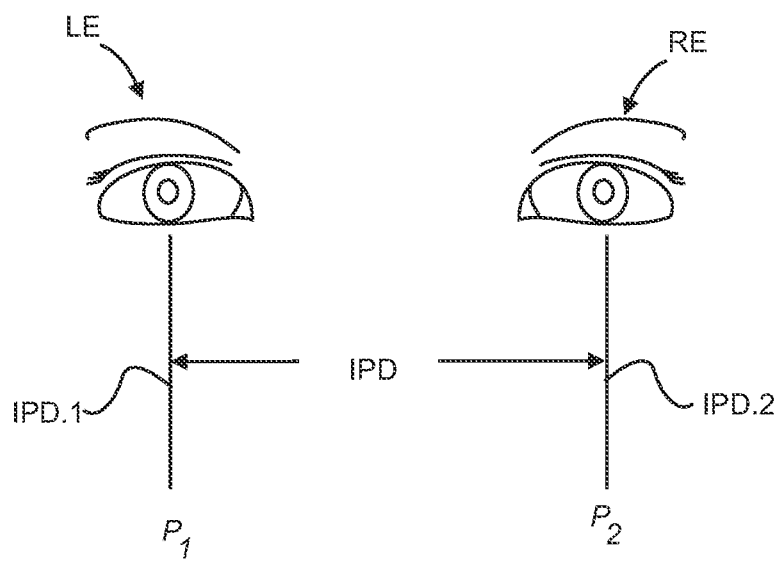
FIG. 9 is a diagram of an exemplary embodiment of human eye spacing the intraocular or interpupillary distance width, the distance between an average human's pupils.

Referring now to FIG. 9, there is illustrated process steps as a flow diagram 900 of a method of modifying images, files, and dataset (Dataset), from capture device(s) 830 along with coordinate reference data or geocoding information, such as GPS, such as using selected 2D RGB high resolution digital camera (broad image of terrain or sets of image sections as tiles), LIDAR (dataset sections as tiles), IR, EM via computer system 10 having capture device(s) 830, display 628, and applications 624 as described above in FIGS. 6-7 of terrain T of scene S, the process of acquiring Data Set, manipulating, generating frames, reconfiguring, processing, storing a digital multi-dimensional image sequence and/or multi-dimensional image as performed by a computer system 10, and viewable on display 628. Note in FIGS. 13 and 16B some steps designate a manual mode of operation may be performed by a user U, whereby the user is making selections and providing input to computer system 10 in the step whereas otherwise operation of computer system 10 is based on the steps performed by application program(s) 624 in an automatic mode.

In block or step 1210, providing computer system 10 having vehicle 400, capture device(s) 830, display 628, and applications 624 as described above in FIGS. 6-8, to enable capture plurality of images, files, and dataset (Dataset) of terrain T of scene S while in motion via vehicle 400. Moreover, the display of digital image(s) on display 628 (DIFY or stereo 3D) where modifying images, files, and dataset (Dataset), from capture device(s) 830 along with coordinate reference data or geocoding information, such as GPS (n devices) to visualize on display 628 as a digital multi-dimensional image sequence (DIFY) or digital multi-dimensional image (stereo 3D).

In block or step 1215 and block or step 845 and FIG. 8, computer system 10 via dataset capture application 624 (via systems of capture as shown in FIGS. 8) is configured to capture a plurality images, files, and dataset (Dataset) of terrain T of scene S while in motion via vehicle 400 via capture module 830 having plurality of capture device(s) 830 (n devices), or the like mounted thereon vehicle 400 and may utilize integrating I/O devices 852 with computer system 10, I/O devices 852 may include one or more sensors in communication with computer system 10 to measure distance between computer system 10 (capture device(s) 830) and selected depths in scene S (depth) such as Key Subject KS, Near Plane NP, N, Far Plane FP, B, and any plane therebetween and set the focal point of one or more plurality of dataset from capture device(s) 830 (n devices).

3D Stereo, user U may tap or other identification interaction with selection box 812 to select or identify key subject KS in the source images, left image 1102 and right image 1103 of scene S, as shown in FIG. 16. Additionally, in block or step 1215, utilizing computer system 10, display 628, and application program(s) 206 (via image capture application) settings to align(ing) or position(ing) an icon, such as cross hair 814, of FIG. 16B, on key subject KS of a scene S displayed thereon display 628, for example by touching or dragging image of scene S or pointing computer system 10 in a different direction to align cross hair 814, of FIG. 16, on key subject KS of a scene S. In block or step 1215, using, obtaining or capturing images(n) of scene S) focused on selected depths in an image or scene (depth) of scene S.

Alternatively, computer system 10 via dataset capture application 624 and display 628 may be configured to operate in auto mode wherein one or more sensors 852 may measure the distance between computer system 10 (capture device(s) 830) and selected depths in scene S (depth) such as Key Subject KS. Alternatively, in manual mode, a user may determine the correct distance between computer system 10 and selected depths in scene S (depth) such as Key Subject KS.

It is recognized herein that user U may be instructed on best practices for capturing images(n) of scene S via computer system 10 via dataset capture application 624 and display 628, such as frame the scene S to include the key subject KS in scene S, selection of the prominent foreground feature of scene S, and furthest point FP in scene S, may include identifying key subject(s) KS in scene S, selection of closest point CP in scene S, the prominent background feature of scene S and the like. Moreover, position key subject(s) KS in scene S a specified distance from capture device(s) 830) (n devices). Furthermore, position vehicle 400 a specified distance from closest point CP in scene S or key subject(s) KS in scene S.

For example, vehicle 400 vantage or viewpoint of terrain T of scene S about the vehicle, wherein a vehicle may be configured with from capture device(s) 830 (n devices) from specific advantage points of vehicle 400. Computer system 10 (first processor) via image capture application 624 and plurality of capture device(s) 830 (n devices) may be utilized to capture multiple sets of plurality of images, files, and dataset (Dataset) of terrain T of scene S from different positions around vehicle 400, especially an auto piloted vehicle, autonomous driving, agriculture, warehouse, transportation, ship, craft, drone, and the like.

Alternatively, in block or step 1215, user U may utilize computer system 10, display 628, and application program (s) 624 to input plurality of images, files, and dataset (Dataset) of terrain T of scene S, such as via AirDrop, DROP BOX, or other application.

Moreover, in block or step 1215, computer system 10 via dataset capture application 624 (via systems of capture as shown in FIGS. 8) is configured to capture a plurality images, files, and dataset (Dataset) of terrain T of scene S while in motion via vehicle 400 via capture module 830 having plurality of capture device(s) 830 (n devices). Vehicle 400 motion and positioning may include aerial vehicle 400 movement and capture, including: a) a switchback flight path or other coverage flight path of vehicle 400 over terrain T of scene S to capture plurality images, files, and dataset (Dataset) as tiles of terrain T of scene S to be stitched together via LASTTOOLS-LASMERGE to merge the tiles into a single dataset, such as such as 2D RGB high resolution digital camera (broad image of terrain or sets of image sections as tiles), LIDAR to generate a cloud point or digital elevation model of terrain T of scene S, IR, EM images, files or datasets, labels and identifies the datasets of the terrain T of scene S based on the source capture device along with coordinate reference data or geocoding information; b) an arcing flight path of vehicle 400 over terrain T of scene S to capture images, files, and dataset (Dataset) as tiles of terrain T of scene S, such as such as (left and right) 2D RGB high resolution digital camera (broad image of terrain or sets of image sections as tiles),and LIDAR cloud points digital elevation model, IR, EM images, files or datasets, labels and identifies the datasets of the terrain T of scene S based on the source capture device along with coordinate reference data or geocoding information, c) an arcing flight path of vehicle 400 over terrain T of scene S to capture a pair (sequence or a series of degree separated, such as such as 1 degree separated −5, −4, −3, −2, −1, 0, 1, 2, 3, 4, 5) images, files, and dataset (Dataset) as tiles of terrain T of scene S, such as such as (left and right) 2D RGB high resolution digital camera (broad image of terrain or sets of image sections as tiles), and LIDAR cloud points digital elevation model, IR, EM images, files or datasets, labels and identifies the datasets of the terrain T of scene S based on the source capture device along with coordinate reference data or geocoding information (acquisition Dataset). Note, 2D RGB high resolution image with coordinate reference data or geocoding information may be format, such as (tiff) or other like format and digital elevation model (DEM) file with coordinate reference data or geocoding information may be format, such as LIDAR file format LAS.

Moreover, in block or step 1215, computer system 10 via dataset capture application 624 (via systems of capture as shown in FIGS. 8) is configured to capture a plurality images, files, and dataset (Dataset), such as capturing detailed image files, datasets, or slices SL of the specimen via capture device(s) 830, a series of cross-sections of the body including bones, blood vessels, and soft tissue as shown in FIGS. 4A1, 4A2, 4A3, and 4A4. Furthermore, capture of images, files, and dataset, via capture device(s) 830, such as underwater utilities such as concrete, metals, pipes, cables C or masonry, substructure, topography of terrain T of scene S, marine life ML, and mineral M, oil, and gas OG deposits and the like beneath the surface SF in the subsurface SB as shown in FIGS. 4B and 4C. Moreover, modifying image files, datasets, or slices SL of the specimen via capture device(s) 830, a series of cross-sections of the body including bones, blood vessels, and soft tissue as shown in FIGS. 4A1, 4A2, 4A3, and 4A4. Furthermore, modifying images, files, and dataset, via capture device(s) 830, such as underwater utilities such as concrete, metals, pipes, cables C or masonry, substructure, topography of terrain T of scene S, marine life ML, and mineral M, oil, and gas OG deposits and the like beneath the surface SF in the subsurface SB as shown in FIGS. 4B and 4C.

Additionally, in block or step 1215, utilizing computer system 10, display 628, and application program(s) 624 (via dataset capture application) settings to align(ing) or position (ing) an icon, such as cross hair 814, of FIG. 13 or 16B, on key subject KS of a scene S displayed thereon display 628, for example by touching or dragging dataset of scene S, or touching and dragging key subject KS, or pointing computer system 10 in a different direction to align cross hair 1310, of FIG. 13 or 16B, on key subject KS of a scene S. In block or step 1215, obtaining or capturing plurality images, files, and dataset (Dataset) of terrain T of scene S from plurality of capture device(s) 830 (n devices) focused on selected depths in an image or scene (depth) of scene S.

Moreover, in block or step 1215, integrating I/O devices 632 with computer system 10, I/O devices 632 may include one or more sensors 852 in communication with computer system 10 to measure distance between computer system 10/ capture device(s) 830 (n devices) and selected depths in scene S (depth) such as Key Subject KS and set the focal point of an arc or trajectory of vehicle 400 and capture device(s) 830. It is contemplated herein that computer system 10, display 628, and application program(s) 624, may operate in auto mode wherein one or more sensors 840 may measure the distance between capture device(s) 830 and selected depths in scene S (depth) such as Key Subject KS and set parameters of travel for vehicle 400 and capture device 830. Alternatively, in manual mode, a user may determine the correct distance between vehicle 400 and selected depths in scene S (depth) such as Key Subject KS. Or computer system 10, display 628 may utilize one or more sensors 852 to measure distance between vehicle 400/capture device 830 and selected depths in scene S (depth) such as Key Subject KS and provide on screen instructions or message (distance preference) to instruct user U to move vehicle 400 closer or father away from Key Subject KS or near plane NP to optimize capture device(s) 830 and images, files, and dataset (Dataset) of terrain T of scene S.

In block or step 1220 and, computer system 10 via dataset manipulation application 624 is configured to receive 2D RGB high resolution digital camera (broad image of terrain or sets of image sections as tiles or stitched tiles), and LIDAR cloud points digital elevation model, IR, EM images, files or datasets, labels and identifies the datasets of the terrain T of scene S based on the source capture device along with coordinate reference data or geocoding information as acquisition Dataset (acquisition Dataset) through dataset acquisition application, in block or step 1215.

Moreover, in block or step 855 and FIG. 12 step 1220, modifying industry standard format of a Digital Imaging and Communications in Medicine (DICOM) image files, datasets, or slices SL of the specimen via capture device(s) 830, a series of cross-sections of the body including bones, blood vessels, and soft tissue as shown in FIGS. 4A1, 4A2, 4A3, and 4A4. First process, import image files, datasets, or slices SL into RADIANT, a DICOM viewer or other image viewer as shown in FIG. 4A2. Create three dimensional volumetric model MD from image files, datasets, or slices SL as shown in FIG. 4A3. Application 624, such as ArcGIS Pro may be utilized to zoom, fly through into area of interest (AOI) within three dimensional volumetric model MD. Save second image set 865B AOI and its geocoding.

In one embodiment, dataset manipulation application 624 may be utilized to convert 2D RGB high resolution digital camera (broad image of terrain or sets of image sections as tiles or stitched tiles) to a digital source image, such as a JPEG, GIF, TIF format. Ideally, receive 2D RGB high resolution digital camera (broad image of terrain or sets of image sections as tiles or stitched tiles) includes a number of visible objects, subjects or points therein, such as foreground or closest point CP associated with near plane NP, far plane FP or furthest point associated with a far plane FP, and key subject KS with coordinate reference data or geocoding information. The near plane NP, far plane FP point are the closest point and furthest point from vehicle 400 and capture device(s) 830. The depth of field is the depth or distance created within the object field (depicted distance between foreground to background). The principal axis is the line perpendicular to the scene passing through the key subject KS point, while the parallax is the displacement of the key subject KS point from the principal axis, see FIG. 11. In digital composition the displacement is always maintained as a whole integer number of pixels from the principal axis.

Alternatively, computer system 10 via image manipulation application and display 624 may be configured to enable user U to select or identify images of scene S as left image 1102 and right image 1103 of scene S. User U may tap or other identification interaction with selection box 812 to select or identify key subject KS in the source images, left image 1102 and right image 1103 of scene S, as shown in FIG. 16.

In block or step 1220D, computer system 10 via dataset manipulation application 624 (cloud ball algorithm) may be utilized to generate a 3D model MD or mesh surface (digital elevation model) of terrain T of scene S from LIDAR digital elevation model or cloud points. If cloud points are sparse consisting of holes, dataset manipulation application 624 may be utilized to fill in or reconstruct missing data points, holes or surfaces with similar data points from proximate known or tangent plane or data points surrounding the hole to generate or reconstruct a more complete 3D model or mesh surface of terrain T of scene S with coordinate reference data or geocoding information.

Moreover, these two datasets 2D RGB high resolution digital camera (broad image of terrain or sets of image sections as tiles or stitched tiles), such as 16 bit uncompressed color RGB TIFF file format at 300 DPI and 3D model or mesh surface of terrain T of scene S from LIDAR digital elevation model or cloud points will need to match features, points, surfaces, and be registerable to each other with each having coordinate reference data or geocoding information.

Moreover, in block or step 855 and FIG. 12 step 1220, modifying industry standard format of a Digital Imaging and Communications in Medicine (DICOM) image files, datasets, or slices SL of the specimen via capture device(s) 830, a series of cross-sections of the body including bones, blood vessels, and soft tissue as shown in FIGS. 4A1, 4A2, 4A3, and 4A4. First process, import image files, datasets, or slices SL into RADIANT, a DICOM viewer or other image viewer as shown in FIG. 4A2. Create three dimensional volumetric model MD from image files, datasets, or slices SL as shown in FIG. 4A3. Application 624, such as ArcGIS Pro may be utilized to zoom, fly through into area of interest (AOI) within three dimensional volumetric model MD. Save second image set 865B AOI and its geocoding.

Assign transfer function to three dimensional volumetric model MD from image files, datasets, or slices SL (texture, color) as shown in FIG. 4A3. Crop, slice, segment three dimensional volumetric model MD as required. Set zero point (facing) and Key Subject KS (point of rotation of three dimensional volumetric model MD on Z axis). Create for example, one degree (1°) sequence of frames from rotation of three dimensional volumetric model MD, such as (16+1 or 32+1) plus zero point. For example, sequence for 16 may be −8 −7 −6 −5 −4 −3 −2 −1 0 1 2 3 4 5 6 7 8 (palindrome loop of frames).

In block or step 1220B, computer system 10 via depth map application program(s) 624 is configured to create(ing) depth map of 3D model dataset (Depth Map Grayscale Dataset, digital elevation model) or mesh surface of terrain T of scene S from LIDAR digital elevation model or cloud points and makes a matching grey scale digital elevation model of 2D RGB high resolution digital camera (broad image of terrain or sets of image sections as tiles or stitched tiles) with coordinate reference data or geocoding information. A depth map is an image or image channel that contains information relating to the distance of objects, surfaces, or points in terrain T scene S from a viewpoint, such as vehicle 400 and capture device(s) 830. For example, this provides more information as volume, texture and lighting are more fully defined. Once a depth map 1220B is generated then the displacement and parallax can be tightly controlled.

Computer system 10 via depth map application program(s) 624 may identify a foreground, closest point, key subject KS point, and background, furthest point using Depth Map Grayscale Dataset). Moreover, gray scale 0-256 may be utilized to auto select a key subject KS point as a midpoint between 256 or 128 or thereabout with closest point in terrain T of scene S being white and furthest point being black. Alternatively in manual mode, computer system 10 via depth map application program(s) 624 and display 628 may be configured to enable user U to select or identify key subject KS point in Depth Map Grayscale Dataset. User U may tap, move a cursor or box or other identification to select or identify key subject KS in Depth Map Grayscale Dataset 1100, as shown in FIG. 13.

In block or step 1220C, computer system 10 via interlay (ing) application program(s) 624 is configured overlay 2D RGB high resolution digital camera (broad image of terrain or sets of image sections as tiles or stitched tiles) thereon 3D model or mesh surface of terrain T of scene S from LIDAR digital elevation model to generate 3D model or mesh surface of terrain T of scene S with RGB high resolution color (3D color mesh Dataset).

In block or step 1220A, computer system 10 via key subject, application program(s) 624 is configured to identify a key subject KS point in 3D color mesh Dataset. Moreover, computer system 10 via key subject, application program(s) 624 is configured to identify (ing) at least in part a pixel, set of pixels (finger point selection on display 628) in 3D color mesh Dataset as key subject KS.

In block or step 1225, computer system 10 via frame establishment program(s) 624 is configured to create or generate frames, recording of images of 3D color mesh Dataset from a virtual camera shifting, rotation, or arcing position, such as such as 0.5 to 1 degree of separation or movement between frames, such as −5, −4, −3, −2, −1, 0, 1, 2, 3, 4, 5; for DIFY represented 1101, 1102, 1103, 1104 (set of frames 1100) of 3D color mesh Dataset of terrain T of scene S to generate parallax; for 3D Stereo as left and right; 1102, 1103 images of 3D color mesh Dataset. Computer system 10 via key subject, application program(s) 624 may establish increments, of shift for example one (1) degree of total shift between the views (typically 10-70 pixel shift on display 628). This simply means a complete sensor (capture device) rotation of 360 degrees around key subject KS would have 360 views so we are only using/need view 1 and view 2, for 3D Stereo as left and right; 1102, 1103 images of 3D color mesh Dataset. This gives us 1 degree of separation/disparity for each view assuming rotational parallax orbiting around a key subject (zero parallax point). This will likely establish a minimum disparity/parallax that can be adjusted up as the sensor (image capture module 830) moves farther away from key subject KS.

For example, key subject KS point may be identified in 3D color mesh Dataset 3D space and virtual camera orbits or moves in an arcing direction about key subject KS point to generate images of 3D color mesh Dataset of terrain T of scene S at total distance or degree of rotation to generate frames of 3D color mesh Dataset of terrain T of scene S (set of frames 1100). This creates parallax between any objects in the foreground or closest point CP associated with near plane NP and background or far plane FP or furthest point associated with a far plane FP of terrain T of scene S relative to key subject KS point. The objects closer to key subject KS point do not move as much as objects further away from key subject KS point (as virtual camera orbits or moves in an arcing direction about key subject KS). The degree separated for virtual camera correspond to the angles subtend by the human visual system, i.e., the interpupillary distance (IPD).

In block or step 1225A, computer system 10 via frame establishment program(s) 624 is configured to input or upload source images captured external from computer system 10.

In block or step 1230, computer system 10 via horizontal image translation (HIT) program(s) 624 is configured to align 3D frame Dataset horizontally about key subject KS point (digital pixel) (horizontal image translation (HIT) as shown in 11A and 11B with key Subject KS point within a Circle of Comfort relationship to optimize digital multi-dimensional image sequence 1010 or for the human visual system.

Moreover, a key subject KS point is identified in 3D frame dataset 1100, and each of the set of frames 1100 is aligned to key subject KS point, and all other points in the set of frames 1100 shift based on a spacing of the virtual camera shifting, rotation, or arcing position.

Figure 10:
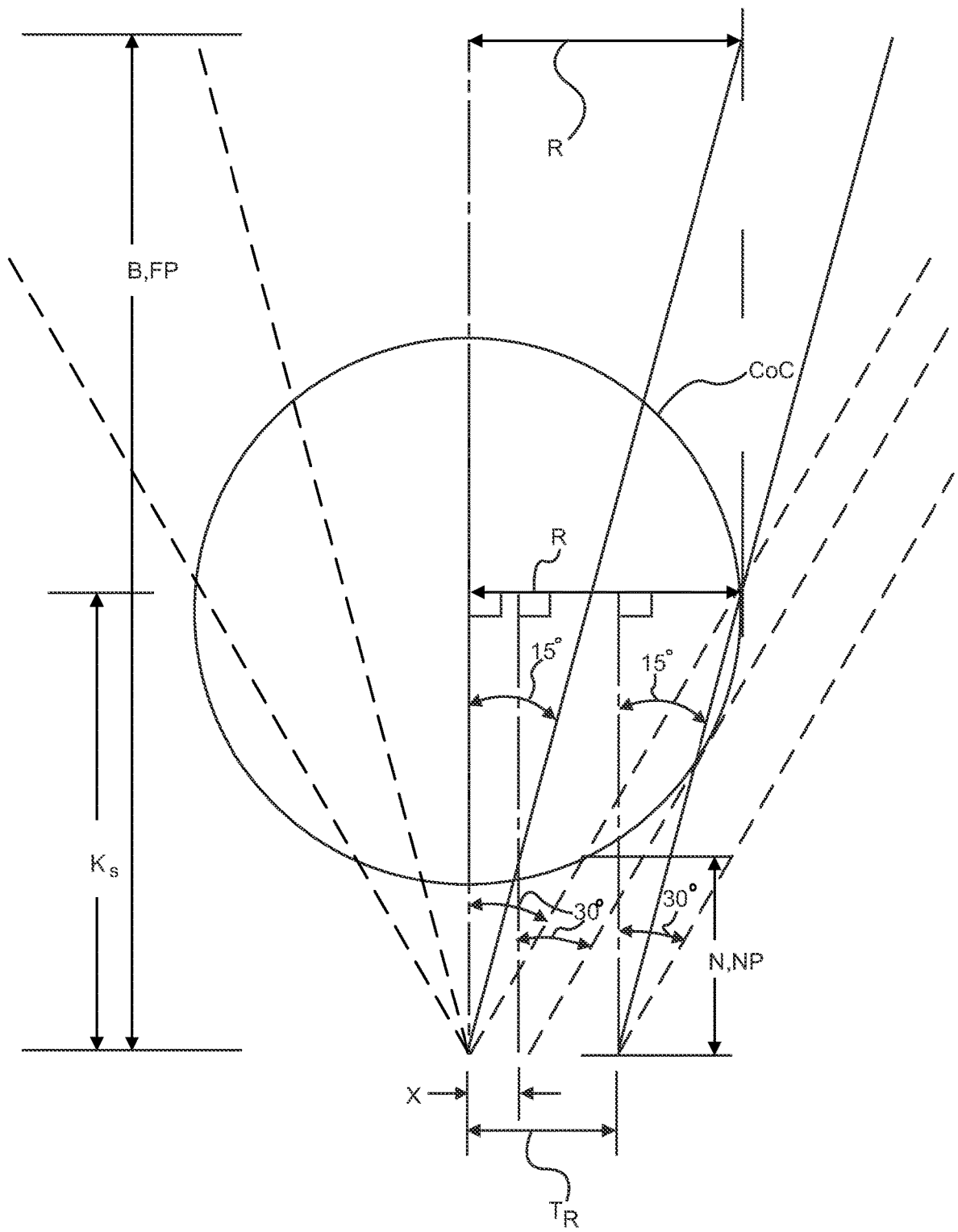
FIG. 10 is a top view illustration identifying planes of a scene and a circle of comfort in scale with right triangles defining positioning of capture devices on lens plane.
Figure 10C:
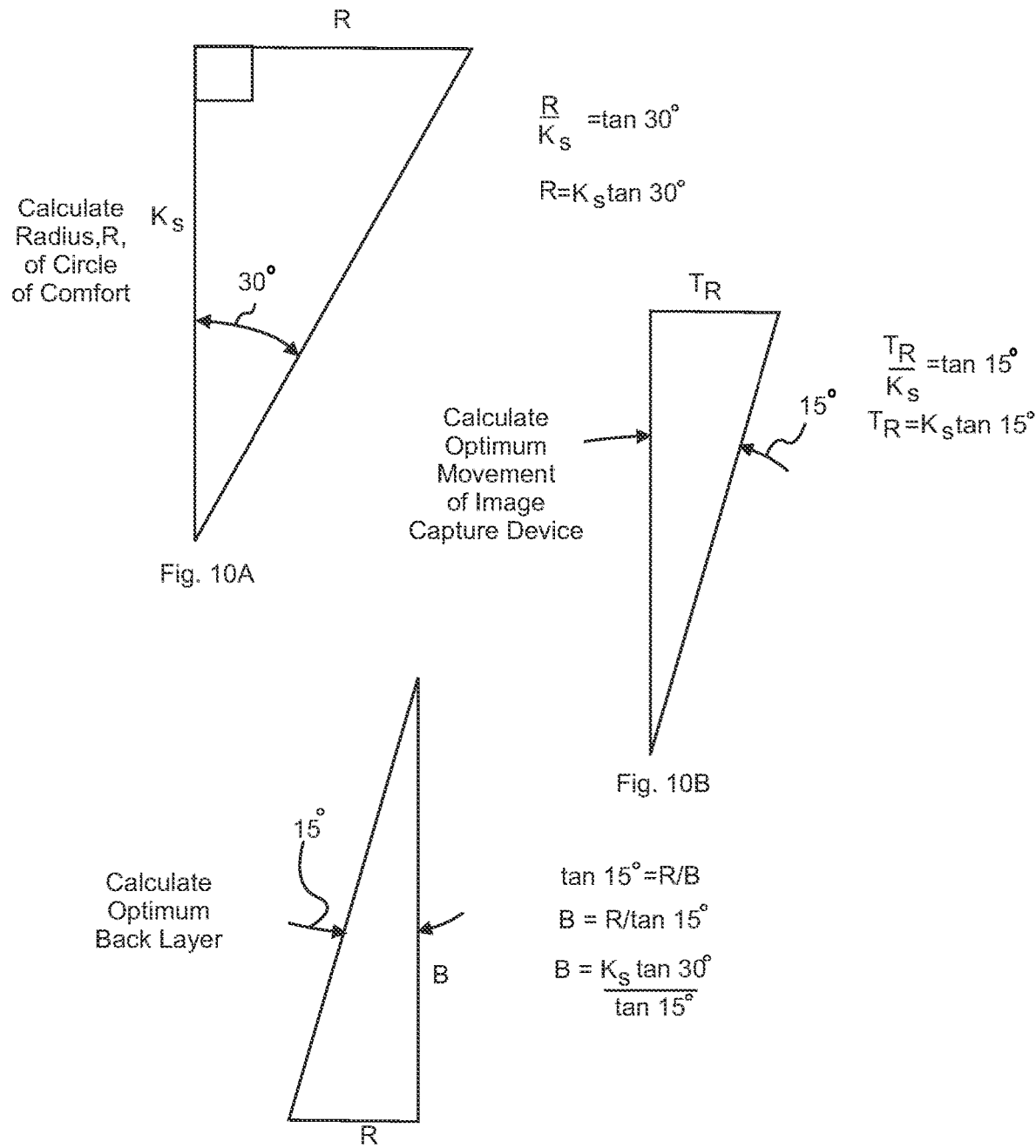
FIG. 10C is a top view illustration of an exemplary embodiment identifying right triangles to calculate the optimum distance of backplane of FIG. 10.

Referring now to FIG. 10, there is illustrated by way of example, and not limitation a representative illustration of Circle of Comfort (CoC) in scale with FIGS. 4 and 3. For the defined plane, the image captured on the lens plane will be comfortable and compatible with human visual system of user U viewing the final image displayed on display 628 if a substantial portion of the image(s) are captured within the Circle of Comfort (CoC) by a virtual camera. Any object, such as near plane N, key subject plane KSP, and far plane FP captured by virtual camera (interpupillary distance IPD) within the Circle of Comfort (CoC) will be in focus to the viewer when reproduced as digital multi-dimensional image sequence viewable on display 628. The back-object plane or far plane FP may be defined as the distance to the intersection of the 15 degree radial line to the perpendicular in the field of view to the 30 degree line or R the radius of the Circle of Comfort (CoC). Moreover, defining the Circle of Comfort (CoC) as the circle formed by passing the diameter of the circle along the perpendicular to Key Subject KS plane (KSP) with a width determined by the 30 degree radials from the center point on the lens plane, image capture module 830.

Linear positioning or spacing of virtual camera (interpupillary distance IPD) on lens plane within the 30 degree line just tangent to the Circle of Comfort (CoC) may be utilized to create motion parallax between the plurality of images when viewing digital multi-dimensional image sequence viewable on display 628, will be comfortable and compatible with human visual system of user U.

Referring now to FIG. 10A, 10B, 10C, and 11, there is illustrated by way of example, and not limitation right triangles derived from FIG. 10. All the definitions are based on holding right triangles within the relationship of the scene to image capture. Thus, knowing the key subject KS distance (convergence point) we can calculate the following parameters.

FIG. 6A to calculate the radius R of Comfort (CoC).
R/KS=tan 30 degree
R=KS*tan 30 degree
FIG. 6B to calculate the optimum distance between virtual camera (interpupillary distance IPD).
TR/KS=tan 15 degree
TR=KS*tan 15 degree; and IPD is 2*TR
FIG. 6C calculate the optimum far plane FP
Tan 15 degree=RB
B=(KS*tan 30 degree)/tan 15 degree
Ratio of near plane NP to far plane FP=((KS/(KS 8 tan 30 degree))*tan 15 degree In order to understand the meaning of TR, point on the linear image capture line of the lens plane that the 15 degree line hits/touches the Comfort (CoC). The images are arranged so the key subject KS point is the same in all images captured via virtual camera.

A user of virtual camera composes the scene S and moves the virtual camera in our case so the circle of confusion conveys the scene S. Since virtual camera is capturing images linearly spaced or arced there is a binocular disparity between the plurality of images or frames captured by virtual camera. This disparity can be change by changing virtual camera settings or moving the key subject KS back or away from virtual camera to lessen the disparity or moving the key subject KS closer to virtual camera to increase the disparity. Our system is a virtual moving in linear or arc over model MD.

Figure 11:
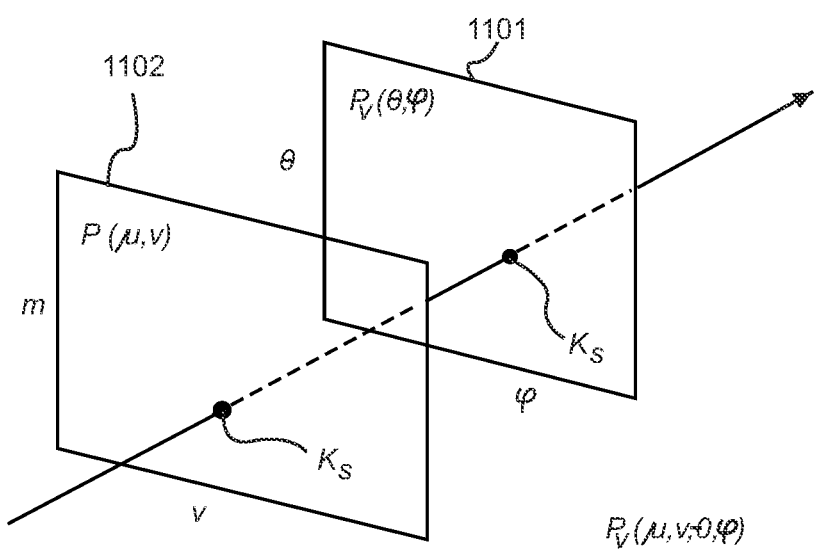
FIG. 11 is a diagram illustration of an exemplary embodiment of a geometrical shift of a point between two images (frames), such as in FIG. 11A according to select embodiments of the instant disclosure.
Figures 11A, 11B:
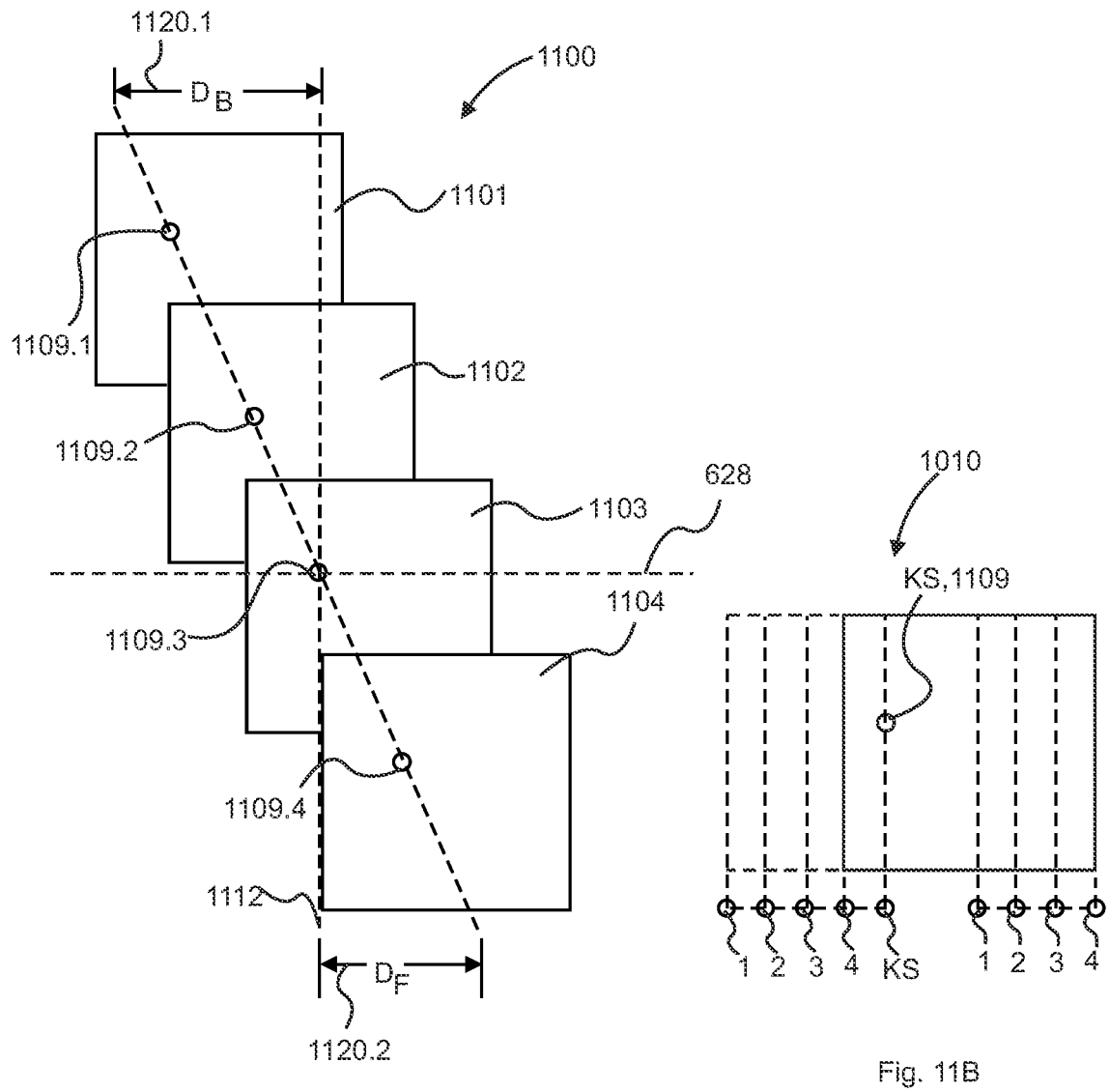
FIG. 11A is a front top view illustration of an exemplary embodiment of four images of a scene captured utilizing capture devices shown in FIGS. 8A-8D and aligned about a key subject point.
FIG. 11B is a front view illustration of an exemplary embodiment of four images of a scene captured utilizing capture devices shown in FIGS. 8A-8D and aligned about a key subject point.

Key subject KS may be identified in each plurality of images of 3D frame dataset 1100 corresponds to the same key subject KS of terrain T of scene S as shown in FIG. 11A, 11B, and 4. It is contemplated herein that a computer system 10, display 628, and application program(s) 624 may perform an algorithm or set of steps to automatically identify subject KS therein set of frames 1100. Alternatively, in block or step 1220A, utilizing computer system 10, (in manual mode), display 628, and application program(s) 624 settings to at least in part enable a user U to align(ing) or edit alignment of a pixel, set of pixels (finger point selection), key subject KS point of set of frames 1100.

It is recognized herein that step 1220, computer system 10 via dataset capture application 624, dataset manipulation application 624, dataset display application 624 may be performed utilizing distinct and separately located computer systems 10, such as one or more user systems 720, 722, 724 and application program(s) 624. For example, using a dataset manipulation system remote from dataset capture system, and remote from dataset viewing system, step 1220 may be performed remote from scene S via computer system 10 (third processor) and application program(s) 624 communicating between user systems 720, 222, 224 and application program(s) 624. Next, via communications link 740 and/or network 750, or 5G computer systems 10 (third processor) and application program(s) 624 via more user systems 720, 722, 724 may receive set of frames 1100 relative to key subject KS point and transmit a manipulated plurality of digital multi-dimensional image sequence (DIFY) and 3D stereo images of scene S to computer system 10 (first processor) and application program(s) 624.

Furthermore, in block or step 1230, computer system 10 via horizontal image translation (HIT) program(s) creates a point of certainty, key subject KS point by performing a horizontal image shift of set of frames 1100 as 3D HIT images, whereby set of frames 1100 overlap at this one point, as shown in FIG. 13. This image shift does two things, first it sets the depth of the image. All points in front of key subject KS point are closer to the observer and all points behind key subject KS point are further from the observer.

Moreover, in an auto mode computer system 10 via image manipulation application may identify the key subject KS based on a depth map dataset in step 1220B.

Horizontal image translation (HIT) sets the key subject plane KSP as the plane of the screen from which the scene emanates (first or proximal plane). This step also sets the motion of objects, such as near plane NP (third or near plane) and far plane FP (second or distal plane) relative to one another. Objects in front of key subject KS or key subject plane KSP move in one direction (left to right or right to left) while objects behind key subject KS or key subject plane KSP move in the opposite direction from objects in the front. Objects behind the key subject plane KSP will have less parallax for a given motion.

In the example of FIGS. 11, 11A and 11B, each layer of set of frames 1100 includes the primary image element of input file images of scene S, such as 3D image or frame 1101, 1102, 1103 and/or 1104. Horizontal image translation (HIT) program(s) 624, performs a process to translate image or frame 1101, 1102, 1103 and 1104 image or frame 1101, 1102, 1103 and 1104 is overlapping and offset from the principal axis 1112 by a calculated parallax value, (horizontal image translation (HIT). Parallax line 1107 represents the linear displacement of key subject KS points 1109.1-1109.4 (digital pixel point) from the principal axis 1112. Preferably delta 1120 between the parallax line 1107 represents a linear amount of the parallax 1120, such as front parallax 1120.2 and back parallax 1120.1.

Calculate parallax, minimum parallax and maximum parallax as a function of number of pixel, pixel density and number of frames, and closest and furthest points, and other parameters as set U.S. Pat. Nos. 9,992,473, 10,033,990, and 10,178,247, incorporated herein by reference in their entirety.

In block or step 1235, utilizing computer system 10 via horizontal and vertical frame DIF translation application 624 may be configured to perform a dimensional image format (DIF) transform of 3D HIT dataset to a 3D DIF images. The DIF transform is a geometric shift that does not change the information acquired at each point in the source image, D set of frames 1100 but can be viewed as a shift of all other points in the source image, D set of frames 1100, in Cartesian space (illustrated in FIG. 11). As a plenoptic function, the DIF transform is represented by the equation:

$$P'(u, v) \times P'(\theta, \phi) = [P_{u,v} + \Delta_{u,v}] \times [P_{\theta,\phi} + \Delta_{\theta,\phi}]$$

Where $\Delta u$, $v = \Delta \theta$, $\phi$

In the case of a digital image source, the geometric shift corresponds to a geometric shift of pixels which contain the plenoptic information, the DIF transform then becomes:

$$(\text{Pixel})_{x,y} = (\text{Pixel})_{x,y} + \Delta_{x,y}$$

Moreover, computer system 10 via horizontal and vertical frame DIF translation application 624 may also apply a geometric shift to the background and or foreground using the DIF transform. The background and foreground may be geometrically shifted according to the depth of each relative to the depth of the key subject KS identified by the depth map 1220B of the source image, set of frames 1100. Controlling the geometrical shift of the background and foreground relative to the key subject KS controls the motion parallax of the key subject KS. As described, the apparent relative motion of the key subject KS against the background or foreground provides the observer with hints about its relative distance. In this way, motion parallax is controlled to focus objects at different depths in a displayed scene to match vergence and stereoscopic retinal disparity demands to better simulate natural viewing conditions. By adjusting the focus of key subjects KS in a scene to match their stereoscopic retinal disparity (an intraocular or inter-pupillary distance width IPD (distance between pupils of human visual system), the cues to ocular accommodation and vergence are brought into agreement.

Referring again to FIG. 4, viewing a DIFY, multidimensional image sequence 1010 on display 628 requires two different eye actions of user U. The first is the eyes will track the closest item, point, or object (near plane NP) in multi-dimensional image sequence 1010 on display 628, which will have linear translation back and forth to the stationary key subject plane KSP due to image or frame 1101, 1102, 1103 and 1104 is overlapping and offset from the principal axis 1112 by a calculated parallax value, (horizontal image translation (HIT)). This tracking occurs through the eyeball moving to follow the motion. Second, the eyes will perceive depth due to the smooth motion change of any point or object relative to the key subject plane KSP and more specifically to the key subject KS point. Thus, DIFYs are composed of one mechanical step and two eye functions.

A mechanical step of translating of the frames so the Key Subject KS point overlaps on all frames. Linear translation back and forth to the stationary key subject plane KSP due to image or frame 1101, 1102, 1103 and 1104 may be overlapping and offset from the principal axis 1112 by a calculated parallax value, (horizontal image translation (HIT). Eye following motion of near plane NP object which exhibits greatest movement relative to the key subject KS (Eye Rotation). Difference in frame position along the key subject plane KSP (Smooth Eye Motion) which introduces binocular disparity. Comparison of any two points other than key subject KS also produces depth (binocular disparity). Points behind key subject plane KSP move in opposite direction than those points in front of key subject KS. Comparison of two points in front or back or across key subject KS plane shows depth.

In block or step 1235A, computer system 10 via palindrome application 626 is configured to create, generate, or produce multidimensional digital image sequence 1010 aligning sequentially each image of set of frames 1100 in a seamless palindrome loop (align sequentially), such as display in sequence a loop of first digital image, image or frame 1101. second digital image, image or frame 1102, third digital image, image or frame 1103, fourth digital image, image or frame 1104. Moreover, an alternate sequence a loop of first digital image, image or frame 1101, second digital image, image or frame 1102, third digital image, image or frame 1103, fourth digital image, image or frame 1104, third digital image, image or frame 1103, second digital image, image or frame 1102, of first digital image, image or frame 1101—1,2,3,4,3,2,1 (align sequentially). Preferred sequence is to follow the same sequence or order in which images were generated set of frames 1100 and an inverted or reverse sequence is added to create a seamless palindrome loop.

It is contemplated herein that other sequences may be configured herein, including but not limited to 1,2,3,4,4,3,2,1 (align sequentially) and the like.

It is contemplated herein that horizontally and vertically align(ing) of first proximal plane, such as key subject plane KSP of each set of frames 1100 and shifting second distal plane, such as such as foreground plane, Near Plane NP, or background plane, Far Plane FP of each subsequent image frame in the sequence based on the depth estimate of the second distal plane for series of 2D images of the scene to produce second modified sequence of 2D images.

Furthermore, in block or step 855 and FIG. 12 step 1220, modifying industry standard format of a Digital Imaging and Communications in Medicine (DICOM) image files, datasets, or slices SL of the specimen via capture device(s) 830, a series of cross-sections of the body including bones, blood vessels, and soft tissue as shown in FIGS. 4A1, 4A2, 4A3, and 4A4. Second process DIF 1235A, import frames, such as one degree (1°) sequence of frames from rotation of three dimensional volumetric model MD, such as −8 −7 −6 −5 −4 −3 −2 −1 0 1 2 3 4 5 6 7 8 (palindrome loop of frames) into PHOTOSHOP, an image editing tool, or the like. Note alignment points are already selected in the previous steps. Create animation timeline in PHOTOSHOP and add frames in sequence, such as one degree (1°) sequence of frames from rotation of three dimensional volumetric model MD, such as −8 −7 −6 −5 −4 −3 −2 −1 0 1 2 3 4 5 6 7 8 to time line. Set frame duration in PHOTOSHOP to approximately 0.08-0.12 seconds per frame, other time frames may be utilized to produce different speed DIF. Set repeat of frames in palindrome loop to forever or repeat (DIF).

In block or step 1235B, computer system 10 via interphasing application 626 may be configured to interphase columns of pixels of each set of frames 1100, specifically as left image 1102 and right image 1103 to generate a multidimensional digital image aligned to the key subject KS point and within a calculated parallax range. As shown in FIG. 16A, interphasing application 626 may be configured to takes sections, strips, rows, or columns of pixels from left image 1102 and right image 1103, such as column 1602A of the source images, left image 1102, and right image 1103 of terrain T of scene S and layer them alternating between column 1602A of left image 1102-LE, and column 1602A of right image 1103-RE and reconfigures or lays them out in series side-by-side interlaced, such as in repeating series 160A two columns wide, and repeats this configuration for all layers of the source images, left image 1102 and right image 1103 of terrain T of scene S to generate multidimensional image 1010 with column 1602A dimensioned to be one pixel 1550 wide.

It is contemplated herein that source images, plurality of images of scene S captured by capture device(s) 830 match size and configuration of display 628 aligned to the key subject KS point and within a calculated parallax range.

Furthermore, in block or step 855 and FIG. 12 step 1220, modifying industry standard format of a Digital Imaging and Communications in Medicine (DICOM) image files, datasets, or slices SL of the specimen via capture device(s) 830, a series of cross-sections of the body including bones, blood vessels, and soft tissue as shown in FIGS. 4A1, 4A2, 4A3, and 4A4. Second process stereo pair 1235A, import frames, such as one degree (1°) sequence of frames from rotation of three dimensional volumetric model MD, such as −8 −7 −6 −5 −4 −3 −2 −1 0 1 2 3 4 5 6 7 8 (palindrome loop of frames) into PHOTOSHOP, an image editing tool, or the like. Note alignment points are already selected in the previous steps. Select stereo pair from Stereo Pair Frames column from, for example, −8 −7 −6 −5 −4 −3 −2 −1 0 1 2 3 4 5 6 7 8 based on chart in FIG. 8D2 for a body part identified in column ROI having parallax in column Parallax total.

In block or step 1240, computer system 10 via dataset editing application 624 is configured to crop, zoom, align, enhance, select density layers, or perform edits thereto set of frames 1100.

Moreover, computer system 10 and editing application program(s) 624 may enable user U to perform frame enhancement, layer enrichment, animation, feathering (smooth), (Photoshop or Acorn photo or image tools), to smooth or fill in the images (n) together, or other software techniques for producing 3D effects on display 628. It is contemplated herein that a computer system 10 (auto mode), display 628, and application program(s) 624 may perform an algorithm or set of steps to automatically or enable automatic performance of align(ing) or edit(ing) alignment of a pixel, set of pixels of key subject KS point, crop, zoom, align, enhance, or perform edits of set of frames 1100 or edit multidimensional digital image or image sequence 1010.

Alternatively, in block or step 1240, utilizing computer system 10, (in manual mode), display 628, and editing application program(s) 624 settings to at least in part enable a user U to align(ing) or edit(ing) alignment of a pixel, set of pixels of key subject KS point, crop, zoom, align, enhance, or perform edits of set of frames 1100 or edit multidimensional digital image or image sequence 1010.

Furthermore DIFY, user U via display 628 and editing application program(s) 624 may set or chose the speed (time of view) for each frame and the number of view cycles or cycle forever as shown in FIG. 13. Time interval may be assigned to each frame in multidimensional digital image sequence 1010. Additionally, the time interval between frames may be adjusted at step 1240 to provide smooth motion and optimal 3D viewing of multidimensional digital image sequence 1010.

It is contemplated herein that a computer system 10, display 628, and application program(s) 624 may perform an algorithm or set of steps to automatically or manually edit or apply effects to set of frames 1100. Moreover, computer system 10 and editing application program(s) 206 may include edits, such as frame enhancement, layer enrichment, feathering, (Photoshop or Acorn photo or image tools), to smooth or fill in the images (n) together, and other software techniques for producing 3D effects to display 3-D multidimensional image of terrain T of scene S thereon display 628.

Now given the multidimensional image sequence 1010, we move to observe the viewing side of the device. Moreover, in block or step 735, computer system 10 via output application 730 (206) may be configured to display multidimensional image(s) 1010 on display 628 for one more user systems 220, 222, 224 via communications link 240 and/or network 250, or 5G computer systems 10 and application program(s) 206.

Figure 15A:
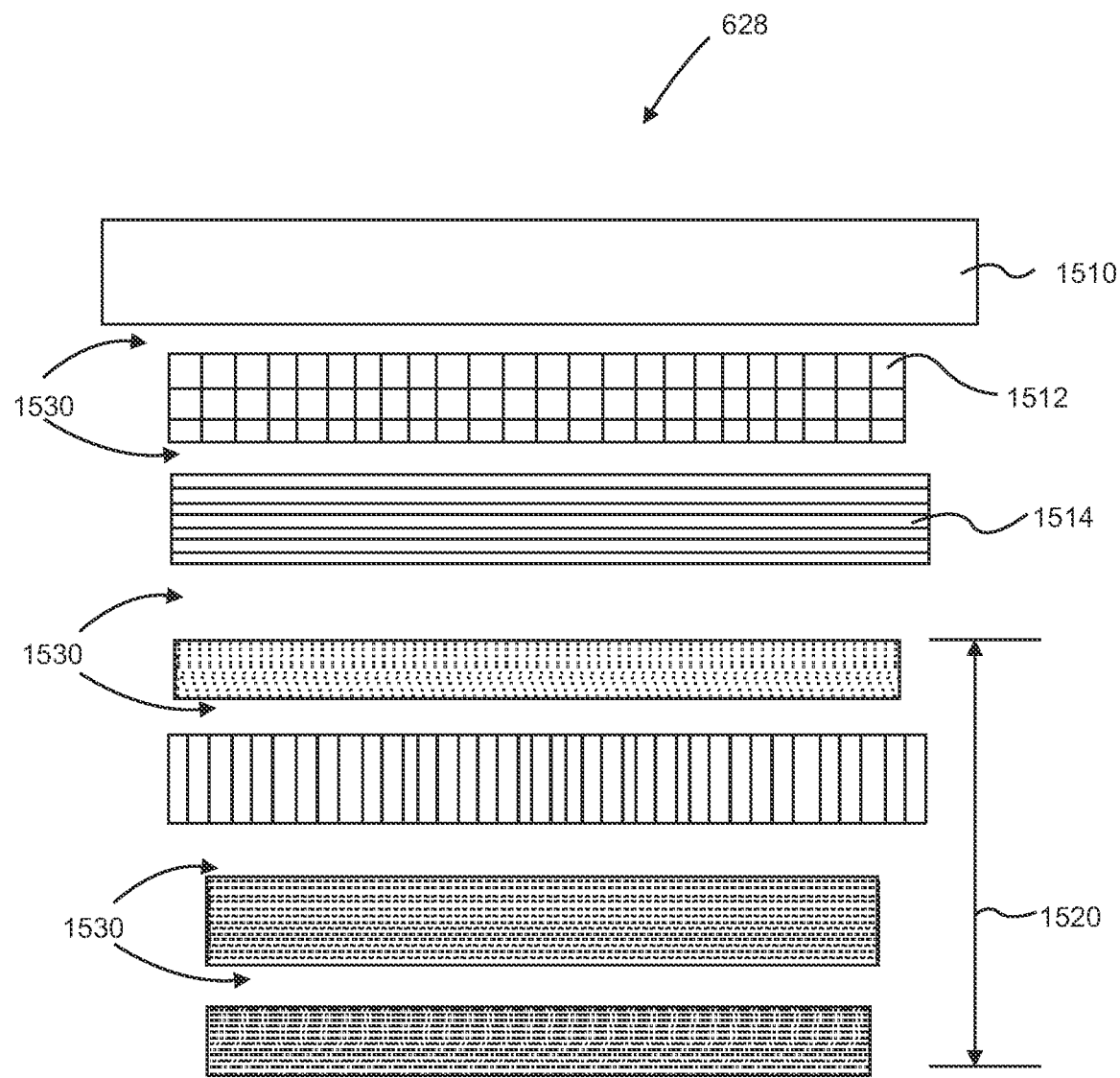
FIG. 15A is a cross-section diagram of an exemplary embodiment of a display stack according to select embodiments of the instant disclosure.

For 3D Stereo, referring now to FIG. 15A, there is illustrated by way of example, and not limitation a cross-sectional, layer, at least one layer view of an exemplary stack up of components of display 628. Display 628 may include an array of or plurality of pixels emitting light, such as LCD panel stack of components 1520 having electrodes, such as front electrodes and back electrodes, polarizers, such as horizontal polarizer and vertical polarizer, diffusers, such as gray diffuser, white diffuser, and backlight to emit red R, green G, and blue B light. Moreover, display 628 may include other standard LCD user U interaction components, such as top glass cover 1510 with capacitive touch screen glass 1512 positioned between top glass cover 1510 and LCD panel stack components 1520. It is contemplated herein that other forms of display 628 may be included herein other than LCD, such LED, ELED, PDP, QLED, and other types of display technologies. Furthermore, display 628 may include a lens array, such as lenticular lens 1514 preferably positioned between capacitive touch screen glass 1512 and LCD panel stack of components 1520, and configured to bend or refract light in a manner capable of displaying an interlaced stereo pair of left and right images as a 3D or multidimensional digital image(s) 1010 on display 628 and, thereby displaying a multidimensional digital image of scene S on display 628. Transparent adhesives 1530 may be utilized to bond elements in the stack, whether used as a horizontal adhesive or a vertical adhesive to hold multiple elements in the stack. For example, to produce a 3D view or produce a multidimensional digital image on display 628, a 1920×1200 pixel image via a plurality of pixels needs to be divided in half, 960×1200, and either half of the plurality of pixels may be utilized for a left image and right image.

It is contemplated herein that lens array may include other techniques to bend or refract light, such as barrier screen (black line), lenticular, parabolic, overlays, waveguides, black line and the like capable of separate into a left and right image.

It is further contemplated herein that lenticular lens 514 may be orientated in vertical columns when display 628 is held in a landscape view to produce a multidimensional digital image on display 628. However, when display 628 is held in a portrait view the 3D effect is unnoticeable enabling 2D and 3D viewing with the same display 628.

It is still further contemplated herein that smoothing, or other image noise reduction techniques, and foreground subject focus may be used to soften and enhance the 3D view or multidimensional digital image on display 628.

Figure 15B:
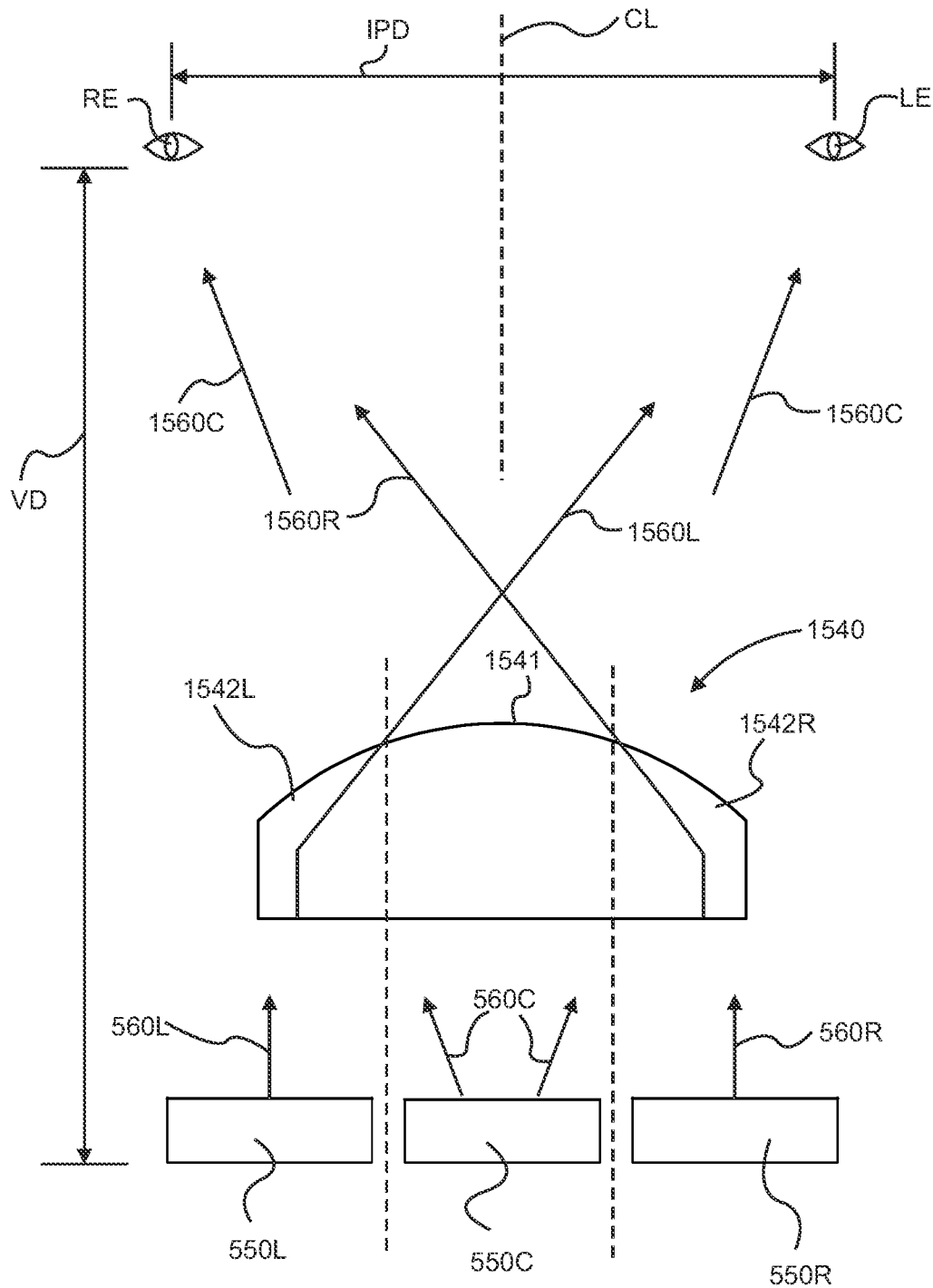

Referring now to FIG. 15B, there is illustrated by way of example, and not limitation a representative segment or section of one embodiment of exemplary refractive element, such as lenticular lens 1514 of display 628. Each sub-element of lenticular lens 1514 being arced or curved or arched segment or section 1540 (shaped as an arc) of lenticular lens 1514 may be configured having a repeating series of trapezoidal lens segments or plurality of sub-elements or refractive elements. For example, each arced or curved or arched segment 1540 may be configured having lens peak 1541 of lenticular lens 1540 and dimensioned to be one pixel 1550 (emitting red R, green G, and blue B light) wide such as having assigned center pixel 1550C thereto lens peak 1541. It is contemplated herein that center pixel 1550C light passes through lenticular lens 1540 as center light 1560C to provide 2D viewing of image on display 628 to left eye LE and right eye RE a viewing distance VD from pixel 1550 or trapezoidal segment or section 1540 of lenticular lens 1514. Moreover, each arced or curved segment 1540 may be configured having angled sections, such as lens angle A1 of lens refractive element, such as lens sub-element 1542 (plurality of sub-elements) of lenticular lens 1540 and dimensioned to be one pixel wide, such as having left pixel 1550L and right pixel 1550R assigned thereto left lens, left lens sub-element 1542L having angle A1, and right lens sub-element 1542R having angle A1, for example an incline angle and a decline angle respectively to refract light across center line CL. It is contemplated herein that pixel 1550L/R light passes through lenticular lens 1540 and bends or refracts to provide left and right images to enable 3D viewing of image on display 628; via left pixel 1550L light passes through left lens angle 1542L and bends or refracts, such as light entering left lens angle 1542L bends or refracts to cross center line CL to the right R side, left image light 1560L toward left eye LE and right pixel 1550R light passes through right lens angle 1542R and bends or refracts, such as light entering right lens angle 1542R bends or refracts to cross center line CL to the left side L, right image light 1560R toward right eye RE, to produce a multidimensional digital image on display 628.

It is contemplated herein that left and right images may be produce as set forth in FIGS. 6.1-6.3 from U.S. Pat. Nos. 9,992,473, 10,033,990, and 10,178,247 and electrically communicated to left pixel 550L and right pixel 550R. Moreover, 2D image may be electrically communicated to center pixel 550C.

In this FIG. each lens peak 1541 has a corresponding left and right angled lens 1542, such as left angled lens 1542L and right angled lens 1542R on either side of lens peak 1541 and each assigned one pixel, center pixel 1550C, left pixel 1550L and right pixel 1550R, assigned respectively thereto.

In this FIG., the viewing angle A1 is a function of viewing distance VD, size S of display 628, wherein A=2 arctan (S/2VD).

In one embodiment, each pixel may be configured from a set of sub-pixels. For example, to produce a multidimensional digital image on display 628 each pixel may be configured as one or two 3×3 sub-pixels of LCD panel stack components 1520 emitting one or two red R light, one or two green G light, and one or two blue B light therethrough segments or sections of lenticular lens 1540 to produce a multidimensional digital image on display 628. Red R light, green G light, and blue B may be configured as vertical stacks of three horizontal sub-pixels.

It is recognized herein that trapezoid shaped lens 1540 bends or refracts light uniformly through its center C, left L side, and right R side, such as left angled lens 1542L and right angled lens 1542R, and lens peak 1541.

Figure 15C:
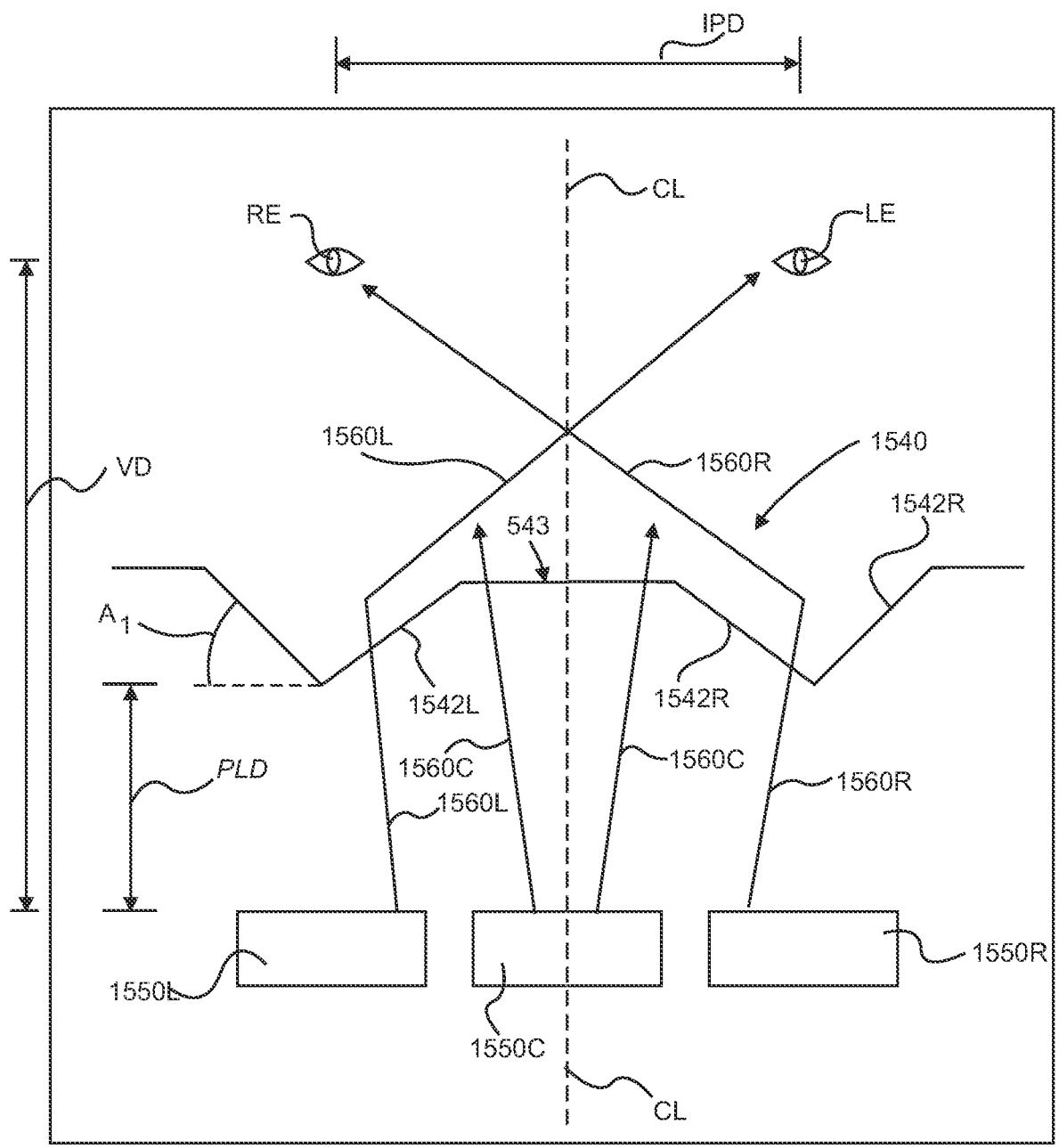

Referring now to FIG. 15C, there is illustrated by way of example, and not limitation a prototype segment or section of one embodiment of exemplary lenticular lens 1514 of display 628. Each segment or plurality of sub-elements or refractive elements being trapezoidal shaped segment or section 1540 of lenticular lens 1514 may be configured having a repeating series of trapezoidal lens segments (plurality of trapezoid sections). For example, each trapezoidal segment 1540 may be configured having lens peak 1541 of lenticular lens 1540 and dimensioned to be one or two pixel 1550 wide and flat section or straight lens, such as lens valley 1543 and dimensioned to be one or two pixel 1550 wide (emitting red R, green G, and blue B light). For example, lens valley 1543 may be assigned center pixel 1550C. It is contemplated herein that center pixel 1550C light passes through lenticular lens 1540 as center light 1560C to provide 2D viewing of image on display 628 to left eye LE and right eye RE a viewing distance VD from pixel 1550 or trapezoidal segment or section 1540 of lenticular lens 1514. Moreover, each trapezoidal segment 1540 may be configured having angled sections, such as lens angle 1542 of lenticular lens 1540 and dimensioned to be one or two pixel wide, such as having left pixel 1550L and right pixel 1550R assigned thereto left lens angle 1542L and right lens angle 1542R, respectively. It is contemplated herein that pixel 1550L/R light passes through lenticular lens 1540 and bends to provide left and right images to enable 3D viewing of image on display 628; via left pixel 1550L light passes through left lens angle 1542L and bends or refracts, such as light entering left lens angle 1542L bends or refracts to cross center line CL to the right R side, left image light 1560L toward left eye LE; and right pixel 1550R light passes through right lens angle 1542R and bends or refracts, such as light entering right lens angle 1542R bends or refracts to cross center line CL to the left side L, right image light 1560R toward right eye RE to produce a multidimensional digital image on display 628.

It is contemplated herein that angle A1 of lens angle 1542 is a function of the pixel 1550 size, stack up of components of display 628, refractive properties of lenticular lens 514, and distance left eye LE and right eye RE are from pixel 1550, viewing distance VD.

In this FIG. 15C, the viewing angle A1 is a function of viewing distance VD, size S of display 628, wherein A1=2 arctan (S/2VD).

Figure 15D:
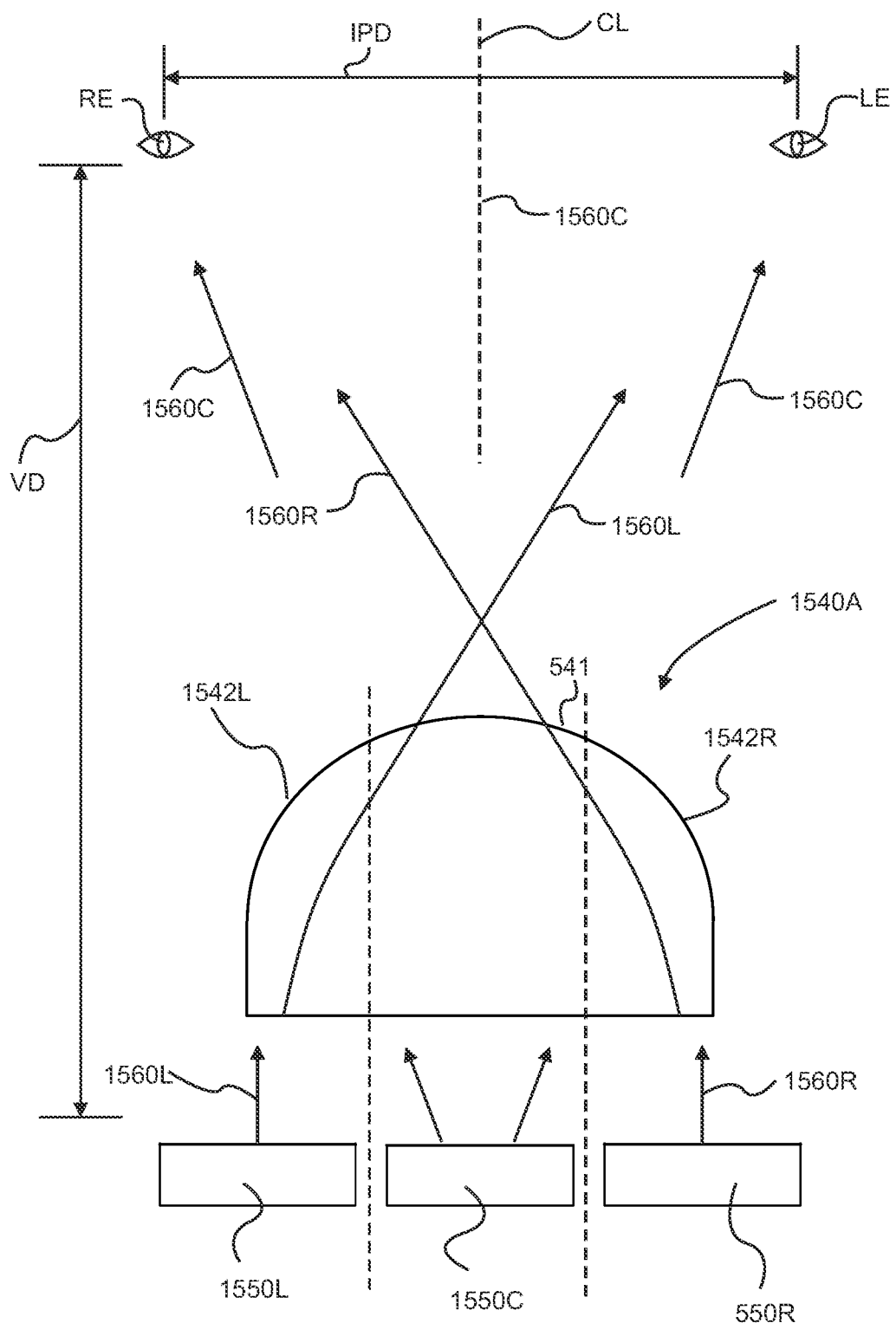

Referring now to FIG. 15D, there is illustrated by way of example, and not limitation a representative segment or section of one embodiment of exemplary lenticular lens 1514 of display 628. Each segment or plurality of sub-elements or refractive elements being parabolic or dome shaped segment or section 1540A (parabolic lens or dome lens, shaped a dome) of lenticular lens 1514 may be configured having a repeating series of dome shaped, curved, semi-circular lens segments. For example, each dome segment 1540A may be configured having lens peak 1541 of lenticular lens 1540 and dimensioned to be one or two pixel 1550 wide (emitting red R, green G, and blue B light) such as having assigned center pixel 1550C thereto lens peak 1541. It is contemplated herein that center pixel 1550C light passes through lenticular lens 540 as center light 560C to provide 2D viewing of image on display 628 to left eye LE and right eye RE a viewing distance VD from pixel 1550 or trapezoidal segment or section 1540 of lenticular lens 1514. Moreover, each trapezoidal segment 1540 may be configured having angled sections, such as lens angle 1542 of lenticular lens 1540 and dimensioned to be one pixel wide, such as having left pixel 1550L and right pixel 1550R assigned thereto left lens angle 1542L and right lens angle 1542R, respectively. It is contemplated herein that pixel 1550L/R light passes through lenticular lens 1540 and bends to provide left and right images to enable 3D viewing of image on display 628; via left pixel 1550L light passes through left lens angle 1542L and bends or refracts, such as light entering left lens angle 1542L bends or refracts to cross center line CL to the right R side, left image light 1560L toward left eye LE and right pixel 1550R light passes through right lens angle 1542R and bends or refracts, such as light entering right lens angle 1542R bends or refracts to cross center line CL to the left side L, right image light 1560R toward right eye RE to produce a multidimensional digital image on display 628.

It is recognized herein that dome shaped lens 1540B bends or refracts light almost uniformly through its center C, left L side, and right R side.

It is recognized herein that representative segment or section of one embodiment of exemplary lenticular lens 1514 may be configured in a variety of other shapes and dimensions.

Moreover, to achieve highest quality two dimensional (2D) image viewing and multidimensional digital image viewing on the same display 628 simultaneously, a digital form of alternating black line or parallax barrier (alternating) may be utilized during multidimensional digital image viewing on display 628 without the addition of lenticular lens 1514 to the stack of display 628 and then digital form of digital form of alternating black line or parallax barrier (alternating) may be disabled during two dimensional (2D) image viewing on display 628.

A parallax barrier is a device placed in front of an image source, such as a liquid crystal display, to allow it to show a stereoscopic or multiscopic image without the need for the viewer to wear 3D glasses. Placed in front of the normal LCD, it consists of an opaque layer with a series of precisely spaced slits, allowing each eye to see a different set of pixels, so creating a sense of depth through parallax. A digital parallax barrier is a series of alternating black lines in front of an image source, such as a liquid crystal display (pixels), to allow it to show a stereoscopic or multiscopic image. In addition, face-tracking software functionality may be utilized to adjust the relative positions of the pixels and barrier slits according to the location of the user's eyes, allowing the user to experience the 3D from a wide range of positions. The book Design and Implementation of Autostereoscopic Displays by Keehoon Hong, Soon-gi Park, Jisoo Hong, Byoungho Lee incorporated herein by reference.

It is contemplated herein that parallax and key subject KS reference point calculations may be formulated for distance between virtual camera positions, interphasing spacing, display 628 distance from user U, lenticular lens 1514 configuration (lens angle A1, 1542, lens per millimeter and millimeter depth of the array), lens angle 1542 as a function of the stack up of components of display 628, refractive properties of lenticular lens 1514, and distance left eye LE and right eye RE are from pixel 1550, viewing distance VD, distance between virtual camera positions (interpupillary distance IPD), and the like to produce digital multi-dimensional images as related to the viewing devices or other viewing functionality, such as barrier screen (black line), lenticular, parabolic, overlays, waveguides, alternating digital black line and the like with an integrated LCD layer in an LED or OLED, LCD, OLED, and combinations thereof or other viewing devices.

Incorporated herein by reference is paper entitled Three-Dimensional Display Technology, pages 1-80, by Jason Geng of other display techniques or the like that may be utilized to produce display 628, incorporated herein by reference.

It is contemplated herein that number of lenses per mm or inch of lenticular lens 514 is determined by the pixels per inch of display 628.

It is contemplated herein that other angles A1 are contemplated herein, distance of pixels 1550C, 1550L, 1550R from of lens 1540 of a plurality of lenses (approximately 0.5 mm), and user U viewing distance from smart device display 628 from user's eyes (approximately fifteen (15) inches), and average human interpupilary spacing between eyes (approximately 2.5 inches) may be factored or calculated to produce digital multi-dimensional images. Governing rules of angles and spacing assure the viewed images thereon display 628 is within the comfort zone of the viewing device to produce digital multi-dimensional images, see FIGS. 5, 6, 11 below.

It is recognized herein that angle A1 of lens 1541 may be calculated and set based on viewing distance VD between user U eyes, left eye LE and right eye RE, and pixels 550, such as pixels 1550C, 1550L, 1550R, a comfortable distance to hold display 628 from user's U eyes, such as ten (10) inches to arm/wrist length, or more preferably between approximately fifteen (15) inches to twenty-four (24) inches, and most preferably at approximately fifteen (15) inches.

In use, the user U moves the display 628 toward and away from user's eyes until the digital multi-dimensional images appear to user, this movement factor in user's U actual interpupilary distance IPD spacing and to match user's visual system (near sited and far sited discrepancies) as a function of width position of interlaced left and right images from distance between virtual camera positions (interpupilary distance IPD), key subject KS depth therein each of digital images(n) of scene S (key subject KS algorithm), horizontal image translation algorithm of two images (left and right image) about key subject KS, interphasing algorithm of two images (left and right image) about key subject KS, angles A1, distance of pixels 1550 from of lens 1540 of a plurality of lenses (pixel-lens distance (PLD) approximately 0.5 mm)) and refractive properties of lens array, such as trapezoid shaped lens 1540 all factored in to produce digital multi-dimensional images for user U viewing display 628. First known elements are number of pixels 1550 and number of images, two image, distance between virtual camera positions, or (interpupilary distance IPD). Images captured at or near interpupilary distance IPD matches the human visual system, simplifies the math, minimizes cross talk between the two images, fuzziness, image movement to produce digital multi-dimensional image viewable on display 628.

It is further contemplated herein that trapezoid shaped lens 1540 may be formed from polystyrene, polycarbonate or other transparent materials or similar materials, as these material offers a variety of forms and shapes, may be manufactured into different shapes and sizes, and provide strength with reduced weight; however, other suitable materials or the like, can be utilized, provided such material has transparency and is machineable or formable as would meet the purpose described herein to produce a left and right stereo image and specified index of refraction. It is further contemplated herein that trapezoid shaped lens 1541 may be configured with 4.5 lenticular lens per millimeter and approximately 0.33 mm depth.

DIFY, in block or step 1250, computer system 10 via image display application 624 is configured to set of frames 1100 of terrain T of scene S to display, via sequential palindrome loop, multidimensional digital image sequence 1010 on display 628 for different dimensions of displays 628. Again, multidimensional digital image sequence 1010 of scene S, resultant 3D image sequence, may be output as a DIF sequence or .MPO file to display 628. It is contemplated herein that computer system 10, display 628, and application program(s) 624 may be responsive in that computer system 10 may execute an instruction to size each image (n) of scene S to fit the dimensions of a given display 628.

In block or step 1250, multidimensional image sequence 1010 on display 628, utilizes a difference in position of objects in each of images(n) of scene S from set of frames 1100 relative to key subject plane KSP, which introduces a parallax disparity between images in the sequence to display multidimensional image sequence 1010 on display 628 to enable user U, in block or step 1250 to view multidimensional image sequence 1010 on display 628.

Moreover, in block or step 1250, computer system 10 via output application 624 may be configured to display multidimensional image sequence 1010 on display 628 for one more user system 720, 722, 724 via communications link 740 and/or network 750, or 5G computer systems 10 and application program(s) 624.

3D Stereo, in block or step 1250, computer system 10 via output application 624 may be configured to display multidimensional image 1010 on display 628. Multidimensional image 1010 may be displayed via left and right pixel 1102L/1103R light passes through lenticular lens 1540 and bends or refracts to provide 3D viewing of multidimensional image 1010 on display 628 to left eye LE and right eye RE a viewing distance VD from pixel 1550.

In block or step 1250, utilizing computer system 10, display 628, and application program(s) 624 settings to configure each images(n) (L&R segments) of scene S from set of frames 1100 of terrain T of scene S simultaneously with Key Subject aligned between images for binocular disparity for display/view/save multi-dimensional digital image(s) 1010 on display 628, wherein a difference in position of each images(n) of scene S from virtual cameras relative to key subject KS plane introduces a (left and right) binocular disparity to display a multidimensional digital image 1010 on display 628 to enable user U, in block or step 1250 to view multidimensional digital image on display 208.

Moreover, user U may elect to return to block or step 1220 to choose a new key subject KS in each source image, set of frames 1100 of terrain T of scene S and progress through steps 1220-1250 to view on display 628, via creation of a new or second sequential loop, multidimensional digital image sequence 1010 of scene S for new key subject KS.

Display 628 may include display device (e.g., viewing screen whether implemented on a smart phone, PDA, monitor, TV, tablet or other viewing device, capable of projecting information in a pixel format) or printer (e.g., consumer printer, store kiosk, special printer or other hard copy device) to print multidimensional digital master image on, for example, lenticular or other physical viewing material.

It is recognized herein that steps 1220-1240, may be performed by computer system 10 via image manipulation application 626 utilizing distinct and separately located computer systems 10, such as one or more user systems 720, 722, 724 and application program(s) 626 performing steps herein. For example, using an image processing system remote from image capture system, and from image viewing system, steps 1220-1240 may be performed remote from scene S via computer system 10 or server 760 and application program(s) 624 and communicating between user systems 720, 722, 724 and application program(s) 626 via communications link 740 and/or network 750, or via wireless network, such as 5G, computer systems 10 and application program(s) 626 via more user systems 720, 722, 724. Here, computer system 10 via image manipulation application 624 may manipulate 24 settings to configure each images(n) (L&R segments) of scene S from of scene S from virtual camera to generate multidimensional digital image sequence 1010 aligned to the key subject KS point and transmit for display multidimensional digital image/sequence 1010 to one or more user systems 720, 722, 724 via communications link 740 and/or network 750, or via wireless network, such as 5G computer systems 10 or server 760 and application program(s) 624.

Moreover, it is recognized herein that steps 1220-1240, may be performed by computer system 10 via image manipulation application 624 utilizing distinct and separately located computer systems 10 positioned on the vehicle. For example, using an image processing system remote from image capture system, steps 1220-1240 via computer system 10 and application program(s) 624 computer systems 10 may manipulate 24 settings to configure each images(n) (L&R segments) of scene S from of scene S from capture device(s) 830 to generate a multidimensional digital image/sequence 1010 aligned to the key subject KS point. Here, computer system 10 via image manipulation application 626 may utilize multidimensional image/sequence 1010 to navigate the vehicle V through terrain T of scene S. Alternatively, computer system 10 via image manipulation application 626 may enable user U remote from vehicle V to utilize multidimensional image/sequence 1010 to navigate the vehicle V through terrain T of scene S.

It is contemplated herein that computer system 10 via output application 624 may be configured to enable display of multidimensional image sequence 1010 on display 628 to enable a plurality of user U, in block or step 1250 to view multidimensional image sequence 1010 on display 628 live or as a replay/rebroadcast.

It is recognized herein that step 1250, may be performed by computer system 10 via output application 624 utilizing distinct and separately located computer systems 10, such as one or more user systems 720, 722, 724 and application program(s) 624 performing steps herein. For example, using an output or image viewing system, remote from scene S via computer system 10 and application program(s) 624 and communicating between user systems 720, 722, 724 and application program(s) 626 via communications link 740 and/or network 750, or via wireless network, such as 5G, computer systems 10 and application program(s) 624 via more user systems 720, 722, 724. Here, computer system 10 output application 624 may receive manipulated plurality of two digital images of scene S and display multidimensional image/sequence 1010 to one more user systems 720, 722, 724 via communications link 740 and/or network 750, or via wireless network, such as 5G computer systems 10 and application program(s) 624.

Moreover, via communications link 740 and/or network 750, wireless, such as 5G second computer system 10 and application program(s) 624 may transmit sets of images(n) of scene S configured relative to key subject plane KSP as multidimensional image sequence 1010 on display 628 to enable a plurality of user U, in block or step 1250 to view multidimensional image/sequence 1010 on display 628 live or as a replay/rebroadcast.

Referring now to FIG. 13, there is illustrated by way of example, and not limitation, touch screen display 628 enabling user U to select photography options of computer system 10. A first exemplary option may be DIFY capture wherein user U may specify or select digital image(s) speed setting 1302 where user U may increase or decrease play back speed or frames (images) per second of the sequential display of digital image(s) on display 628 multidimensional image/sequence 1010. Furthermore, user U may specify or select digital image(s) number of loops or repeats 1304 to set the number of loops of images(n) of the plurality of 2D image(s) 1000 of scene S where images(n) of the plurality of 2D image(s) 1000 of scene S are displayed in a sequential order on display 628, similar to FIG. 11. Still furthermore, user U may specify or select order of playback of digital image(s) sequences for playback or palindrome sequence 1306 to set the order of display of images(n) of the multidimensional image/sequence 1010 of scene S. The timed sequence showing of the images produces the appropriate binocular disparity through the motion pursuit ratio effect. It is contemplated herein that computer system 10 and application program(s) 624 may utilize default or automatic setting herein.

DIFY, referring to FIGS. 14A and 14B, there is illustrated by way of example, and not limitation, frames captured in a set sequence which are played back to the eye in a set sequence and a representation of what the human eyes perceives viewing the DIFY on display 628. Explanation of DIFY and its geometry to produce motion parallax. Motion parallax is the change in angle of a point relative to a stationary point. (Motion Pursuit). Note because we have set the key subject KS point all points in foreground will move to the right, while all points in the background will move to the left. The motion is reversed in a paledrone where the images reverse direction. The angular change of any point in different views relative to the key subject creates motion parallax.

A DIFY is a series of frames captured in a set sequence which are played back to the eye in the set sequence as a loop. For example, the play back of two frames (assume first and last frame, such as frame 1101 and 1104) is depicted in FIG. 14A. FIG. 14A represents the position of an object, such as a near plane NP object in FIG. 4 on the near plane NP and its relation to key subject KS point in frame 1101 and 1104 wherein key subject KS point is constant due to the image translation imposed on the frames, frame 1101, 1102, 1103 and 1104. Frames, frame 1101, 1102, 1103 and 1104 in FIG. 11A and 11B may be overlapping and offset from the principal axis 1112 by a calculated parallax value, (horizontal image translation (HIT) and preset by the spacing of virtual camera. FIG. 14B there is illustrated by way of example, and not limitation what the human eye perceives from the viewing of the two frames (assume first and last frame, such as frame 1101 and 1104 having frame in near plane NP as point 1401 and frame 2 in near plane NP as point 1402) depicted in FIG. 14A on display 628 where image plane or screen plane is the same as key subject KS point and key subject plane KSP and user U viewing display 628 views virtual depth near plane NP 1410 in front of display 628 or between display 628 and user U eyes, left eye LE and right eye RE. Virtual depth near plane NP 1410 is near plane NP as it represents frame 1 in near plane NP as object in near plane point 1401 and frame 2 in near plane NP as object in near plane point 1402, the closest points user U eyes, left eye LE and right eye RE see when viewing multidimensional image sequence 1010 on display 628.

Virtual depth near plane NP 1410 simulates a visual depth between key subject KS and object in near plane point 1401 and object in near plane point 1402 as virtual depth 1420, depth between the near plane NP and key subject plane KSP. This depth is due to binocular disparity between the two views for the same point, object in near plane point 1401 and object in near plane point 1402. Object in near plane point 1401 and object in near plane point 1402 are preferably same point in scene S, at different views sequenced in time due to binocular disparity. Moreover, outer rays 1430 and more specifically user U eyes, left eye LE and right eye RE viewing angle 1440 is preferably approximately twenty-seven (27) degrees from the retinal or eye axis. (Similar to the depth of field for a cell phone or tablet utilizing display 628.) This depiction helps define the limits of the composition of scene S. Near plane point 1401 and near plane point 1402 preferably lie within the depth of field, outer rays 1430, and near plane NP has to be outside the inner cross over position 1450 of outer rays 1430.

The motion from X1 to X2 is the motion user U eyes, left eye LE and right eye RE will track. Xn is distance from eye lens, left eye LE or right eye RE to image point 1411, 1412 on virtual near image plane 1410. X'n is distance of leg formed from right triangle of Xn to from eye lens, left eye LE or right eye RE to image point 1411, 1412 on virtual near image plane 1410 to the image plane, 628, KS, KSP. The smooth motion is the binocular disparity caused by the offset relative to key subject KS at each of the points user U eyes, left eye LE and right eye RE observe.

For each eye, left eye LE or right eye RE, a coordinate system may be developed relative to the center of the eye CL and to the center of the intraocular spacing, half of interpupillary distance width IPD, 1440. Two angles β and α are the angles utilized to explain the DIFY motion pursuit. β is the angle formed when a line is passed from the eye lens, left eye LE and right eye RE, through the virtual near plane 1410 to the image on the image plane, 628, KS, KSP. Θ is β2-β1. While α is the angle from the fixed key subject KS of the two frames 1101, 1104 on the image plane 628, KS, KSP to the point 1411, 1412 on virtual near image plane 1410. The change in α represents the eye pursuit. Motion of the eyeball rotating, following the change in position of a point on the virtual near plane. While β is the angle responsible for smooth motion or binocular disparity when compared in the left and right eye. The outer ray 1430 emanating from the eye lens, left eye LE and right eye RE connecting to point 1440 represents the depth of field or edge of the image, half of the image. This line will change as the depth of field of the virtual camera changes.

$$\frac{di}{f} = Xi$$

If we define the pursuit motion as the difference in position of a point along the virtual near plane, then by utilizing the tangents we derive:

$$X2-X1 = di/(\tan\alpha 1 - \tan\alpha 2)$$

These equations show us that the pursuit motion, $X_2-X_1$ is not a direct function of the viewing distance. As the viewing distance increases the perceived depth di will be smaller but because of the small angular difference the motion will remain approximately the same relative to the full width of the image.

Mathematically that the ratio of retinal motion over the rate of smooth eye pursuit determines depth relative to the fixation point in central human vision. The creation of the KSP provides the fixation point necessary to create the depth. Mathematically, then all points will move differently from any other point as the reference point is the same in all cases.

Figure 17:
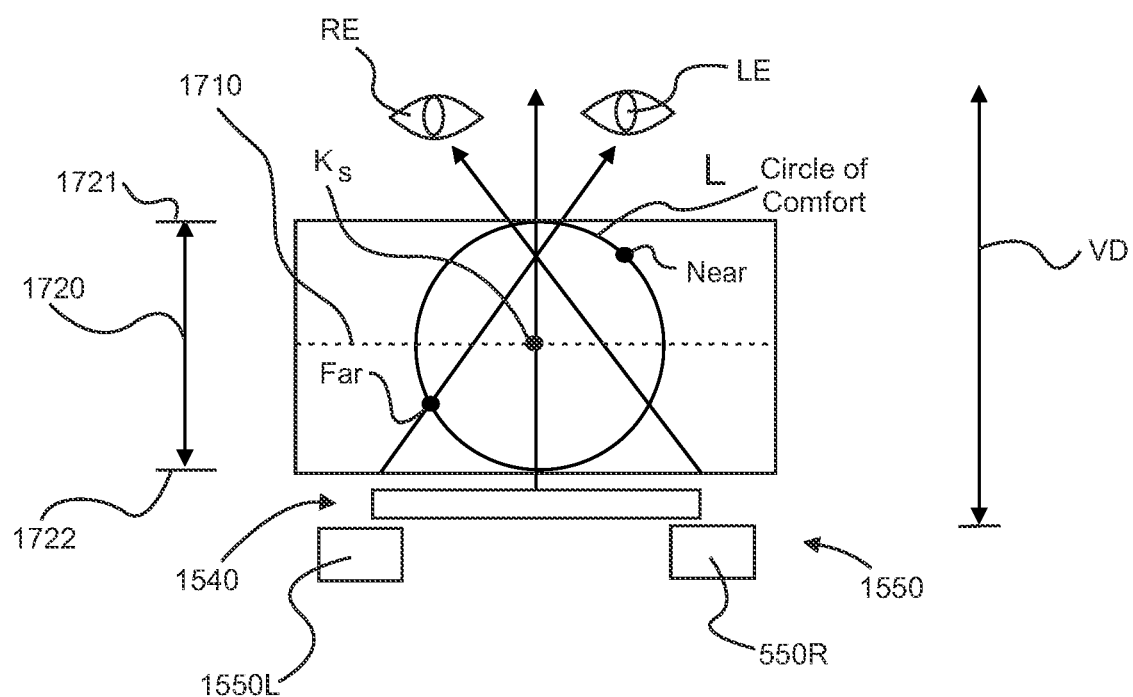
FIG. 17 is a top view illustration of an exemplary embodiment of viewing a multidimensional digital image on display with the image within the Circle of Comfort, proximate Horopter arc or points, within Panum area, and viewed from viewing distance.

Referring now to FIG. 17, there is illustrated by way of example, and not limitation a representative illustration of Circle of Comfort CoC fused with Horopter arc or points and Panum area. Horopter is the locus of points in space that have the same disparity as fixation, Horopter arc or points. Objects in the scene that fall proximate Horopter arc or points are sharp images and those outside (in front of or behind) Horopter arc or points are fuzzy or blurry. Panum is an area of space, Panum area 1720, surrounding the Horopter for a given degree of ocular convergence with inner limit 1721 and an outer limit 1722, within which different points projected on to the left and right eyes LE/RE result in binocular fusion, producing a sensation of visual depth, and points lying outside the area result in diplopia—double images. Moreover, fuse the images from the left and right eyes for objects that fall inside Panum's area, including proximate the Horopter, and user U will we see single clear images. Outside Panum's area, either in front or behind, user U will see double images.

It is recognized herein that computer system 10 via image capture application 624, image manipulation application 624, image display application 624 may be performed utilizing distinct and separately located computer systems 10, such as one or more user systems 220, 222, 224 and application program(s) 206. Next, via communications link 240 and/or network 250, wireless, such as 5G second computer system 10 and application program(s) 206 may transmit sets of images(n) of scene S relative to key subject plane introduces a (left and right) binocular disparity to display a multidimensional digital image on display 628 to enable a plurality of user U, in block or step 1250 to view multidimensional digital image on display 208 live or as a replay/rebroadcast.

Moreover, FIG. 17 illustrates display and viewing of multidimensional image 1010 on display 628 via left and right pixel 1550L/R light of multidimensional image 1010 passes through lenticular lens 1540 and bends or refracts to provide 3D viewing of multidimensional image 1010 on display 628 to left eye LE and right eye RE a viewing distance VD from pixel 1550 with near object, key subject KS, and far object within the Circle of Comfort CoC and Circle of Comfort CoC is proximate Horopter arc or points and within Panum area 1720 to enable sharp single image 3D viewing of multidimensional image 1010 on display 628 comfortable and compatible with human visual system of user U.

With respect to the above description then, it is to be realized that the optimum dimensional relationships, to include variations in size, materials, shape, form, position, movement mechanisms, function and manner of operation, assembly and use, are intended to be encompassed by the present disclosure.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein but is limited only by the following claims.

The invention claimed is:

1. A system to capture a plurality of two dimensional (2D) images of a subsurface below a surface, process the images, and view a multidimensional digital image model, the system comprising:
   a memory device for storing an instruction;
   a processor in communication with said memory device configured to execute said instruction; and
   a subsurface image capture module in communication with said processor, said subsurface image capture module having one or more wave generating device and one or more sensor to capture a plurality of two dimensional digital image datasets of the subsurface with a coordinate reference data for each of said two dimensional digital image datasets of the subsurface;
   said processor executes an instruction to save said plurality of two dimensional digital image datasets of the subsurface in a sequence relative to said coordinate reference data;
   said processor executes an instruction to align said sequence of said plurality of said two dimensional digital image datasets of the subsurface horizontally and vertically;
   said processor executes an instruction to select a key subject point in said sequence of said plurality of two dimensional digital image datasets of the subsurface and align said sequence of said plurality of two dimensional digital image datasets about said key subject convergence point;
   a display in communication with said processor having a micro optical lens spacing, said display configured to display said multidimensional digital image,
   said micro optical lens is configured as a plurality of pixels having a refractive element integrated therein, said refractive element having a plurality of repeating series of continuous sub-elements aligned as a single layer therewith said plurality of pixels,
   wherein each of said plurality of repeating series of continuous sub-elements is configured having a cross-section shaped as a single continuous layer having repeating flat sections and trapezoid sections, each of said trapezoid sections having an incline angle and a decline angle;
   said processor executes an instruction to interphase said sequence of said plurality of two dimensional digital image datasets of the subsurface aligned about said key subject point to correspond to said micro optical lens spacing;
   said processor executes an instruction to save said sequence of said two dimensional digital image datasets of the subsurface as one of a plurality of image datasets of the subsurface;
   said processor executes an instruction to generate a digital model of the subsurface from said plurality image datasets of the subsurface while maintaining said coordinate reference data and generate the multidimensional digital image model therefrom; and
   said processor executes an instruction to display the multidimensional digital image model of the subsurface on said display.

2. The system of claim 1, wherein said processor executes an instruction to automatically select said key subject point in said sequence of said plurality of two dimensional digital image datasets of the subsurface.

3. The system of claim 1, wherein said processor executes an instruction to enable a user to select said key subject point in said sequence of said plurality of two dimensional digital image datasets of the subsurface via an input from said display.

4. The system of claim 1, wherein said processor executes an instruction to generate a set of 3D frames of said digital model via a virtual camera moving in an arc about said key subject point.

5. The system of claim 4, wherein said processor executes an instruction to horizontally align said set of 3D frames about said key subject point as a set of 3D HIT images to create a parallax between a near plane and a far plane relative to said key subject point.

6. The system of claim 5, wherein said processor executes an instruction to perform a dimensional image format transform of said 3D HIT images to generate a 3D DIF images.

7. The system of claim 4, wherein said processor executes an instruction to identify a first proximal plane and a second distal plane within said 3D frames.

8. The system of claim 7, wherein said processor executes an instruction to determine a depth estimate for said first proximal plane and said second distal plane within said 3D frames.

9. The system of claim 8, wherein said processor executes an instruction to align said 3D DIF images sequentially in a palindrome loop as a multidimensional digital image sequence.

10. The system of claim 9, wherein said processor executes an instruction to edit said multidimensional digital image sequence.

11. The system of claim 8, wherein said processor executes an instruction to perform an interphasing of two of said 3D DIF images relative to said key subject point as a multidimensional digital image to introduce a binocular disparity between said two of said 3D DIF images.

12. The system of claim 11, wherein said processor executes an instruction to edit said multidimensional digital image.

13. The system of claim 12, wherein said processor executes an instruction to display said multidimensional digital image on said display.

14. The system of claim 13, wherein said display is configured to display said multidimensional digital image and utilizes at least one layer selected from the group consisting of a lenticular lens, a barrier screen, a parabolic lens, an overlay, a waveguide, and combinations thereof.

15. The system of claim 13, wherein said subsurface is selected from the group consisting of an internal biology, ground area, underwater, and combinations thereof.

16. The system of claim 15, wherein said subsurface image capture module is selected from the group consisting of magnetic resonance imaging (MRI), x-ray (X-Ray), computerized tomography (CT), positron emission tomography (PET), ; bone densitometry (DEXA), Fluoroscopy, ultrasound, and combinations thereof to scan said internal biology.

17. The system of claim 15, wherein said subsurface image capture module is selected from the group consisting of ground-penetrating radar (GPR), ultrasound, and combinations thereof to scan said ground area.

18. The system of claim 15, wherein said subsurface image capture module is selected from the group consisting of ultrasound, LIDAR, high resolution 2D images RGB thereof to scan said underwater.

19. The system of claim 1, wherein said subsurface is selected from the group consisting of an internal biology, a below ground, an underwater, and combinations thereof.

20. The system of claim 19, wherein said subsurface image capture module is selected from the group consisting of magnetic resonance imaging (MRI), x-ray (X-Ray), computerized tomography (CT), positron emission tomography (PET), ; bone densitometry (DEXA), Fluoroscopy, ultrasound, and combinations thereof to scan said internal biology.

21. The system of claim 19, wherein said subsurface image capture module is selected from the group consisting of ground-penetrating radar (GPR), radio waves, ultrasound, microwave, and combinations thereof to scan said ground area.

22. The system of claim 21, wherein said display is configured having alternating digital black lines via a barrier screen.

23. The system of claim 21, wherein said subsurface image capture module is affixed to a land vehicle.

24. The system of claim 21, wherein said subsurface image capture module is affixed to a marine vessel.

25. The system of claim 19, wherein said subsurface image capture module is selected from the group consisting of ultrasound, LIDAR, high resolution 2D images RGB thereof to scan said underwater.

26. The system of claim 25, wherein said subsurface image capture module is affixed to a satelite.

27. The system of claim 25, wherein said subsurface image capture module is affixed to a drone.

28. A method of generating a multidimensional digital image model of a subsurface below a surface, the method comprising the steps of:
providing a memory device for storing an instruction, a processor in communication with said memory device configured to execute said instruction, and a subsurface image capture module in communication with said processor, said subsurface image capture module having one or more wave generating device and one or more sensor to capture a plurality of two dimensional digital image datasets of the subsurface with a coordinate reference data for each of said two dimensional digital image datasets, a display in communication with said processor having a micro optical lens spacing, said display configured to display said multidimensional digital image, said micro optical lens is configured as a plurality of pixels having a refractive element integrated therein, said refractive element having a plurality of repeating series of continuous sub-elements aligned as a single layer therewith said plurality of pixels, wherein each of said plurality of repeating series of continuous sub-elements is configured having a cross-section shaped as a single continuous layer having repeating flat sections and trapezoid sections, each of said trapezoid sections having an incline angle and a decline angle;
executing an instruction via said processor to save said plurality of the two dimensional digital images of the subsurface in a sequence relative to said coordinate reference data;
executing an instruction via said processor to align said sequence of said plurality of the two dimensional digital images of the subsurface horizontally and vertically;
executing an instruction via said processor to select a key subject point in said sequence of said plurality of the two dimensional digital images of the subsurface and align said sequence of said plurality of the two dimensional digital images about said key subject convergence point;
executing an instruction via said processor to interphase said sequence of said plurality of the two dimensional digital images of the subsurface aligned about said key subject point to correspond to said micro optical lens spacing;
executing an instruction via said processor to save said sequence of said plurality of the two dimensional digital images of the subsurface as one of a plurality of image datasets of the subsurface;
executing an instruction via said processor to generate a digital model of the subsurface from said plurality image datasets of the subsurface while maintaining said coordinate reference data and generate the multidimensional digital image model therefrom; and
executing an instruction via said processor to display the multidimensional digital image model of the subsurface on said display.

29. The method of claim 28, further comprising the step of executing an instruction via said processor to generate a set of 3D frames of said digital model via a virtual camera moving in an arc about said key subject point.

30. The method of claim 29, further comprising the step of executing an instruction via said processor to horizontally align said set of 3D frames about said key subject point as a set of 3D HIT images to create a parallax between a near plane and a far plane relative to said key subject point.

31. The method of claim 30, further comprising the step of executing an instruction via said processor to perform a dimensional image format transform of said 3D HIT images to generate a 3D DIF images.

32. The method of claim 31, further comprising the step of executing an instruction via said processor to identify a first proximal plane and a second distal plane within said 3D frames.

33. The method of claim 32, further comprising the step of executing an instruction via said processor to determine a depth estimate for said first proximal plane and said second distal plane within said 3D frames.

34. The method of claim 33, further comprising the step of executing an instruction via said processor to align said 3D DIF images sequentially in a palindrome loop as a multidimensional digital image sequence.

35. The method of claim 34, further comprising the step of providing said display having at least one layer selected from the group consisting of a lenticular lens, a barrier screen, a parabolic lens, an overlay, a waveguide, and combinations thereof.

36. The method of claim 35, further comprising the step of displaying said multidimensional digital image on said display.

37. The method of claim 34, further comprising the step of executing an instruction via said processor to edit said multidimensional digital image sequence.

38. The method of claim 37, further comprising the step of executing an instruction via said processor to display said multidimensional digital image sequence on said display.

39. The method of claim 38, further comprising the step of executing an instruction via said processor to perform an interphasing of two of said 3D DIF images relative to said key subject point as a multidimensional digital image to introduce a binocular disparity between said two of said 3D DIF images.

40. The method of claim 39, further comprising the step of executing an instruction via said processor to edit said multidimensional digital image.

41. The method of claim 40, wherein said processor executes an instruction to display said multidimensional digital image on said display.

\* \* \* \* \*